(12) United States Patent
Fukuda et al.

(10) Patent No.: US 12,296,672 B2
(45) Date of Patent: May 13, 2025

(54) PEDAL DEVICE

(71) Applicant: DENSO CORPORATION, Kariya (JP)

(72) Inventors: Yasuhisa Fukuda, Kariya (JP); Etsugo Yanagida, Kariya (JP); Daisuke Hokuto, Kariya (JP); Masashi Arao, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/500,853

(22) Filed: Nov. 2, 2023

(65) Prior Publication Data

US 2024/0069587 A1    Feb. 29, 2024

Related U.S. Application Data

(63) Continuation of application No. PCT/JP2022/017123, filed on Apr. 5, 2022.

(30) Foreign Application Priority Data

May 14, 2021   (JP) ................. 2021-082792

(51) Int. Cl.
  *B60K 26/02*  (2006.01)
  *B60T 7/04*  (2006.01)
  (Continued)

(52) U.S. Cl.
  CPC ............ *B60K 26/021* (2013.01); *B60T 7/042* (2013.01); *B60T 7/06* (2013.01); *G05G 1/44* (2013.01);
  (Continued)

(58) Field of Classification Search
  CPC ............ G05G 1/30; G05G 1/44; G05G 1/487; G05G 5/03; G05G 5/05; G05G 2505/00; B60K 26/021; B60T 7/04; B60T 7/06
  See application file for complete search history.

(56) References Cited

U.S. PATENT DOCUMENTS 8,850,810 B2 * 10/2014 Murayama ............ F15B 15/00
                                                                60/553
10,488,283 B2 * 11/2019 Sumi ..................... B60T 7/042
(Continued)

FOREIGN PATENT DOCUMENTS

JP          09254778 A   *  9/1997
JP       2001239925 A       9/2001
(Continued)

OTHER PUBLICATIONS

U.S. Appl. No. 18/500,944 to Masashi Arao, filed Nov. 2, 2023 (94 pages).
(Continued)

*Primary Examiner* — Adam D Rogers
(74) *Attorney, Agent, or Firm* — Nixon & Vanderhye P.C.

(57) ABSTRACT

A pedal device includes: a pedal that is depressed by a driver; and a reaction force generation mechanism. The reaction force generation mechanism generates a reaction force against a depression force applied from the driver to the pedal. The reaction force generation mechanism includes at least one resilient member, a first holder and a second holder. The first holder contacts the at least one resilient member from one side where the pedal is placed in one direction. The second holder contacts the at least one resilient member from another side that is opposite to the one side. One holder among the first holder and the second holder includes an outer guide portion, and another holder among the first holder and the second holder includes an inner guide portion that is fitted into the outer guide portion and is movable relative to the outer guide portion in the one direction.

41 Claims, 28 Drawing Sheets

(51) Int. Cl.
*B60T 7/06* (2006.01)
*G05G 1/30* (2008.04)
*G05G 1/44* (2008.04)
*G05G 5/03* (2008.04)
*G05G 5/05* (2006.01)

(52) U.S. Cl.
CPC ............... *G05G 5/03* (2013.01); *G05G 5/05* (2013.01); *G05G 2505/00* (2013.01)

(56) References Cited

U.S. PATENT DOCUMENTS

| | | | |
|---|---|---|---|
| 2014/0000254 | A1 | 1/2014 | Murayama et al. |
| 2014/0117602 | A1 | 5/2014 | Jeon |
| 2018/0274998 | A1 | 9/2018 | Sumi et al. |
| 2023/0391298 | A1* | 12/2023 | Fukuda ................ B60T 7/06 |
| 2023/0393606 | A1* | 12/2023 | Fukuda ................ B60T 7/04 |
| 2023/0393607 | A1* | 12/2023 | Yamamoto ............. G05G 1/44 |
| 2023/0406270 | A1* | 12/2023 | Hokuto ................ B60T 7/06 |
| 2024/0059143 | A1* | 2/2024 | Ito .................... G05G 1/44 |
| 2024/0059260 | A1* | 2/2024 | Ito .................... B60T 8/17 |
| 2024/0059261 | A1* | 2/2024 | Hokuto ................ B60T 8/17 |
| 2024/0059262 | A1* | 2/2024 | Hokuto ................ B60T 8/17 |
| 2024/0061462 | A1* | 2/2024 | Fukuda ................ G05G 5/05 |
| 2024/0069588 | A1* | 2/2024 | Arao ................... B60T 7/06 |
| 2024/0294147 | A1* | 9/2024 | Nishimura ............. G05G 1/30 |

FOREIGN PATENT DOCUMENTS

| | | |
|---|---|---|
| JP | 2023164238 A * | 11/2023 |
| JP | 2023164239 A * | 11/2023 |
| WO | 2005014325 A2 | 2/2005 |
| WO | WO-2023210601 A1 * | 11/2023 |
| WO | WO-2023210602 A1 * | 11/2023 |

OTHER PUBLICATIONS

U.S. Appl. No. 18/501,607 to Daisuke Hokuto et al., filed Nov. 3, 2023 (75 pages).

U.S. Appl. No. 18/500,775 to Daisuke Hokuto, filed Nov. 2, 2023 (73 pages).

U.S. Appl. No. 18/501,718 to Yasuhisa Fukuda, filed Nov. 3, 2023 (58 pages).

U.S. Appl. No. 18/500,599 to Kengo Ito et al., filed Nov. 2, 2023 (49 pages).

U.S. Appl. No. 18/500,573 to Kengo Ito et al., filed Nov. 2, 2023 (51 pages).

U.S. Appl. No. 18/500,962 to Atsushi Nishimura et al., filed Nov. 2, 2023 (43 pages).

* cited by examiner

US 12,296,672 B2

PEDAL DEVICE

CROSS REFERENCE TO RELATED APPLICATIONS

This application is a continuation application of International Patent Application No. PCT/JP2022/017123 filed on Apr. 5, 2022, which designated the U.S. and claims the benefit of priority from Japanese Patent Application No. 2021-82792 filed on May 14, 2021. The entire disclosures of all of the above applications are incorporated herein by reference.

TECHNICAL FIELD

The present disclosure relates to a pedal device for a vehicle.

BACKGROUND

As a pedal device of this kind, for example, there has been proposed a pedal simulator. This pedal simulator includes: a brake pedal; an operation rod which is coupled to the brake pedal; a cylinder; a piston which receives a force of the operation rod at an inside of the cylinder; and a plurality of coil springs. The coil springs are received in the cylinder. The coil springs resiliently support the piston and are operated against a force of the operation rod.

Furthermore, the piston is moved in the axial direction of the cylinder, which is a moving direction of the piston in the cylinder, when the piston is urged by the operation rod in response to depression of the brake pedal by a driver. At the time of moving the piston in the cylinder, the piston is slid along and is guided by an inner wall surface of the cylinder.

In the pedal simulator described above, when a depressing operation is performed by the driver to depress the brake pedal, the operation rod, which is coupled to the brake pedal, urges and moves the piston, while changing an angle of the operation rod relative to the piston. Therefore, the inner wall surface of the cylinder needs to guide the piston such that the piston is not tilted relative to the cylinder.

SUMMARY

This section provides a general summary of the disclosure, and is not a comprehensive disclosure of its full scope or all of its features.

According to the present disclosure, there is provided a pedal device for a vehicle, including a support body, a pedal and a reaction force generation mechanism. The pedal is configured to swing relative to the support body and is configured to be depressed by a driver of the vehicle from an operating side of the pedal. The reaction force generation mechanism is supported by the support body and is placed on a counter-operating side of the pedal that is opposite to the operating side of the pedal. The reaction force generation mechanism is configured to generate a reaction force against a depression force that is applied from the driver to the pedal. The reaction force generation mechanism includes: at least one resilient member that is resiliently deformable in one direction; a first holder that is configured to contact the at least one resilient member from one side where the pedal is placed in the one direction, wherein the first holder is configured to be depressed by the pedal; and a second holder that is configured to contact the at least one resilient member from another side that is opposite to the one side in the one direction to receive the depression force transmitted to the at least one resilient member. One holder among the first holder and the second holder includes an outer guide portion. The outer guide portion is shaped in a tubular form extending in the one direction and is inserted in an inside space that is formed at an inside of the at least one resilient member. Another holder among the first holder and the second holder includes an inner guide portion that extends in the one direction and is fitted into the outer guide portion. The inner guide portion is configured to move relative to the outer guide portion in the one direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
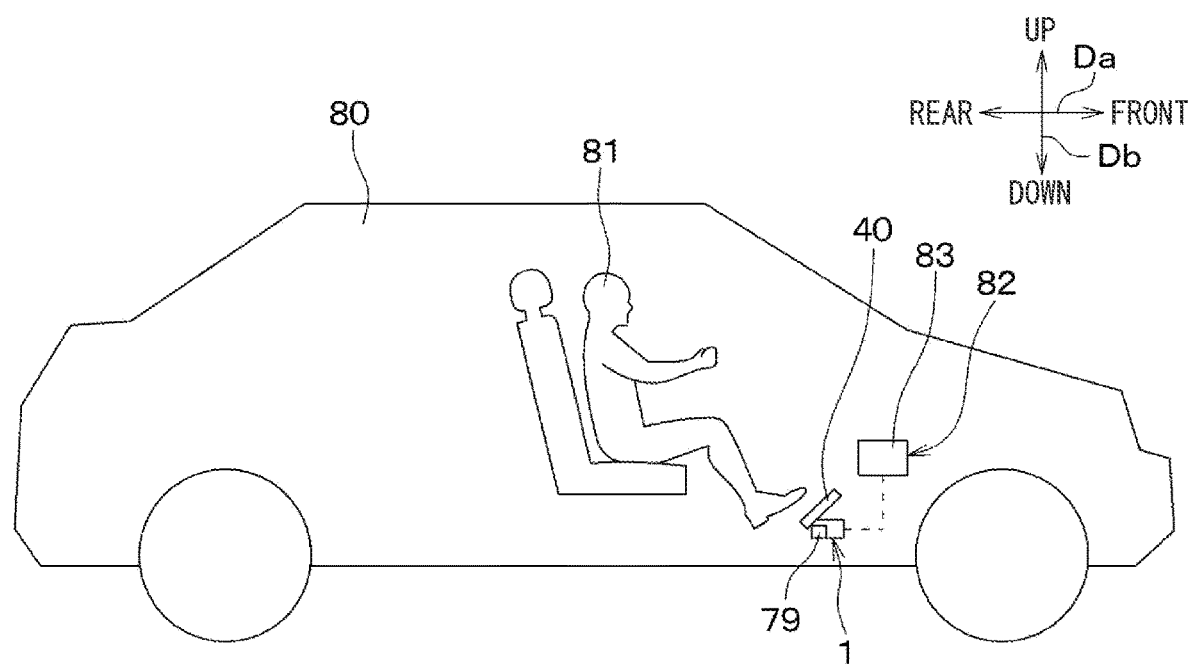
FIG. 1 is a schematic diagram of a vehicle in which a pedal device of a first embodiment is installed.

As a pedal device for a vehicle, for example, there has been proposed a pedal simulator. This pedal simulator includes: a brake pedal; an operation rod which is coupled to the brake pedal; a cylinder; a piston which receives a force of the operation rod at an inside of the cylinder; and a plurality of coil springs. The coil springs are received in the cylinder. The coil springs resiliently support the piston and are operated against a force of the operation rod.

Furthermore, the piston is moved in the axial direction of the cylinder, which is a moving direction of the piston in the cylinder, when the piston is urged by the operation rod in response to depression of the brake pedal by a driver. At the time of moving the piston in the cylinder, the piston is slid along and is guided by an inner wall surface of the cylinder.

In the pedal simulator described above, when a depressing operation is performed by the driver to depress the brake pedal, the operation rod, which is coupled to the brake pedal, urges and moves the piston, while changing an angle of the operation rod relative to the piston. Therefore, the inner wall surface of the cylinder needs to guide the piston such that the piston is not tilted relative to the cylinder.

However, in the pedal simulator described above, a diameter of the inner wall surface of the cylinder, which functions as a guide portion for guiding the piston, is larger than an outer diameter of the coil spring received in the cylinder. Therefore, in a case where a guide length of an outer peripheral surface of the piston, which is in sliding contact with the guide portion, is measured in the moving direction of the piston and is denoted by L, and the diameter of the guide portion is denoted by D, it is difficult to have a large value of L/D while limiting a size increase of the cylinder.

Therefore, in the pedal simulator described above, the piston tends to be tilted relative to the cylinder. In the case where the piston tends to be tilted, a reaction force against a depression force applied from the driver to the brake pedal tends to vary relative to a design value that is preset. In short, in the pedal simulator described above, there may have an incident where the reaction force, which coincides with the design value, is not obtained against the depressing operation of the brake pedal by the driver. As a result of the diligent study of the inventors of the present application, the above finding is made.

According to one aspect of the present disclosure, there is provided a pedal device for a vehicle, including:

a support body that is configured to be installed to a vehicle body of the vehicle;

a pedal that is configured to swing relative to the support body and is configured to be depressed by a driver of the vehicle from an operating side of the pedal which is predetermined; and a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:

the reaction force generation mechanism includes:
at least one resilient member that is resiliently deformable in one direction;
a first holder that is configured to contact the at least one resilient member from one side where the pedal is placed in the one direction, wherein the first holder is configured to be depressed by the pedal; and
a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member; and
another holder among the first holder and the second holder includes an inner guide portion that extends in the one direction and is fitted into the outer guide portion, wherein the inner guide portion is configured to move relative to the outer guide portion in the one direction.

With respect to the above configuration, in a case where a guide length, which is a length of a contact range between the outer guide portion and the inner guide portion measured in the one direction, is denoted by L, and a maximum width of the inner guide portion, which is measured in a direction perpendicular to the one direction, is denoted by D, a value of L/D can be easily made large. Therefore, since the outer guide portion and the inner guide portion guide with each other along a sufficient length measured in the one direction, the first holder is less likely to be tilted relative to the second holder.

Thus, as a merit of the above configuration, for instance, an intended reaction force against the depressing operation of the pedal by the driver can be easily generated. The first holder serves as one of the piston and the cylinder of the pedal simulator described above, and the second holder serves as the other one of the piston and the cylinder of the pedal simulator described above.

Hereinafter, each of embodiments will be described with reference to the drawings. In the following respective embodiments, portions, which are the same or equivalent to each other, will be indicated by the same reference signs.

First Embodiment

As shown in FIG. 1, a pedal device 1 of the present embodiment is a device installed in a vehicle 80 and is depressed by a depression force of a driver 81 (an occupant of the vehicle 80). This pedal device 1 is installed in the vehicle 80 as a brake pedal device for performing a braking operation of the vehicle 80.

Specifically, in the vehicle 80 of FIG. 1, a brake-by-wire system 82 is installed, and the pedal device 1 is a brake pedal device used in the brake-by-wire system 82. The brake-by-wire system 82 is a system that drives a brake pad of each wheel through a brake circuit with a hydraulic pressure generated by a master cylinder controlled by an electronic controller unit 83 installed in the vehicle 80 based on an electrical signal outputted from the pedal device 1.

Double-sided arrows shown in FIG. 1 indicate corresponding directions of the vehicle 80 in which the pedal device 1 is installed. Specifically, in FIG. 1, a vehicle front-to-rear direction Da, which is a front-to-rear direction of the vehicle 80, and a vehicle up-to-down direction db, which is an up-to-down direction of the vehicle 80 (in other words, a vertical direction of the vehicle 80), are respectively indicated by the double-sided arrows. Furthermore, in the description of the present embodiment, a front side in the vehicle front-to-rear direction Da is also referred to as a vehicle front side, and a rear side in the vehicle front-to-rear direction Da is also referred to as a vehicle rear side. Also, an upper side in the vehicle up-to-down direction db is also referred to as a vehicle upper side, and a down side in the vehicle up-to-down direction db is also referred to as a vehicle down side.

Figure 2:
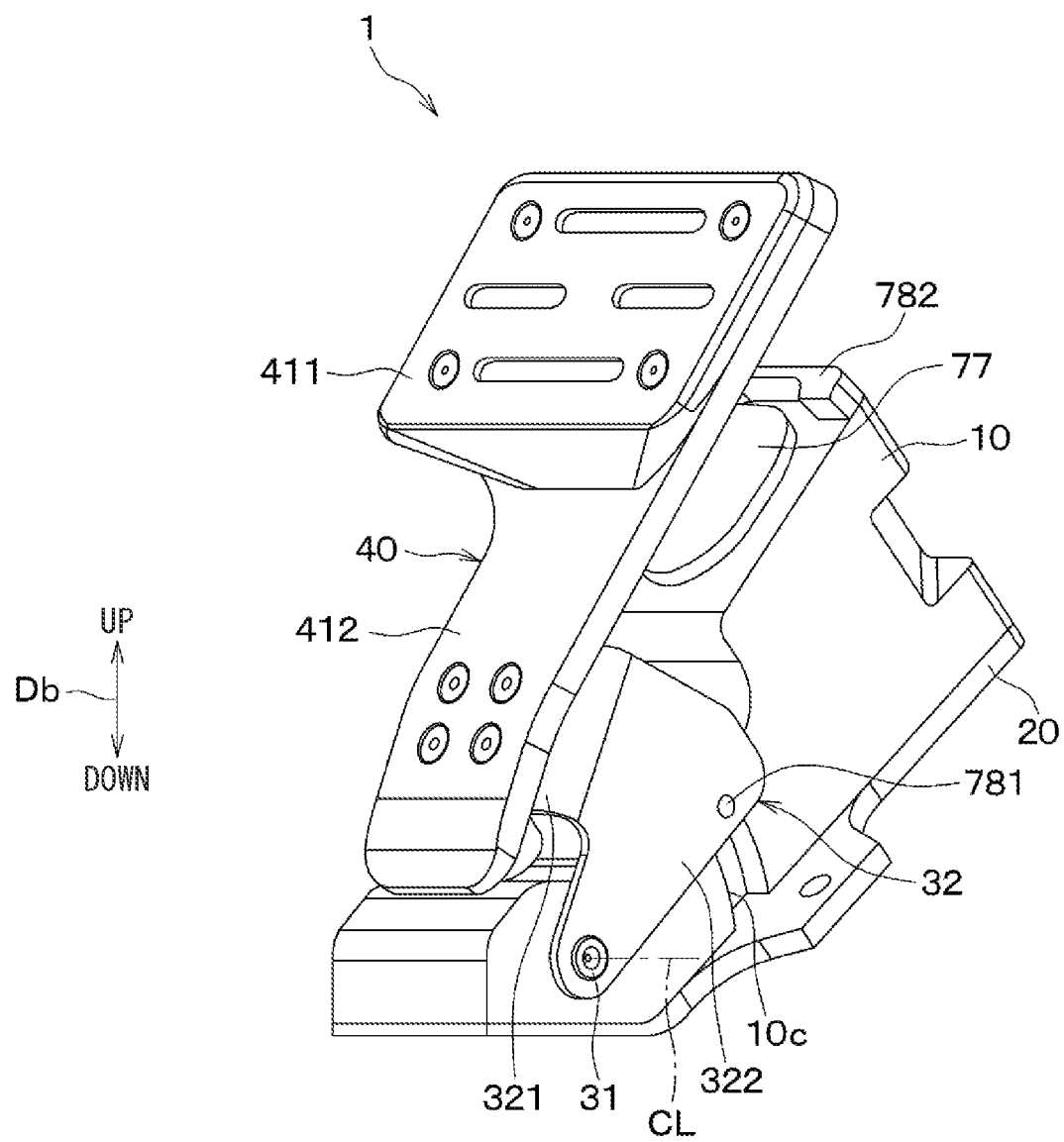
FIG. 2 is a perspective view of the pedal device of the first embodiment.
Figure 3:
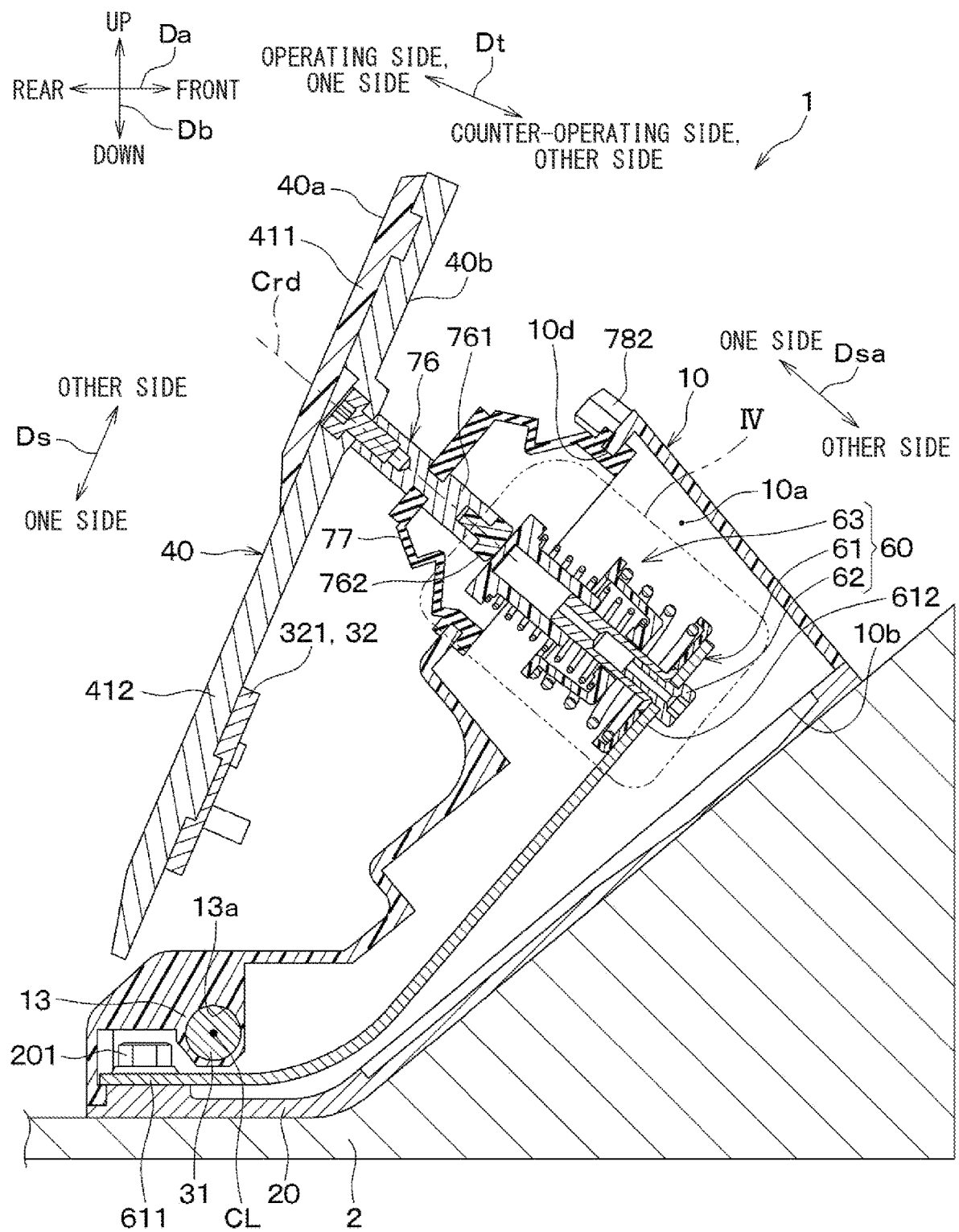
FIG. 3 is a cross-sectional view showing a cross-section of the pedal device of the first embodiment which is perpendicular to a pedal central axis.

As shown in FIGS. 1 to 3, the pedal device 1 includes a housing 10, a base plate 20, a rotatable shaft 31, a coupling plate 32, a pedal 40, a reaction force generation mechanism 60, a coupling rod 76, a cover member 77 and a rotational angle sensor 79. The pedal device 1 is an organ-type pedal device (or simply referred to as an organ pedal device).

As shown in FIGS. 2 and 3, the organ-type pedal device 1 refers to a pedal device in which a portion of the pedal 40, which is depressed by the driver 81, is placed on the vehicle upper side (in other words, the upper side in the vertical direction in a state where the pedal device is installed to the vehicle) of a swing center CL of the pedal 40. In the organ-type pedal device 1, the pedal 40 is swung such that the portion of the pedal 40, which is located on the vehicle upper side of the swing center CL, is brought toward a floor 2 or a dash panel in a vehicle cabin when the depression force of the driver 81 applied to the pedal 40 is increased. The swing center CL of the pedal 40 is a rotational center of the pedal 40 at the time of executing the swing motion of the pedal 40. Furthermore, in the description of the present embodiment, the swing center CL of the pedal 40 is also referred to as a pedal central axis CL.

The housing 10 is installed to the floor 2 or the dash panel, which is a portion of a vehicle body, through the base plate 20. That is, each of the housing 10 and the base plate 20 is a non-rotatable member that is fixed to the vehicle body and does not rotate.

The housing 10 and the base plate 20 are integrally fixed together and are fixed to the floor 2. For example, the housing 10 is fixed to the base plate 20 by, for example, bolts, and the base plate 20 is fixed to the floor 2 by, for example, bolts. The housing 10 and the base plate 20 are installed to the floor 2 in the above-described manner. The housing 10 and the base plate 20 function as a support body that supports the pedal 40, the reaction force generation mechanism 60. The floor 2 constitutes a floor of the vehicle cabin. Furthermore, the dash panel is a partition wall which partitions between an outside (e.g., an engine compartment of the vehicle 80) and an inside of the vehicle cabin, and the dash panel is also sometimes referred to as a bulkhead.

A housing space 10a, which serves as an inside space, is formed at an inside of the housing 10. The housing space 10a is opened toward the floor 2 side in a state where the housing 10 is still an unassembled single component. An opening 10b, which is an opening of the housing space 10a, is closed by the base plate 20 when the base plate 20 is installed to the housing 10. The reaction force generation mechanism 60 is installed in the housing space 10a.

The base plate 20 is, for example, a plate member and is installed to an opposite side of the housing 10 which is opposite to the pedal 40. Specifically, the base plate 20 is placed on the floor 2 side of the housing 10 and is clamped between the housing 10 and the floor 2 in a vehicle installed state where the pedal device 1 is installed to the floor 2.

The base plate 20 continuously extends from a front side portion of the housing 10, which is located on the vehicle front side, to a rear side portion of the housing 10, which is located on the vehicle rear side, and the base plate 20 is fixed to the floor 2 of the vehicle 80 by the bolts as discussed above. The base plate 20 is made of, for example, a metal material.

The rotatable shaft 31 is rotatably supported by a rotatable shaft support portion 13 that forms a portion of the housing 10. Specifically, a rotatable shaft hole 13a, which extends in an axial direction of the pedal central axis CL, is formed at an inside of the rotatable shaft support portion 13, and the rotatable shaft 31 is inserted into the rotatable shaft hole 13a.

Furthermore, the rotational angle sensor 79 (see FIG. 1) is installed at the rotatable shaft support portion 13. A contactless-type sensor, which uses, for example, a Hall IC or a magnetoresistive element, may be used as the rotational angle sensor 79, or a contact-type sensor may be used as the rotational angle sensor 79.

The rotational angle sensor 79, which is installed to the rotatable shaft support portion 13, senses a rotational angle of the rotatable shaft 31 and outputs an electrical signal indicating the rotational angle of the rotatable shaft 31 to the electronic controller unit 83 (see FIG. 1). The pedal 40 and the rotatable shaft 31 are fixed together and are rotated together. Therefore, the rotational angle of the rotatable shaft 31 is the same as a rotational angle of the pedal 40.

The coupling plate 32 is installed to a pedal back surface 40b of the pedal 40 that is an opposite surface of the pedal 40 which is opposite to a receiving surface of the pedal 40 for receiving the depression force from the driver 81. The coupling plate 32 couples between the pedal 40 and the rotatable shaft 31 to rotate the pedal 40 and the rotatable shaft 31 together. The coupling plate 32 includes: a back plate portion 321 which is fixed to the pedal back surface 40b of the pedal 40; and a lateral plate portion 322 which is arranged perpendicular or generally perpendicular to the back plate portion 321. The back plate portion 321 of the coupling plate 32 is fixed to the pedal 40 by, for example, screwing.

The lateral plate portion 322 of the coupling plate 32 is arranged at a lateral side of the housing 10, and one end of the rotatable shaft 31 is fixed to the lateral plate portion 322. As described above, the pedal 40 and the rotatable shaft 31 are fixed to the coupling plate 32, so that the coupling plate 32, the pedal 40 and the rotatable shaft 31 are rotated integrally about the pedal central axis CL.

Furthermore, the rotatable shaft 31 is coupled to the pedal 40 through the coupling plate 32. Therefore, the pedal 40 is spaced from the rotatable shaft support portion 13 of the housing 10 without contacting the rotatable shaft support portion 13 at any rotational angle of the pedal 40 within a movable range of the pedal 40.

The pedal 40 is shaped in a plate form that hat a thickness in a plate thickness direction Dt and extends in an extending direction Ds, and the pedal 40 is made of, for example, a metal material or a resin material. When the pedal 40 is depressed by a foot of the driver 81 from one side in the plate thickness direction Dt, the pedal 40 is swung about the pedal central axis CL. Therefore, the one side of the pedal 40 in the plate thickness direction Dt is an operating side of the pedal 40, at which the pedal 40 is depressed by the foot of the driver 81. Furthermore, the other side of the pedal 40, which is opposite to the one side in the plate thickness direction Dt, is a counter-operating side of the pedal 40 that is opposite to the operating side of the pedal 40.

Specifically, the housing 10 supports the pedal 40 through the rotatable shaft 31 such that the pedal 40 can be swung about the pedal central axis CL. Furthermore, since the pedal 40 is fixed to the rotatable shaft 31 through the coupling plate 32, the pedal 40 is swung integrally with the rotatable shaft 31 about the pedal central axis CL when the pedal 40 is depressed by the driver 81 during the depressing operation of the pedal 40.

In the present embodiment, the axial direction of the pedal central axis CL, the plate thickness direction Dt of the pedal 40 and the extending direction Ds of the pedal 40 are directions, which intersect with each other, more specifically are perpendicular to each other. Furthermore, in the description of the present embodiment, the plate thickness direction Dt of the pedal 40 is also referred to as a pedal plate thickness direction Dt, and the extending direction Ds of the pedal 40 is also referred to as a pedal extending direction Ds.

In the undepressed state (in other words, a released state) where the pedal 40 is not depressed by the foot of the driver 81, the pedal 40 is arranged oblique to the vehicle front-to-rear direction Da. Specifically, the pedal 40 is arranged oblique such that an upper end portion of the pedal 40 is placed at a position which is on the vehicle front side and also the vehicle upper side of a lower end portion of the pedal 40. Specifically, in the undepressed state of the pedal 40, one side of the pedal 40, which is located on one side in the pedal extending direction Ds, is placed on the vehicle down side of the other side of the pedal 40, which is located on the other side in the pedal extending direction Ds. In the present embodiment, even in a maximum depressed state of the pedal 40 described later, the one side of the pedal 40, which is located on the one side in the pedal extending direction Ds, is placed on the vehicle down side of the other side of the pedal 40, which is located on the other side in the pedal extending direction Ds.

Furthermore, the thickness of the pedal 40 is not constant. That is, the pedal 40 has a thick-wall portion 411 and a thin-wall portion 412, while the thin-wall portion 412 is located on the one side of the thick-wall portion 411 in the pedal extending direction Ds. The thickness of the thick-wall portion 411 is larger than the thickness of the thin-wall portion 412. For example, the thick-wall portion 411 is configured such that a plate portion, which extends from the thin-wall portion 412 and has the same thickness as that of the thin-wall portion 412, is provided with another plate component which is stacked on this plate portion on one side in the plate thickness direction Dt. In the present embodiment, a surface of the thick-wall portion 411, which faces the one side in the pedal plate thickness direction Dt, functions as a tread surface 40a of the pedal 40 which is depressed by the foot of the driver 81 during the depressing operation.

Furthermore, the pedal 40 has the pedal back surface 40b which is located on the other side of the pedal 40 in the pedal plate thickness direction Dt. The pedal back surface 40b is an outside surface that faces the other side in the pedal plate thickness direction Dt. The pedal back surface 40b extends along an entire extent of the pedal 40 in the pedal extending direction Ds.

Here, with respect to a positional relationship between the pedal 40 and the rotatable shaft 31, the rotatable shaft 31 is placed on the other side of the pedal back surface 40b in the pedal plate thickness direction Dt. Furthermore, the housing 10 and the reaction force generation mechanism 60 are placed on the other side of the pedal 40 in the pedal plate thickness direction Dt.

As shown in FIGS. 2 and 3, in response to the depressing operation by the driver 81, the pedal 40 is swung about the pedal central axis CL within a predetermined rotational angle range (in other words, a movable range) which is less than one full rotation. The above-discussed rotational angle range at the time of the swing motion of the pedal 40 is specifically a range that is from a smallest rotational angle position to a largest rotational angle position of the pedal 40. That is, in the undepressed state of the pedal 40, the rotational angle of the pedal 40 is set to a rotational angle of the smallest rotational angle position. Furthermore, in the maximum depressed state of the pedal 40 where the pedal 40 is most depressed by the driver 81, the rotational angle of the pedal 40 is set to a rotational angle of the largest rotational angle position.

FIGS. 2 and 3 show the pedal device 1 in the case where the pedal 40 is placed in the undepressed state, i.e., the released state where the depression force of the driver 81 is not applied to the pedal 40. Similarly, FIG. 4, which will be described later, indicates the reaction force generation mechanism 60 and the coupling rod 76 in the case where the pedal 40 is in the undepressed state.

For example, when the depression force of the driver 81, which is applied to the pedal 40 from the one side in the pedal plate thickness direction Dt, is increased, the upper end portion of the pedal 40 is swung toward the vehicle front side and the vehicle down side within the rotational angle range described above. That is, when the depression force of the driver 81 is increased, the pedal 40 is progressively swung downward from the position of the pedal 40 shown in FIG. 3. In contrast, when the depression force of the driver 81, which is applied to the pedal 40 from the one side in the pedal plate thickness direction Dt, is decreased, the upper end portion of the pedal 40 is swung by the action of the reaction force generation mechanism 60 toward the vehicle rear side and the vehicle upper side. That is, when the depression force of the driver 81 is decreased, the pedal 40 is swung toward the upright position of the pedal 40, although the pedal 40 is still tilted.

In the present embodiment, the smallest rotational angle position of the pedal 40 is defined by a release-time stopper 781, which serves as a first stopper, and the largest rotational angle position of the pedal 40 is defined by a depression-time stopper 782, which serves as a second stopper.

The release-time stopper 781 is a shaft that is fixed to the lateral plate portion 322 of the coupling plate 32 and projects from the lateral plate portion 322 toward the housing 10 in the axial direction of the pedal central axis CL. The release-time stopper 781 is inserted in a stopper groove 10c which is formed at a lateral surface of the housing 10 and arcuately extends, and the release-time stopper 781 is moved in the stopper groove 10c in response to the swing motion of the pedal 40. In the undepressed state of the pedal 40, the release-time stopper 781 contacts the housing 10 at an end portion of the stopper groove 10c in a circumferential direction of the pedal central axis CL and thereby, the pedal 40 is held in the smallest rotational angle position.

The depression-time stopper 782 is formed at the housing 10 at a location that is on the vehicle front side of the pedal central axis CL. Specifically, the depression-time stopper 782 is formed at an upper end portion of a wall surface of the housing 10 placed on the vehicle front side. In the maximum depressed state of the pedal 40, the depression-time stopper 782 contacts an upper end portion or an area adjacent to thereof of the pedal back surface 40b and holds the pedal 40 at the largest rotational angle position.

The reaction force generation mechanism 60 generates a reaction force against the depression force which is applied from the driver 81 to the pedal 40. Since the reaction force generation mechanism 60 is received in the housing 10, the reaction force generation mechanism 60 is placed on the counter-operating side of the pedal 40. Furthermore, the reaction force generation mechanism 60 is supported by the base plate 20 at the inside of the housing 10. Specifically, a plate spring 61 of the reaction force generation mechanism 60 is fixed to the base plate 20 by a bolt 201, so that the reaction force generation mechanism 60 is supported by the base plate 20.

The reaction force generation mechanism 60 includes the plate spring 61, a fastening member 62 and a resilient unit 63. The plate spring 61 has: one end portion 611, which serves as a fixed end of the plate spring 61; and the other end portion 612, which serves as a free end of the plate spring 61. The one end portion 611 of the plate spring 61 is screwed and is fixed to the base plate 20 by the bolt 201. Furthermore, the resilient unit 63 is installed to the other end portion 612 of the plate spring 61 by the fastening member 62.

The plate spring 61 can be flexed to move the other end portion 612 relative to the one end portion 611 along an imaginary plane which is perpendicular to the pedal central axis CL. Therefore, in the case where the depression force of the driver 81 is applied to the other end portion 612 of the plate spring 61 through the depressing operation of the pedal 40 by the driver 81, when the depression force of the driver 81 is increased, the plate spring 61 is flexed to move the other end portion 612 toward the base plate 20.

Figure 4:
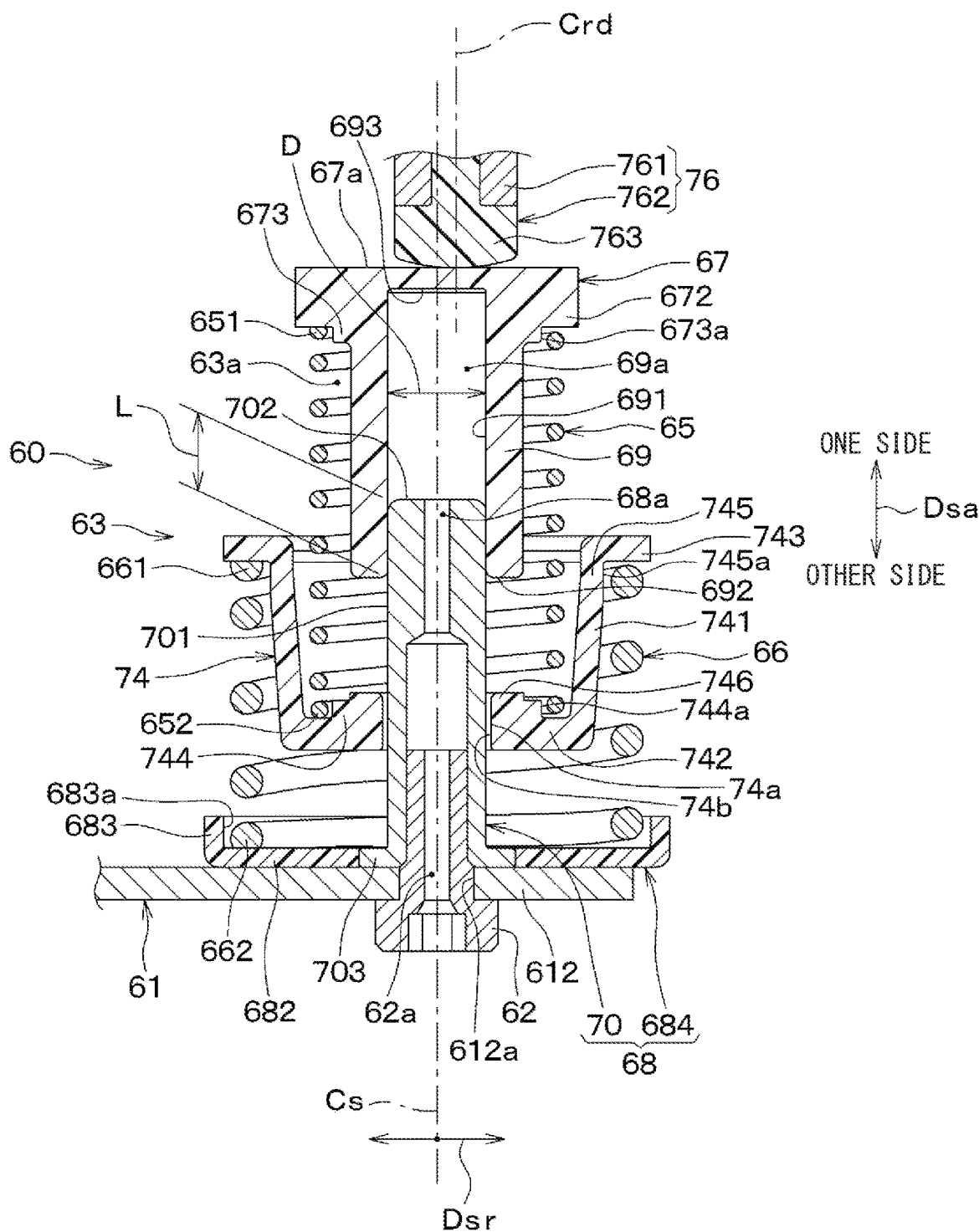
FIG. 4 is a partial enlarged view of a portion IV in FIG. 3 in the first embodiment.

As shown in FIGS. 3 and 4, the resilient unit 63 includes a plurality of constituent members (e.g., coil springs 65, 66, holders 67, 68 and a spring seat 74), and a unit central axis Cs, which extends in one direction (predetermined direction), serves as a central axis of these constituent members. In the description of the present embodiment, an axial direction Dsa of the unit central axis Cs is also referred to as a unit axial direction Dsa, and a radial direction Dsr of the unit central axis Cs is also referred to as a unit radial direction Dsr. The unit axial direction Dsa serves as one direction (predetermined direction) of the present disclosure.

The unit axial direction Dsa is an intersecting direction, which intersects the axial direction of the pedal central axis CL, more specifically a perpendicular direction, which is perpendicular to the axial direction of the pedal central axis CL. Furthermore, the unit radial direction Dsr is a perpendicular direction that is perpendicular to the unit axial direction Dsa. Furthermore, in the description of the present embodiment, one side in the unit axial direction Dsa refers to the pedal 40 side of the resilient unit 63 in a case where the resilient unit 63 is used as a reference. Furthermore, the other side in the unit axial direction Dsa refers to the opposite side (e.g., the base plate 20 side) of the resilient unit 63, which is opposite to the pedal 40, in the case where the resilient unit 63 is used as the reference.

Furthermore, although the unit axial direction Dsa can be tilted relative to the pedal plate thickness direction Dt depending on the rotational angle of the pedal 40, the one side in the unit axial direction Dsa is one of the one side and the other side in the pedal plate thickness direction Dt. Also, the other side in the unit axial direction Dsa is the other one of the one side and the other side in the pedal plate thickness direction Dt.

Specifically, the resilient unit 63 includes: at least one resilient member 65, 66 which can be resiliently deformed in the unit axial direction Dsa; the first holder 67; the second holder 68; and the spring seat 74. In the present embodiment, the at least one resilient member 65, 66 is at least one coil spring 65, 66 and more specifically is a plurality of coil springs 65, 66 that include a first coil spring 65 and a second coil spring 66.

Each of the first coil spring 65 and the second coil spring 66 is a compression coil spring. For example, in the undepressed state of the pedal 40, although the amount of resilient compression of each of the first coil spring 65 and the second coil spring 66 becomes the smallest, the resiliently compressed state of each of the first coil spring 65 and the second coil spring 66 is maintained.

Since a central axis of the first coil spring 65 is the unit central axis Cs, an axial direction of the first coil spring 65 is the unit axial direction Dsa, and a radial direction of the first coil spring 65 is the unit radial direction Dsr. Likewise, since a central axis of the second coil spring 66 is the unit central axis Cs, an axial direction of the second coil spring 66 is the unit axial direction Dsa, and a radial direction of the second coil spring 66 is the unit radial direction Dsr.

The first coil spring 65 has: one end portion 651, which is located on the one side in the unit axial direction Dsa; and the other end portion 652, which is located on the other side in the unit axial direction Dsa. The second coil spring 66 has: one end portion 661, which is located on the one side in the unit axial direction Dsa; and the other end portion 662, which is located on the other side in the unit axial direction Dsa.

Furthermore, an outer diameter of the first coil spring 65 is smaller than an inner diameter of the second coil spring 66. In the undepressed state of the pedal 40, a portion of the first coil spring 65 is placed on an inner side of the second coil spring 66 in the unit radial direction Dsr to overlap with the second coil spring 66.

Specifically, in the undepressed state of the pedal 40, the first coil spring 65 is displaced from the second coil spring 66 toward the one side in the unit axial direction Dsa. Furthermore, one portion of the first coil spring 65, which is located on the other side in the unit axial direction Dsa, is radially placed on an inner side of one portion of the second coil spring 66, which is located on the one side in the unit axial direction Dsa, in the unit radial direction Dsr, and this one portion of the first coil spring 65 overlaps with this one portion of the second coil spring 66, and a radial gap is formed between this one portion of the first coil spring 65 and this one portion of the second coil spring 66.

Therefore, the other end portion 652 of the first coil spring 65 is placed on the inner side of the second coil spring 66 in the unit radial direction Dsr to overlap with the second coil spring 66, and this other end portion 652 of the first coil spring 65 serves as a first spring seat side end portion of the present disclosure. Furthermore, the one end portion 661 of the second coil spring 66 is placed on the outer side of the first coil spring 65 in the unit radial direction Dsr to overlap with the first coil spring 65, and this one end portion 661 of the second coil spring 66 serves as a second spring seat side end portion of the present disclosure.

The first holder 67 has a portion that is placed on the one side of the first coil spring 65 in the unit axial direction Dsa. The first holder 67 is placed on the other side of the coupling rod 76, which is coupled to the pedal 40, in the unit axial direction Dsa, and the first holder 67 contacts the coupling rod 76. Therefore, the first holder 67 is urged by the pedal 40 through the coupling rod 76 toward the other side in the unit axial direction Dsa. The first holder 67 transmits the depression force of the driver 81, which is received from the pedal 40, to the first and second coil springs 65, 66 and the plate spring 61.

The housing 10 has an opening hole 10d, which opens toward the pedal 40. Therefore, the coupling rod 76 can contact the first holder 67.

The first holder 67 includes: an outer guide portion 69, which is shaped in a tubular form and extends in the unit axial direction Dsa; a first contact portion 672, which is formed around the outer guide portion 69; and a first spring guide portion 673. The outer guide portion 69, the first contact portion 672 and the first spring guide portion 673 are formed integrally in one-piece. For example, the first holder 67 is made of a resin material.

The outer guide portion 69 is inserted into an inside space 63a which is formed on an inner side of the first coil spring 65. The inside space 63a is located on the inner side of all of the coil springs 65, 66 of the resilient unit 63 and is also referred to as a spring inside space 63a.

Furthermore, an inside space is formed on an inner side of the outer guide portion 69 shaped in the tubular form, and this inside space, which is shaped in a tubular form, is closed on the one side in the unit axial direction Dsa and opens on the other side in the unit axial direction Dsa. Specifically, the tubular form of the outer guide portion 69 is a bottomed tubular form that has the bottom on the one side in the unit axial direction Dsa.

The outer guide portion 69 has an inner peripheral surface 691 that faces an inner side of the outer guide portion 69 shaped in the tubular form. Furthermore, the tubular form of the outer guide portion 69 is specifically a cylindrical tubular form that has a central axis which coincides with the unit central axis Cs. Therefore, in a cross-section that is perpendicular to the unit axial direction Dsa, the inner peripheral surface 691 of the outer guide portion 69 has a circular shape that is centered on the unit central axis Cs.

Furthermore, the outer guide portion 69 has: a distal end surface 692, which is formed at a distal end of the outer guide portion 69 located on the other side in the unit axial direction Dsa; and a tube bottom surface 693, which forms an end of the inside space of the outer guide portion 69 and faces the inside space from the one side in the unit axial direction Dsa. The distal end surface 692 and the tube bottom surface 693 of the outer guide portion 69 face the other side in the unit axial direction Dsa.

The first contact portion 672 is placed on the one side of the first coil spring 65 in the unit axial direction Dsa and extends outward in the unit radial direction Dsr from the end portion of the outer guide portion 69 which faces the one side in the unit axial direction Dsa, while the first contact portion 672 is shaped in a form of a flange. The first contact portion 672 does not contact the second coil spring 66 among the first and second coil springs 65, 66 and contacts the one end portion 651 of the first coil spring 65 from the one side in the unit axial direction Dsa. In the present embodiment, the one end portion 651 of the first coil spring 65 serves as a first spring end portion of the present disclosure which contacts the first holder 67.

Furthermore, the first holder 67 has a pressable surface 67a which faces the one side in the unit axial direction Dsa. The pressable surface 67a is shaped as a circular planar surface that does not have a projection, a recess and a hole, and a normal direction, which is normal to the pressable surface 67a, coincides with the unit axial direction Dsa.

The second holder 68 has a portion that is placed on the other side of the second coil spring 66 in the unit axial direction Dsa. The second holder 68 is configured to receive the depression force of the driver 81, which is transmitted to the second coil spring 66. The second holder 68 is placed on the one side of the other end portion 612 of the plate spring 61 in the unit axial direction Dsa and is fixed to the other end portion 612 of the plate spring 61.

The second holder 68 includes: an inner guide portion 70 which is shaped in a rod form and extends in the unit axial direction Dsa; a second contact portion 682, which is formed around the inner guide portion 70; and a second spring guide portion 683. The second contact portion 682 and the second spring guide portion 683 are formed integrally in one-piece and form a flange member 684 that is a one-piece component formed integrally in one-piece. The inner guide portion 70 is a component that is formed separately from the flange member 684. Specifically, in the second holder 68, the inner guide portion 70 and the second contact portion 682 are separately formed as separate components, respectively. For example, the flange member 684 is made of a resin material, and the inner guide portion 70 is made of a metal material.

The inner guide portion 70 is inserted into the outer guide portion 69 from the other side in the unit axial direction Dsa. Specifically, the inner guide portion 70 is fitted into the outer guide portion 69 such that the inner guide portion 70 is movable relative to the outer guide portion 69 in the unit axial direction Dsa. In the pedal device 1, the outer guide portion 69 is reciprocated relative to the inner guide portion 70 in the unit axial direction Dsa in response to the swing motion of the pedal 40.

The inner guide portion 70 has an outer peripheral surface 701 that is opposed to and contacts the inner peripheral surface 691 of the outer guide portion 69 in the unit radial direction Dsr. The outer peripheral surface 701 of the inner guide portion 70 contacts the inner peripheral surface 691 of the outer guide portion 69 along an entire circumferential extent of the inner guide portion 70 in the circumferential direction. Therefore, in the cross-section that is perpendicular to the unit axial direction Dsa, the outer peripheral surface 701 of the inner guide portion 70 has a circular shape that is centered on the unit central axis Cs like the inner peripheral surface 691 of the outer guide portion 69. The outer guide portion 69 and the inner guide portion 70 enable relative movement between the first holder 67 and the second holder 68 in the unit axial direction Dsa and limits relative movement between the first holder 67 and the second holder 68 in the unit radial direction Dsr through the slidable contact between the inner peripheral surface 691 and the outer peripheral surface 701.

The inner guide portion 70 has: a distal end surface 702, which is formed at a distal end of the inner guide portion 70 located on the one side in the unit axial direction Dsa; and a proximal end portion 703, which is formed at the other end of the inner guide portion 70 located on the other side in the unit axial direction Dsa. Since the inner guide portion 70 is inserted into the outer guide portion 69, the distal end surface 702 of the inner guide portion 70 is placed at the inside of the outer guide portion 69.

The second contact portion 682 is placed on the other side of the second coil spring 66 in the unit axial direction Dsa and extends outward in the unit radial direction Dsr from the proximal end portion 703 of the inner guide portion 70, while the second contact portion 682 is shaped in a form of a flange. The second contact portion 682 does not contact the first coil spring 65 among the first and second coil springs 65, 66 and contacts the other end portion 662 of the second coil spring 66 from the other side in the unit axial direction Dsa. In the present embodiment, the other end portion 662 of the second coil spring 66 serves as a second spring end portion of the present disclosure which contacts the second holder 68.

The second contact portion 682 and the proximal end portion 703 of the inner guide portion 70 are placed on the one side of the plate spring 61 in the unit axial direction Dsa and contacts the other end portion 612 of the plate spring 61.

The fastening member 62 is a bolt, which fixes the inner guide portion 70 to the other end portion 612 of the plate spring 61, and the fastening member 62 serves as a fastener of the present disclosure. The fastening member 62 is inserted into a through-hole 612a of the other end portion 612 of the plate spring 61 from the other side in the unit axial direction Dsa and is threadably engaged with (screwed with) a female thread formed at the inner guide portion 70. In this way, the fastening member 62 extends through the other end portion 612 of the plate spring 61 and fixes the inner guide portion 70 to the other end portion 612 of the plate spring 61.

Furthermore, since the proximal end portion 703 of the inner guide portion 70 is fitted into a hole of the flange member 684, the flange member 684 is not movable relative to the inner guide portion 70 in the unit radial direction Dsr. Furthermore, the flange member 684 is urged against the other end portion 612 of the plate spring 61 by the second coil spring 66. Therefore, when the inner guide portion 70 is fixed to the other end portion 612 of the plate spring 61 by the fastening member 62, the flange member 684 is also fixed to the other end portion 612 of the plate spring 61.

As discussed above, the second holder 68 is fixed to the other end portion 612 of the plate spring 61, which is the member placed between the base plate 20 and the second holder 68, by screwing with the fastening member 62. The second holder 68 is coupled to the base plate 20 through the plate spring 61.

As shown in FIG. 4, the tube inside space 69a, into which the distal end surface 702 of the inner guide portion 70 is exposed, is formed at the inside of the outer guide portion 69. A communication hole 68a, which communicates the tube inside space 69a to an outside of the tube inside space 69a, is formed at an inside of the inner guide portion 70 of the second holder 68. The communication hole 68a extends in the unit axial direction Dsa.

Specifically, a fastener through-hole 62a, which extends through the fastening member (i.e., the fastener) 62 in the unit axial direction Dsa, is formed at the inside of the fastening member 62. One end of the communication hole 68a is communicated with the tube inside space 69a, and the other end of the communication hole 68a is communicated with the fastener through-hole 62a. Therefore, the tube inside space 69a is communicated to the outside of the tube inside space 69a through the communication hole 68a and the fastener through-hole 62a. The communication hole 68a and the fastener through-hole 62a cooperate together serve as a breathing hole that enables inflow and outflow of the air relative to the tube inside space 69a.

The first spring guide portion 673 of the first holder 67 is placed on the inner side of the one end portion 651 of the first coil spring 65 in the unit radial direction Dsr and projects outward from the outer guide portion 69 in the unit radial direction Dsr. The first spring guide portion 673 has a first opposing surface 673a that is opposed to the one end portion 651 of the first coil spring 65 in the unit radial direction Dsr. The first opposing surface 673a is shaped in a circular ring form (cylindrical form) centered on the unit central axis Cs and faces outward in the unit radial direction Dsr.

Among portions of the first holder 67, which are opposed to the first coil spring 65 in the unit radial direction Dsr, the first opposing surface 673a is a closest portion of the first holder 67, which is the closest to the first coil spring 65 in the unit radial direction Dsr. For example, the first opposing surface 673a may contact the one end portion 651 of the first coil spring 65 in the unit radial direction Dsr or may be placed such that a small radial gap is interposed between the one end portion 651 of the first coil spring 65 and the first opposing surface 673a.

Because of the configuration described above, in a case where some kind of load is applied to the first coil spring 65 to cause positional deviation of the one end portion 651 of the first coil spring 65 in the unit radial direction Dsr relative to the pedal central axis CL, the first coil spring 65 first abuts against the first opposing surface 673a in the unit radial direction Dsr among the portions of the first holder 67. That is, the first opposing surface 673a limits the positional deviation of the one end portion 651 of the first coil spring 65 relative to the first holder 67 in the unit radial direction Dsr.

The second spring guide portion 683 of the second holder 68 is placed on the outer side of the other end portion 662 of the second coil spring 66 in the unit radial direction Dsr and projects from an outer periphery of the second contact portion 682 toward the one side in the unit axial direction Dsa. The second spring guide portion 683 has a second opposing surface 683a that is opposed to the other end portion 662 of the second coil spring 66 in the unit radial direction Dsr. The second opposing surface 683a is shaped in a circular ring form (cylindrical form) centered on the unit central axis Cs and faces inward in the unit radial direction Dsr.

Among portions of the second holder 68, which are opposed to the second coil spring 66 in the unit radial direction Dsr, the second opposing surface 683a is a closest portion of the second holder 68, which is the closest to the second coil spring 66 in the unit radial direction Dsr. For example, the second opposing surface 683a may contact the other end portion 662 of the second coil spring 66 in the unit radial direction Dsr or may be placed such that a small radial gap is interposed between the other end portion 662 of the second coil spring 66 and the second opposing surface 683a.

Because of the configuration described above, in a case where some kind of load is applied to the second coil spring 66 to cause positional deviation of the other end portion 662 of the second coil spring 66 in the unit radial direction Dsr relative to the pedal central axis CL, the second coil spring 66 first abuts against the second opposing surface 683a in the unit radial direction Dsr among the portions of the second holder 68. That is, the second opposing surface 683a limits the positional deviation of the other end portion 662 of the second coil spring 66 relative to the second holder 68 in the unit radial direction Dsr.

The spring seat 74 is placed on the outer side of the inner guide portion 70 in the unit radial direction Dsr. The first coil spring 65 and the second coil spring 66 are coupled with each other through the spring seat 74. The first coil spring 65 and the second coil spring 66 urge against each other through the spring seat 74 when the first coil spring 65 and the second coil spring 66 are respectively compressed and deformed. That is, in a transmission path, which transmits the depression force between the pedal 40 and the base plate 20, the first coil spring 65, the second coil spring 66 and the plate spring 61 are arranged in this order in series. The spring seat 74 of the present embodiment is made of a resin material.

The spring seat 74 includes an extending portion 741, a spring seat inner portion 742, a spring seat outer portion 743 and a hole forming portion 746 which are formed integrally in one-piece. The extending portion 741 is shaped in a cylindrical tubular form which extends in the unit axial direction Dsa and has a central axis that coincides with the unit central axis Cs. The extending portion 741 is placed between the first coil spring 65 and the second coil spring 66 in the unit radial direction Dsr.

The spring seat inner portion 742 extends inwardly from the extending portion 741 in the unit radial direction Dsr and is placed on the outer side of the inner guide portion 70 in the unit radial direction Dsr. For example, the spring seat inner portion 742 extends from an end portion of the extending portion 741, which is located on the other side in the unit axial direction Dsa. The spring seat inner portion 742 contacts the other end portion 652 of the first coil spring 65 from the other side in the unit axial direction Dsa and is opposed to the other end portion 652 of the first coil spring 65 in the unit axial direction Dsa.

Furthermore, the spring seat inner portion 742 has an insertion hole 74a. The insertion hole 74a extends through the spring seat inner portion 742 in the unit axial direction Dsa and has a circular cross-section which is centered on the unit central axis Cs. The inner guide portion 70 is inserted through the insertion hole 74a. That is, the spring seat inner portion 742 has an insertion hole inner peripheral surface 74b shaped in a circular ring form (cylindrical form). The insertion hole inner peripheral surface 74b faces inward in the unit radial direction Dsr and is exposed to the insertion hole 74a. The insertion hole inner peripheral surface 74b is opposed to the outer peripheral surface 701 of the inner guide portion 70.

Specifically, the hole forming portion 746, which is shaped in a tubular form, projects from an inner periphery of the spring seat inner portion 742 toward the one side in the unit axial direction Dsa. The insertion hole 74a has a circular cross-section and is placed on the inner side of the hole forming portion 746 and the spring seat inner portion 742 to extend through the spring seat 74 in the unit axial direction Dsa. Therefore, the insertion hole inner peripheral surface 74b is located on the inner side of the hole forming portion 746 and the spring seat inner portion 742. In a state where the inner guide portion 70 is inserted through the insertion hole 74a, the inner guide portion 70 is fitted in the insertion hole 74a such that the inner guide portion 70 is movable relative to the insertion hole 74a in the unit axial direction Dsa.

Here, in the middle of the swing motion of the pedal 40 in response to the depressing operation of the pedal 40 by the driver 81, the spring seat 74 abuts against one or both of the first and second holders 67, 68 in the unit axial direction Dsa upon the compression of the first coil spring 65 and the second coil spring 66. A size of the insertion hole 74a is set such that the insertion hole inner peripheral surface 74b does not arrest the inner guide portion 70 in the unit radial direction Dsr in the case where the spring seat 74 abuts against the one or both of the first and second holders 67, 68 in the unit axial direction Dsa.

That is, when the spring seat 74 abuts against the one or both of the first and second holders 67, 68 in the unit axial direction Dsa, the spring seat 74 may possibly be tilted relative to the inner guide portion 70. Furthermore, the size of the insertion hole 74a is set such that even when the spring seat 74 is tilted relative to the inner guide portion 70, the insertion hole inner peripheral surface 74b and the inner guide portion 70 do not rub against each other in response to the tilting of the spring seat 74 relative to the inner guide portion 70. In short, the diameter of the insertion hole 74a is set such that a radial gap, which has a sufficient size to avoid the rubbing between the insertion hole inner peripheral surface 74b and the inner guide portion 70, is formed between the insertion hole inner peripheral surface 74b and the inner guide portion 70.

For example, the fitting of the inner guide portion 70 relative to the insertion hole 74a is a looser fitting that is looser than the fitting of the inner guide portion 70 relative to the outer guide portion 69. A difference between a diameter of the insertion hole 74a (a diameter of the insertion hole inner peripheral surface 74b) and an outer diameter of the inner guide portion 70 is larger than a difference between an inner diameter of the outer guide portion 69 and the outer diameter of the inner guide portion 70. The outer diameter and the inner diameter discussed above is not a radius and is the diameter. Furthermore, the outer diameter of the inner guide portion 70 is, in other words, a diameter of the outer peripheral surface 701 of the inner guide portion 70, and the inner diameter of the outer guide portion 69 is, in other words, a diameter of the inner peripheral surface 691 of the outer guide portion 69.

The spring seat outer portion 743 is placed on the one side of the spring seat inner portion 742 in the unit axial direction Dsa. The spring seat outer portion 743 outwardly extends from the extending portion 741 in the unit radial direction Dsr and is shaped in a form of flange. For example, the spring seat outer portion 743 extends from one end portion of the extending portion 741, which is located on the one side in the unit axial direction Dsa. The spring seat outer portion 743 contacts the one end portion 661 of the second coil spring 66 from the one side in the unit axial direction Dsa and is opposed to the one end portion 661 of the second coil spring 66 in the unit axial direction Dsa.

The spring seat inner portion 742 has a spring seat inner guide portion 744 which projects toward the one side in the unit axial direction Dsa. The spring seat inner guide portion 744 is located on the inner side of the other end portion 652 of the first coil spring 65 in the unit radial direction Dsr. The spring seat inner guide portion 744 has a first spring seat opposing surface 744a that is opposed to the other end portion 652 of the first coil spring 65 in the unit radial direction Dsr. The first spring seat opposing surface 744a is shaped in a circular ring form (cylindrical form) centered on the unit central axis Cs and faces outward in the unit radial direction Dsr.

Among portions of the spring seat 74, which are opposed to the first coil spring 65 in the unit radial direction Dsr, the first spring seat opposing surface 744a is a closest portion of the spring seat 74, which is the closest to the first coil spring 65 in the unit radial direction Dsr. For example, the first spring seat opposing surface 744a may contact the other end portion 652 of the first coil spring 65 in the unit radial direction Dsr or may be placed such that a small radial gap is interposed between the other end portion 652 of the first coil spring 65 and the first spring seat opposing surface 744a.

Because of the configuration described above, in a case where some kind of load is applied to the first coil spring 65 to cause positional deviation of the other end portion 652 of the first coil spring 65 in the unit radial direction Dsr relative to the pedal central axis CL, the first coil spring 65 first abuts against the first spring seat opposing surface 744a in the unit radial direction Dsr among the portions of the spring seat 74. That is, the first spring seat opposing surface 744a limits the positional deviation of the other end portion 652 of the first coil spring 65 relative to the spring seat 74 in the unit radial direction Dsr.

The extending portion 741 has a spring seat outer guide portion 745 which is located on the one side in the unit axial direction Dsa. The spring seat outer guide portion 745 is located on the inner side of the one end portion 661 of the second coil spring 66 in the unit radial direction Dsr.

The spring seat outer guide portion 745 has a second spring seat opposing surface 745a that is opposed to the one end portion 661 of the second coil spring 66 in the unit radial direction Dsr. The second spring seat opposing surface 745a is shaped in a circular ring form (cylindrical form) centered on the unit central axis Cs and faces outward in the unit radial direction Dsr. That is, the second spring seat opposing surface 745a is located on the outer side of the extending portion 741 in the unit radial direction Dsr.

Among portions of the spring seat 74, which are opposed to the second coil spring 66 in the unit radial direction Dsr, the second spring seat opposing surface 745a is a closest portion of the spring seat 74, which is the closest to the second coil spring 66 in the unit radial direction Dsr. For example, the second spring seat opposing surface 745a may contact the one end portion 661 of the second coil spring 66 in the unit radial direction Dsr or may be placed such that a small radial gap is interposed between the one end portion 661 of the second coil spring 66 and the second spring seat opposing surface 745a.

Because of the configuration described above, in a case where some kind of load is applied to the second coil spring 66 to cause positional deviation of the one end portion 661 of the second coil spring 66 in the unit radial direction Dsr relative to the pedal central axis CL, the second coil spring 66 first abuts against the second spring seat opposing surface 745a in the unit radial direction Dsr among the portions of the spring seat 74. That is, the second spring seat opposing surface 745a limits the positional deviation of the one end portion 661 of the second coil spring 66 relative to the spring seat 74 in the unit radial direction Dsr.

With reference to FIGS. 3 and 4, the coupling rod 76 serves as a rod of the present disclosure. The coupling rod 76 is placed between the pedal 40 and the first holder 67 and couples between the pedal 40 and the first holder 67. The first holder 67 is depressed by the pedal 40 through the coupling rod 76 in response to the application of the depression force of the driver 81 to the pedal 40.

Specifically, the coupling rod 76 projects from the pedal 40 on the counter-operating side of the pedal 40 and extends along a rod central axis Crd which is a central axis Crd of the coupling rod 76. For example, the coupling rod 76 projects from the pedal back surface 40b which intersects the rod central axis Crd. The coupling rod 76 has a rod distal end portion 763 located on the counter-operating side (i.e., the first holder 67 side). The rod distal end portion 763 contacts the pressable surface 67a of the first holder 67.

The coupling rod 76 is coupled to the pedal 40 such that the projecting direction of the coupling rod 76, which projects from the pedal 40, is fixed. The above expression, i.e., "the projecting direction of the coupling rod 76 is fixed", means that the rod central axis Crd, which is the central axis Crd of the coupling rod 76, is fixed and does not change relative to the pedal 40. In the present embodiment, the coupling rod 76 is fixed to the pedal 40 by the bolt, so that the coupling rod 76 is not rotated about the rod central axis Crd. For example, the coupling rod 76 is fixed to the pedal 40 in a state where the rod distal end portion 763 is tilted relative to the pedal plate thickness direction Dt such that the rod distal end portion 763 is displaced relative to a proximal end of the coupling rod 76 toward the one side in the pedal extending direction Ds.

As described above, the rod distal end portion 763 of the coupling rod 76 coupled to the pedal 40 urges the pressable surface 67a of the first holder 67 and slides relative to the pressable surface 67a of the first holder 67 in response to the depressing operation of the pedal 40 by the driver 81. In FIG. 4, although the unit central axis Cs and the rod central axis Crd are parallel to each other, the unit central axis Cs and the rod central axis Crd are not necessarily parallel to each other. When the pedal 40 is swung, the coupling rod 76 is swung integrally with the pedal 40. Therefore, an angle, which is defined between the unit central axis Cs and the rod central axis Crd, changes in response to the swing motion of the pedal 40.

For example, in the present embodiment, the coupling rod 76 includes two components. Specifically, the coupling rod 76 includes: an arm portion 761, which is coupled to the pedal 40, and an urging portion 762 that is located on the opposite side of the arm portion 761, which is opposite to the pedal 40, while the urging portion 762 is coupled to the arm portion 761 in series. The urging portion 762 includes a rod distal end portion 763.

For example, the arm portion 761 and the urging portion 762 are separately formed as separate components, respectively, and the arm portion 761 and the urging portion 762 are securely coupled together by, for example, press-fitting. In the present embodiment, a material of the urging portion 762 is different from a material of the arm portion 761. For example, the arm portion 761 is made of a metal material, and the urging portion 762 is made of a resin material. The resin material of the urging portion 762 may be, for example, PTFE. In the case where the urging portion 762 is made of the PTFE, an advantage can be obtained such that a sliding property of the urging portion 762 relative to the pressable surface 67a of the first holder 67 is improved by the lower friction in comparison to a case where the urging portion 762 is made of, for example, a metal material. Here, PTFE stands for polytetrafluoroethylene.

As shown in FIGS. 2 and 3, the cover member 77 is referred to as a dust boot and is shaped in a form of a tubular bellows, while the cover member 77 is made of, for example, rubber that can be resiliently deformable. The cover member 77 is expanded and contracted in the axial direction of the coupling rod 76 in response to the swing motion of the pedal 40. For example, the cover member 77 closes the opening hole 10d of the housing 10 in a state where the coupling rod 76 is inserted through the cover member 77. In this way, intrusion of a foreign object into the inside of the housing 10 through the opening hole 10d is limited.

In the pedal device 1 configured in the above-described manner, when the depression force of the driver 81 is applied to the pedal 40, the pedal 40, the rotatable shaft 31 and the coupling plate 32 are swung about the pedal central axis CL, as shown in FIGS. 3 and 4. Specifically, a portion of each of the pedal 40, the rotatable shaft 31 and the coupling plate 32 located on the vehicle upper side of the pedal central axis CL is swung about the pedal central axis CL toward the floor 2 and the dash panel. In other words, the pedal 40 is swung from the undepressed state to the maximum depressed state.

At this time, the rotational angle sensor 79, which is installed to the pedal device 1, outputs the electrical signal indicating the rotational angle of the rotatable shaft 31 to the electronic controller unit 83 (see FIG. 1). The electronic controller unit 83 generates a hydraulic pressure (e.g., an oil pressure), which is required to brake the vehicle 80 by controlling the operation of the brake circuit of the brake-by-wire system 82 (see FIG. 1), and thereby the electronic controller unit 83 actuates the brake pads with this hydraulic pressure to decelerate or stop the vehicle 80.

Furthermore, at the time of executing the swing motion of the pedal 40 from the undepressed state to the maximum depressed state, the more the pedal 40 is swung from the undepressed state toward the maximum depressed state, the more the first and second coil springs 65, 66 are compressed, and along with that, the plate spring 61 is greatly flexed.

For example, in the middle of the swing motion of the pedal 40 from the undepressed state to the maximum depressed state, the first holder 67 and the second holder 68 abut against each other in the unit axial direction Dsa, and thereby the compression and deformation (hereinafter, referred to as the compression deformation) of each of the first and second coil springs 65, 66 is stopped. At this time, the first holder 67 and the second holder 68 may abut against each other while the spring seat 74 is interposed between the first holder 67 and the second holder 68, or the first holder 67 and the second holder 68 may directly abut against each other while the spring seat 74 is not interposed between the first holder 67 and the second holder 68.

When the pedal 40 is further swung from the state, in which the first holder 67 and the second holder 68 abut against each other, toward the maximum depressed state, the amount of deflection of the plate spring 61 is increased. When the pedal 40 is swung and abuts against the depression-time stopper 782, the pedal 40 is in the maximum depressed state, and thereby the deflection of the plate spring 61 is stopped.

The pedal device 1 of the present embodiment described above achieve the following advantages.

According to the present embodiment, as shown in FIGS. 3 and 4, the one holder (specifically, the first holder 67) among the first holder 67 and the second holder 68 has the outer guide portion 69 which is shaped in a tubular form and extends in the unit axial direction Dsa. This outer guide portion 69 is inserted into the inside space 63a formed at the inside of the at least one resilient member 65, 66. The other holder (specifically, the second holder 68) among the first holder 67 and the second holder 68 has the inner guide portion 70 which extends in the unit axial direction Dsa and is fitted into the outer guide portion 69 such that the inner guide portion 70 is movable relative to the outer guide portion 69 in the unit axial direction Dsa.

Therefore, it is easy to reduce the diameter of each of the inner peripheral surface 691 of the outer guide portion 69 and the outer peripheral surface 701 of the inner guide portion 70, which slide relative to each other. That is, in a case where a guide length, which is a length of a contact range between the outer guide portion 69 and the inner guide portion 70 measured in the unit axial direction Dsa, is denoted by L, and a maximum width of the inner guide portion 70, which is measured in a direction perpendicular to the unit axial direction Dsa, is denoted by D, a value of L/D can be easily made large. The maximum width D of the inner guide portion 70 is the diameter of the outer peripheral surface 701 of the inner guide portion 70 according to the present embodiment.

Since the value of L/D can be easily made large, the outer guide portion 69 and the inner guide portion 70 are guided relative to each other along the sufficient length in the unit axial direction Dsa. Thus, the first holder 67 is less likely to be tilted relative to the second holder 68. Furthermore, the first coil spring 65 and the second coil spring 66 can be urged and compressed in parallel with the unit axial direction Dsa. Thus, as a merit of the above configuration, for instance, an intended reaction force with respect to the depressing operation of the pedal 40 by the driver 81 can be easily generated.

(1) Furthermore, according to the present embodiment, the outer guide portion 69 and the inner guide portion 70 are configured such that the inner peripheral surface 691 of the outer guide portion 69 and the outer peripheral surface 701 of the inner guide portion 70 are slidable relative to each other. Therefore, the outer guide portion 69 and the inner guide portion 70 enable the relative movement between the first holder 67 and the second holder 68 in the unit axial direction Dsa and limit the relative movement between the first holder 67 and the second holder 68 in the unit radial direction Dsr.

As a result, when the driver 81 depresses the pedal 40 deeper, the guide length L discussed above is increased. Therefore, the first coil spring 65 and the second coil spring 66 can be easily urged in parallel with the unit axial direction Dsa. Thus, as a merit of the above configuration, for instance, an intended reaction force with respect to the depressing operation of the pedal 40 by the driver 81 can be easily generated.

(2) Furthermore, according to the present embodiment, in the cross-section that is perpendicular to the unit axial direction Dsa, each of the inner peripheral surface 691 of the outer guide portion 69 and the outer peripheral surface 701 of the inner guide portion 70 has the circular shape. Therefore, the relative movement between the first holder 67 and the second holder 68 in the unit radial direction Dsr can be more easily limited in comparison to a case where a cross-section of the inner peripheral surface 691 and a cross-section of the outer peripheral surface 701 are respectively shaped in, for example, an elongated rectangular shape.

(3) Furthermore, according to the present embodiment, in the second holder 68, the inner guide portion 70 and the second contact portion 682 are formed separately as the separate components, respectively. Therefore, the manufacturing of the second holder 68 becomes easier in comparison to a case where the inner guide portion 70 and the second contact portion 682 are formed integrally in one-piece as a one-piece component.

(4) Furthermore, according to the present embodiment, the second holder 68 has the communication hole 68a that communicates the tube inside space 69a to the outside of the tube inside space 69a. Since the communication hole 68a functions as the breathing hole that enables the inflow and the outflow of the air relative to the tube inside space 69a, it is possible to limit generation of a resistance in response to the compression of the air in the tube inside space 69a. Therefore, for example, the intended reaction force with respect to the depressing operation of the pedal 40 by the driver 81 can be easily generated.

(5) Furthermore, according to the present embodiment, the communication hole 68a is formed at the second holder 68. Therefore, it is not necessary to form the communication hole 68a at the first holder 67, and thereby it is not necessary to form a hole at the pressable surface 67a of the first holder 67. Thus, it is possible to reduce the restriction that is imposed on the region of the pressable surface 67a, to which the coupling rod 76 slidably contacts. As a result, for example, the contact surface area of the pressable surface 67a, on which the rod distal end portion 763 of the coupling rod 76 contacts, can be increased.

(6) The pedal device 1 of the present embodiment is the organ-type brake device, so that a maximum value of the reaction force, which is generated by the reaction force generation mechanism 60 against the depression force of the driver 81, needs to be increased. With respect to this point, according to the present embodiment, the reaction force generation mechanism 60 includes the plate spring 61 besides the coil springs 65, 66, and the second holder 68 is coupled to the base plate 20 through the plate spring 61. Thus, the use of the plate spring 61 is advantageous in terms of obtaining the large reaction force. Therefore, the pedal device 1 can be more easily made compact in comparison to a case where the reaction force generation mechanism 60 only has a coil spring, which has a large spring constant, without having the plate spring 61.

Furthermore, in the transmission path, which transmits the depression force between the pedal 40 and the base plate 20, the first coil spring 65, the second coil spring 66 and the plate spring 61 are arranged in this order in series. This allows the driver 81 to have a good feel when the driver 81 depresses the pedal 40.

(7) Furthermore, according to the present embodiment, the fastening member 62 has the fastener through-hole 62a that extends through the fastening member 62 in the unit axial direction Dsa. This fastener through-hole 62a is communicated with the communication hole 68a, and the tube inside space 69a is communicated with the outside of the tube inside space 69a through the communication hole 68a and the fastener through-hole 62a. Therefore, the second holder 68 can be fixed to the plate spring 61 along the unit central axis Cs, and the air passage, which enables the inflow and the outflow of the air relative to the tube inside space 69a, can be ensured by the communication hole 68a and the fastener through-hole 62a.

(8) Furthermore, according to the present embodiment, the first holder 67 has the first opposing surface 673a that is opposed to the one end portion 651 of the first coil spring 65 in the unit radial direction Dsr. Furthermore, the first opposing surface 673a limits the positional deviation of the one end portion 651 of the first coil spring 65 relative to the first holder 67 in the unit radial direction Dsr. Thus, it is possible to limit deviation of the reaction force of the first coil spring 65 from a predetermined design value thereof in response to the positional deviation of the one end portion 651 of the first coil spring 65 relative to the first holder 67. As a result, it is possible to obtain the intended reaction force characteristic of the reaction force generation mechanism 60.

(9) Furthermore, according to the present embodiment, the second holder 68 has the second opposing surface 683a that is opposed to the other end portion 662 of the second coil spring 66 in the unit radial direction Dsr. The second opposing surface 683a limits the positional deviation of the other end portion 662 of the second coil spring 66 relative to the second holder 68 in the unit radial direction Dsr. Thus, it is possible to limit deviation of the reaction force of the second coil spring 66 from a predetermined design value thereof in response to the positional deviation of the other end portion 662 of the second coil spring 66 relative to the second holder 68. As a result, it is possible to obtain the intended reaction force characteristic of the reaction force generation mechanism 60.

(10) Furthermore, according to the present embodiment, the first coil spring 65 and the second coil spring 66 are coupled with each other through the spring seat 74. The first coil spring 65 and the second coil spring 66 urge against each other through the spring seat 74 when the first coil spring 65 and the second coil spring 66 are respectively compressed and deformed. Therefore, while holding the plurality of coil springs 65, 66, it is possible to couple the plurality of coil springs 65, 66 in series at the transmission path, which transmits the depression force between the pedal 40 and the base plate 20.

(11) Furthermore, according to the present embodiment, the outer diameter of the first coil spring 65 is smaller than the inner diameter of the second coil spring 66. In the undepressed state of the pedal 40, the portion of the first coil spring 65 is placed on the inner side of the second coil spring 66 in the unit radial direction Dsr to overlap with the second coil spring 66. Therefore, the space, which is occupied by the first coil spring 65 and the second coil spring 66, can be reduced.

(12) Furthermore, according to the present embodiment, the extending portion 741 of the spring seat 74 is shaped in the cylindrical tubular form which extends in the unit axial direction Dsa and is placed between the first coil spring 65 and the second coil spring 66 in the unit radial direction Dsr. The spring seat inner portion 742 of the spring seat 74 extends from the extending portion 741 toward the inner side in the unit radial direction Dsr and contacts the other end portion 652 of the first coil spring 65 while the spring seat inner portion 742 is opposed to the other end portion 652 of the first coil spring 65 in the unit axial direction Dsa. The spring seat outer portion 743 of the spring seat 74 extends from the extending portion 741 toward the outer side in the unit radial direction Dsr and contacts the one end portion 661 of the second coil spring 66 while the spring seat outer portion 743 is opposed to the one end portion 661 of the second coil spring 66 in the unit axial direction Dsa.

Therefore, in the state where the portion of the first coil spring 65 is placed on the inner side of the second coil spring 66 in the unit radial direction Dsr to overlap with the second coil spring 66, these coil springs 65, 66 can be coupled in series in the transmission path which transmits the depression force. Furthermore, these coil springs 65, 66 can be held by the spring seat 74.

Furthermore, a minimum operational length, at which the first and second coil springs 65, 66 are respectively compressed the most, can be easily set by the spring seat 74, so that it possible to easily obtain a depression force characteristic which has a plurality of inflection points of a spring constant of the reaction force generation mechanism 60. These inflection points of the depression force characteristic are indicated as, for example, inflection points B1, B2 in FIG. 22 described later.

(13) Furthermore, according to the present embodiment, the spring seat 74 has: the first spring seat opposing surface 744a, which is opposed to the other end portion 652 of the first coil spring 65 in the unit radial direction Dsr; and the second spring seat opposing surface 745a, which is opposed to the one end portion 661 of the second coil spring 66 in the unit radial direction Dsr. The first spring seat opposing surface 744a limits the positional deviation of the other end portion 652 of the first coil spring 65 relative to the spring seat 74 in the unit radial direction Dsr. Furthermore, the second spring seat opposing surface 745a limits the positional deviation of the one end portion 661 of the second coil spring 66 relative to the spring seat 74 in the unit radial direction Dsr.

Thus, it is possible to limit the deviation of the reaction force of the second coil spring 66 from the predetermined design value thereof in response to the positional deviation of the other end portion 662 of the second coil spring 66 relative to the second holder 68. As a result, it is possible to obtain the intended reaction force characteristic of the reaction force generation mechanism 60.

(14) Furthermore, according to the present embodiment, the spring seat 74 has the insertion hole 74a, through which the inner guide portion 70 is inserted. Therefore, the spring seat 74 can be held such that the spring seat 74 does not fall out from the first and second holders 67, 68.

(15) Furthermore, according to the present embodiment, the spring seat 74 abuts against the one or both of the first and second holders 67, 68 in response to the compression of the first coil spring 65 and the second coil spring 66. A size of the insertion hole 74a is set such that the insertion hole inner peripheral surface 74b does not arrest the inner guide portion 70 in the unit radial direction Dsr in the case where the spring seat 74 abuts against the one or both of the first and second holders 67, 68 in the unit axial direction Dsa.

Therefore, when the spring seat 74 abuts against the one or both of the first and second holders 67, 68, it is possible to avoid that the insertion hole inner peripheral surface 74b of the spring seat 74 and the inner guide portion 70 rub against each other in response to the tilting of the spring seat 74.

(16) Furthermore, according to the present embodiment, the spring seat 74 is made of the resin material. Therefore, it can contribute to the weight reduction of the pedal device 1.

(17) Furthermore, according to the present embodiment, the first holder 67 is made of the resin material. Therefore, in comparison to, for example, a case where the first holder 67 is made of a metal material, the contact pressure of the coupling rod 76 against the pressable surface 67a can be reduced to implement the noise reduction when the coupling rod 76 urges the pressable surface 67a.

(18) Furthermore, according to the present embodiment, the first holder 67 has the pressable surface 67a which faces the one side in the unit axial direction Dsa. The coupling rod 76 is coupled to the pedal 40 such that the projecting direction of the coupling rod 76, which projects from the pedal 40, is fixed. Furthermore, the rod distal end portion 763 of the coupling rod 76 urges the pressable surface 67a of the first holder 67 and slides relative to the pressable surface 67a of the first holder 67 in response to the depressing operation of the pedal 40 by the driver 81.

Therefore, even when the coupling rod 76 urges the pressable surface 67a in the state where the coupling rod 76 is tilted relative to the pressable surface 67a, an urging force, which urges the portion of the first holder 67 having the pressable surface 67a in the unit radial direction Dsr, is, for example, a frictional force between the coupling rod 76 and the pressable surface 67a, and the like. That is, there is almost no force that urges the portion of the first holder 67 having the pressable surface 67a in the unit radial direction Dsr. Therefore, the rubbing between the outer guide portion 69 and the inner guide portion 70 is avoided, and thereby the intended reaction force characteristic of the reaction force generation mechanism 60 can be obtained.

(19) Furthermore, according to the present embodiment, the coupling rod 76 includes: the arm portion 761, which is coupled to the pedal 40; and the urging portion 762, the material of which is different from the material of the arm portion 761, while the urging portion 762 is coupled to the arm portion 761 at the location that is on the opposite side of the arm portion 761 which is opposite to the pedal 40. Therefore, it is possible to use the appropriate material for each of the arm portion 761 and the urging portion 762 according to the intended use thereof.

(20) Furthermore, according to the present embodiment, the arm portion 761 is made of, for example, the metal material. Therefore, even when the pedal 40 is depressed by a large depression force of the driver 81, the arm portion 761 is less likely to be resiliently deformed. Thus, the reaction force, which is obtained against this depression force, can be stabilized.

(21) Furthermore, according to the present embodiment, the urging portion 762 is made of, for example, the resin material. Therefore, in comparison to, for example, a case where the urging portion 762 is made of a metal material, the contact pressure of the urging portion 762 of the coupling rod 76 against the pressable surface 67a of the first holder 67 can be reduced to implement the good sliding property of the urging portion 762.

Furthermore, according to the present embodiment, the support body, which supports the pedal 40 and the reaction force generation mechanism 60, includes the housing 10, and the reaction force generation mechanism 60 is received in the housing 10. Therefore, the housing 10 can limit intrusion of the foreign object into the reaction force generation mechanism 60.

Furthermore, according to the present embodiment, the spring seat 74 includes the hole forming portion 746 which is shaped in the tubular form and projects in the unit axial direction Dsa. The insertion hole 74a, which receives therethrough the inner guide portion 70 extending through the spring seat 74 in the unit axial direction Dsa, is formed at the inside of the hole forming portion 746. For example, the fitting of the inner guide portion 70 relative to the insertion hole 74a is the looser fitting that is looser than the fitting of the inner guide portion 70 relative to the outer guide portion 69.

Therefore, it is possible to avoid that the spring seat 74 and the inner guide portion 70 rub against each other in response to the tilting of the spring seat 74. At the same time, since the hole forming portion 746 is shaped and projects in the tubular form, it is possible to limit excessive tilting of the spring seat 74 relative to the inner guide portion 70.

Second Embodiment

Next, a second embodiment will be described. In the present embodiment, points, which are different from the first embodiment, will be mainly described. Furthermore, the description of the same or equivalent portions as those in the aforementioned embodiment will be omitted or simplified. This is also true in the description of the later embodiments. In the drawings referred to in the second and subsequent embodiments, the various components of the pedal device 1 are shown simplified as appropriate.

Figure 5:
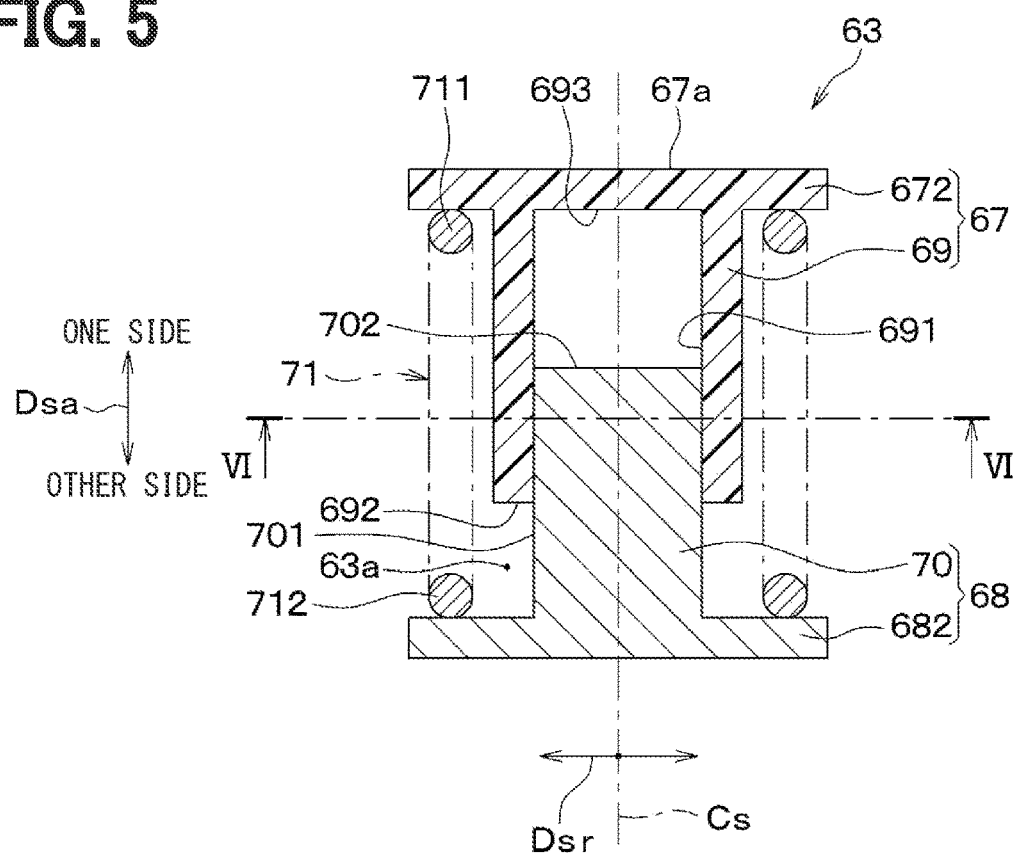
FIG. 5 is a schematic cross-sectional view of a resilient unit of a second embodiment taken along a plane which includes a unit central axis of the resilient unit, indicating a state where a pedal is in an undepressed state.
Figure 6:
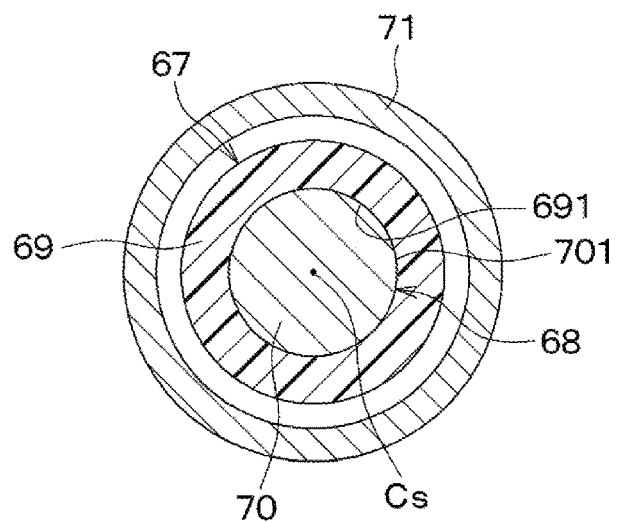
FIG. 6 is a cross-sectional view taken along line VI-VI in FIG. 5.

As shown in FIGS. 5 and 6, in the present embodiment, the resilient unit 63 includes a single coil spring (only one coil spring) 71 in place of the first coil spring 65 and the second coil spring 66 of the first embodiment. The coil spring 71 serves as at least one resilient member of the present disclosure. For example, the coil spring 71 has a configuration that is similar to the configuration of the first coil spring 65 of the first embodiment.

The coil spring 71 has: one end portion 711, which is located on the one side in the unit axial direction Dsa; and the other end portion 712, which is located on the other side in the unit axial direction Dsa. Furthermore, the resilient unit 63 of the present embodiment does not include the spring seat 74, unlike the first embodiment.

The first contact portion 672 of the first holder 67 contacts the one end portion 711 of the coil spring 71 from the one side in the unit axial direction Dsa. Furthermore, the second contact portion 682 of the second holder 68 contacts the other end portion 712 of the coil spring 71 from the other side in the unit axial direction Dsa. As described above, the coil spring 71 is clamped between the first contact portion 672 and the second contact portion 682 in the unit axial direction Dsa.

Figure 7:
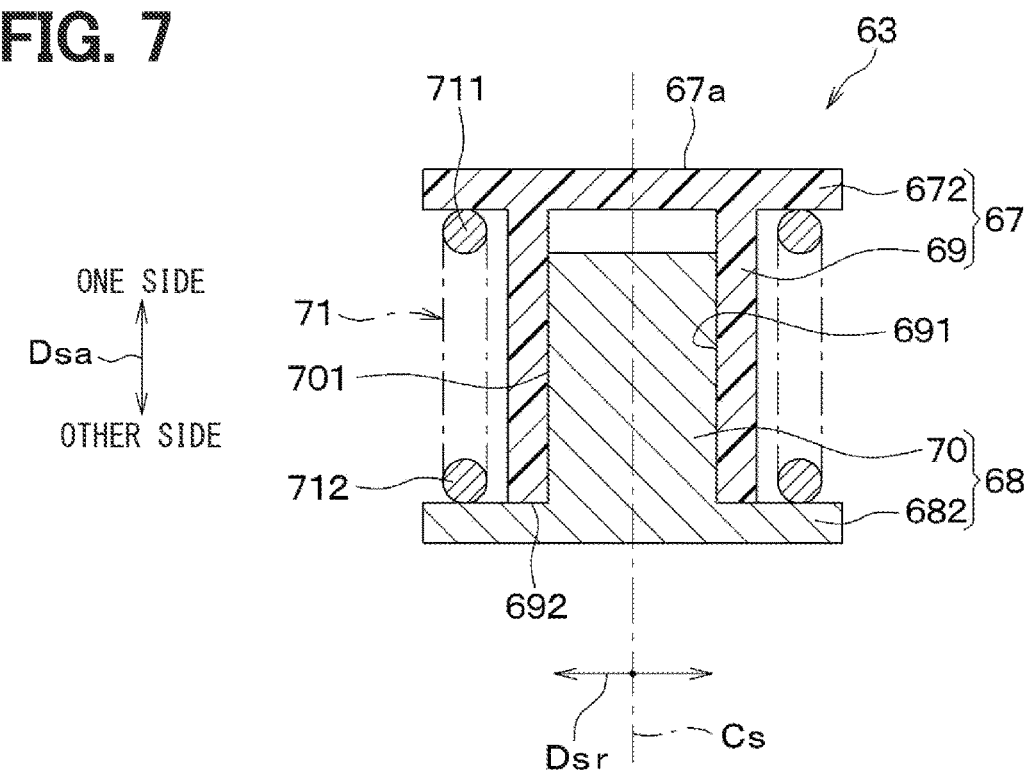
FIG. 7 is a cross-sectional view schematically showing a cross-section, which is the same as the cross-section of FIG. 5, indicating a most compressed state of the resilient unit where the amount of compression of a coil spring is maximized.

FIG. 5 indicates the undepressed state of the pedal 40, i.e., a state where the amount of compression of the coil spring 71 installed in the pedal device 1 is the smallest. FIG. 7 indicates a state where the coil spring 71 of the resilient unit 63 is most compressed (i.e., a most compressed state of the resilient unit 63). As indicated in FIGS. 5 and 7, the relative movement of the first holder 67 and the second holder 68 in a compressing direction for compressing the coil spring 71 is stopped when the distal end surface 692 of the outer guide portion 69 and the second contact portion 682 of the second holder 68 abut against each other in the unit axial direction Dsa.

In the present embodiment, unlike the first embodiment, the first spring guide portion 673 and the second spring guide portion 683 (see FIG. 4) are not provided. Furthermore, the inner guide portion 70 and the second contact portion 682 are not separately formed as the separate components but are formed integrally in one-piece as a one-piece component.

(1) As discussed above, according to the present embodiment, the relative movement of the first holder 67 and the second holder 68 in the compressing direction for compressing the coil spring 71 is stopped when the outer guide portion 69 and the second holder 68 abut against each other in the unit axial direction Dsa. Therefore, the maximum amount of deflection of the coil spring 71 can be set while making variations in the maximum amount of deflection of the coil spring 71 small. Thus, for example, the intended reaction force can be generated for the depressing operation of the pedal 40 by the driver 81.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Third Embodiment

Next, a third embodiment will be described. In the present embodiment, points, which are different from the second embodiment described above, will be mainly described.

Figure 8:
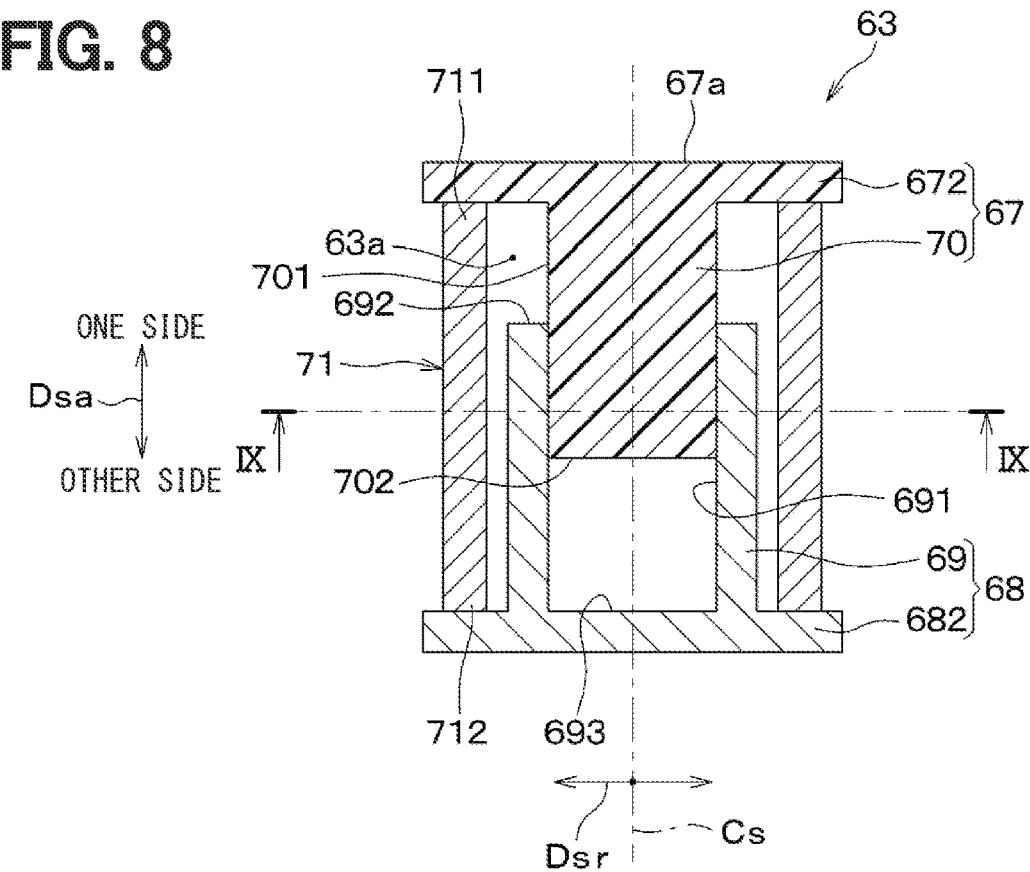
FIG. 8 is a cross-sectional view of a resilient unit of a third embodiment alone, corresponding to FIG. 5.
Figure 9:
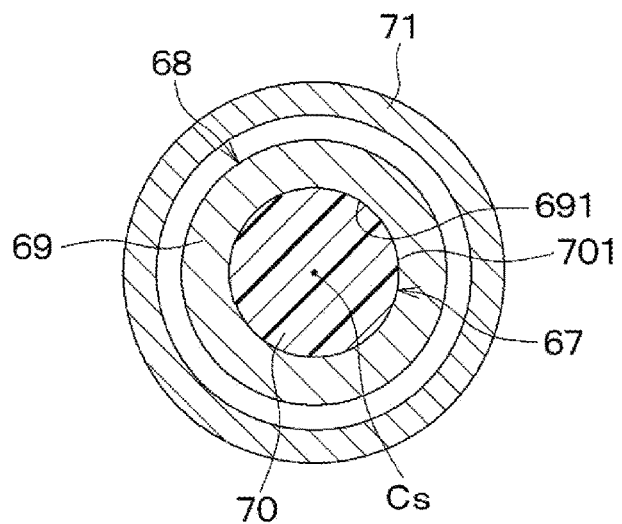
FIG. 9 is a cross-sectional view taken along line IX-IX in FIG. 8, corresponding to FIG. 6 according to the third embodiment.

As shown in FIGS. 8 and 9, in the present embodiment, the first holder 67 includes the inner guide portion 70 instead of the outer guide portion 69, and the second holder 68 includes the outer guide portion 69 instead of the inner guide portion 70. That is, the first holder 67 includes the first contact portion 672 and the inner guide portion 70 which are formed integrally in one-piece. Furthermore, the second holder 68 includes the second contact portion 682 and the outer guide portion 69 which are formed integrally in one-piece.

Therefore, in the present embodiment, the inner guide portion 70 projects from the first contact portion 672 toward the other side in the unit axial direction Dsa. Furthermore, the outer guide portion 69 projects from the second contact portion 682 toward the one side in the unit axial direction Dsa.

In FIG. 8, the coil spring 71 is indicated in a simplified manner with rectangles. In the drawings referred to in the fourth and subsequent embodiments, the coil spring 71 is indicated in a simplified manner like this instance.

(1) As described above, according to the present embodiment, the one holder (specifically, the second holder 68) among the first holder 67 and the second holder 68 includes the outer guide portion 69. This outer guide portion 69 is inserted into the inside space 63*a* formed at the inside of the coil spring 71 which is provided as the at least one resilient member. Furthermore, the other holder (specifically, the first holder 67) among the first holder 67 and the second holder 68 includes the inner guide portion 70.

Thus, like in the first and second embodiments, the value of L/D, which is the ratio between the guide length L and the maximum width D of the inner guide portion 70, is likely to be increased, and thereby the first holder 67 is less likely to be tilted relative to the second holder 68. Thus, as a merit of the above configuration, for instance, an intended reaction force with respect to the depressing operation of the pedal 40 by the driver 81 can be easily generated.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Fourth Embodiment

Next, a fourth embodiment will be described. In the present embodiment, points, which are different from the second embodiment described above, will be mainly described.

Figure 10:
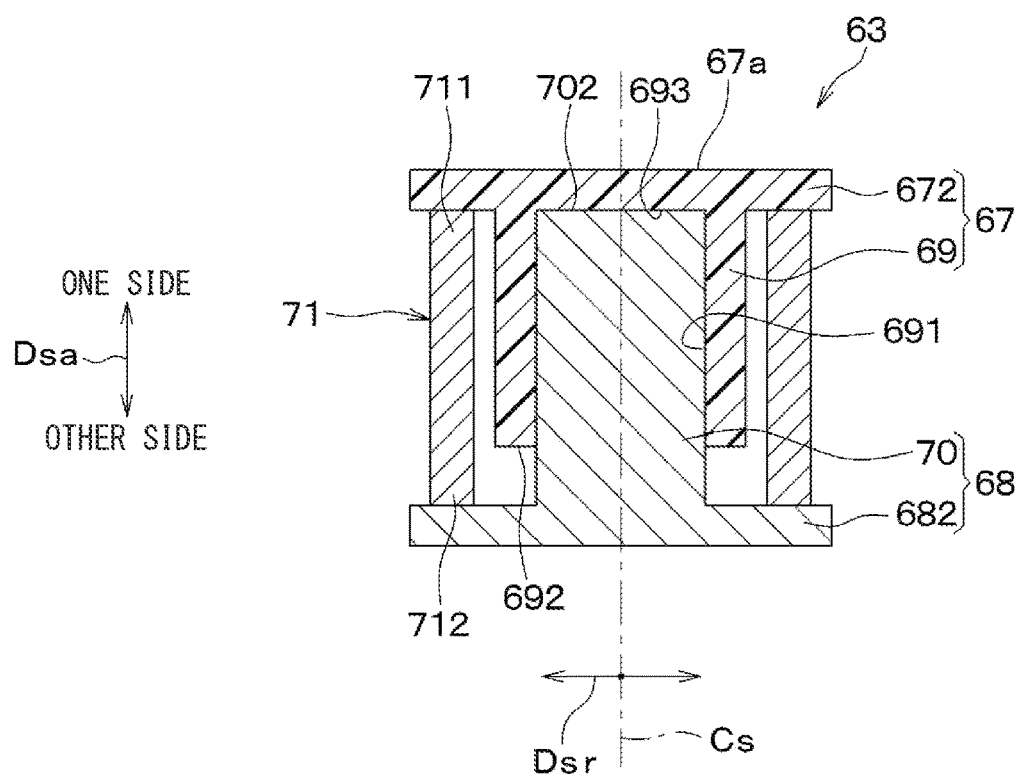
FIG. 10 is a cross-sectional view of a resilient unit of a fourth embodiment, schematically showing a most compressed state of the resilient unit and corresponding to FIG. 7.

As shown in FIG. 10, in the present embodiment, a length of the outer guide portion 69, which is measured in the unit axial direction Dsa, or a length of the inner guide portion 70, which is measured in the unit axial direction Dsa, is different from that of the second embodiment.

Therefore, in the most compressed state of the resilient unit 63, the distal end surface 702 of the inner guide portion 70 and the tube bottom surface 693 of the outer guide portion 69 abut against each other in the unit axial direction Dsa. In contrast, the distal end surface 692 of the outer guide portion 69 is kept spaced from the second contact portion 682 of the second holder 68 in the unit axial direction Dsa.

(1) According to the present embodiment, the relative movement of the first holder 67 and the second holder 68 in the compressing direction for compressing the coil spring 71 is stopped when the distal end surface 702 of the inner guide portion 70 and the tube bottom surface 693 of the first holder 67 abut against each other in the unit axial direction Dsa.

Therefore, even in the present embodiment, like in the second embodiment, the maximum amount of deflection of the coil spring 71 can be set while making variations in the maximum amount of deflection of the coil spring 71 small. Thus, for example, the intended reaction force can be generated for the depressing operation of the pedal 40 by the driver 81.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Although the present embodiment is a modification based on the second embodiment, it is possible to combine the present embodiment with the third embodiment described above.

Fifth Embodiment

Next, a fifth embodiment will be described. In the present embodiment, points, which are different from the second embodiment described above, will be mainly described.

Figure 11:
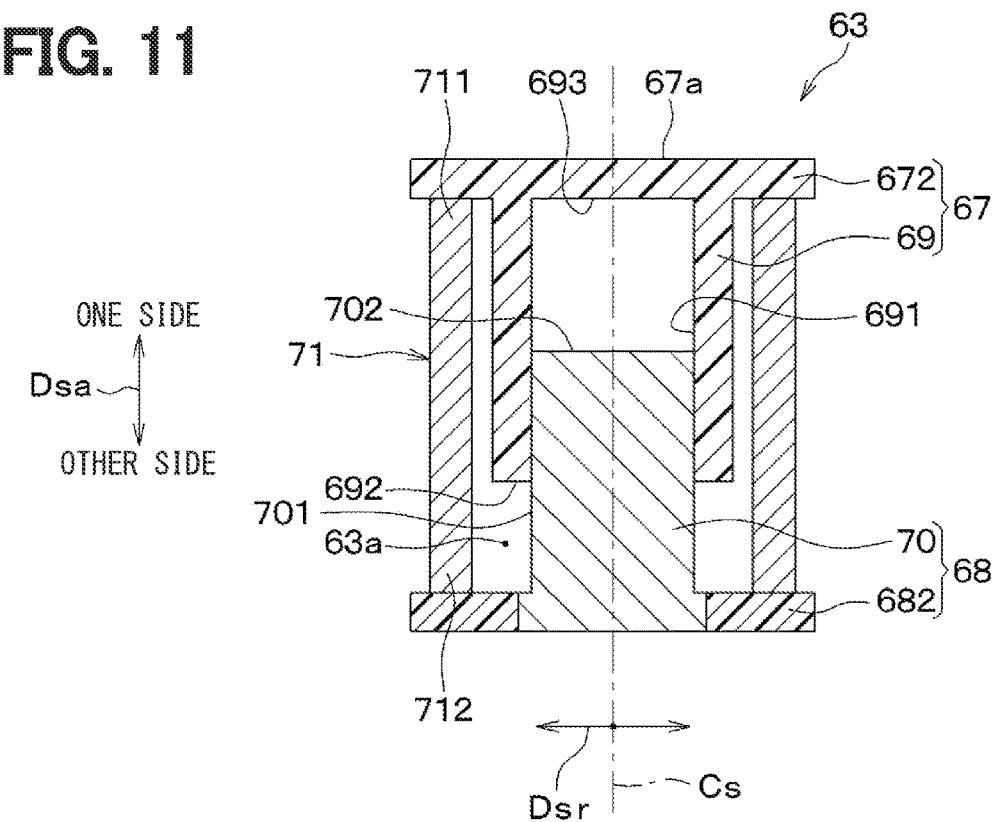
FIG. 11 is a cross-sectional view of a resilient unit of a fifth embodiment alone, corresponding to FIG. 5.

As shown in FIG. 11, in the present embodiment, in the second holder 68, the inner guide portion 70 and the second contact portion 682 are formed separately as the separate components, respectively.

(1) With the configuration of the second holder 68 described above, like in the first embodiment, the manufacturing of the second holder 68 becomes easier in comparison to the case where the inner guide portion 70 and the second contact portion 682 are formed integrally in one-piece as the one-piece component. A fixing method for fixing the inner guide portion 70 and the second contact portion 682 relative to each other may be the same as that of the first embodiment or a different fixing method which is different from the first embodiment.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Although the present embodiment is a modification based on the second embodiment, it is possible to combine the present embodiment with the fourth embodiment described above.

Sixth Embodiment

Next, a sixth embodiment will be described. In the present embodiment, points, which are different from the third embodiment described above, will be mainly described.

Figure 12:
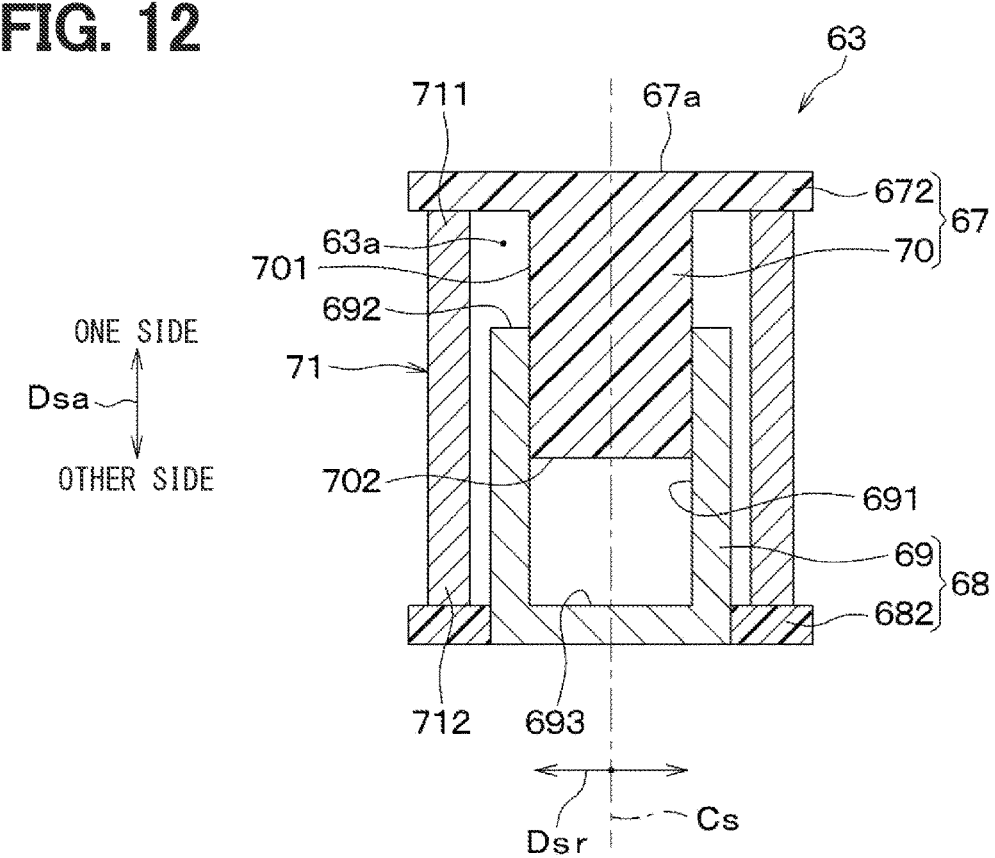
FIG. 12 is a cross-sectional view of a resilient unit of a sixth embodiment alone, corresponding to FIG. 5.

As shown in FIG. 12, in the present embodiment, in the second holder 68, the outer guide portion 69 and the second contact portion 682 are formed separately as the separate components, respectively.

(1) With this configuration of the second holder 68, the manufacturing of the second holder 68 becomes easier, like in the fifth embodiment. A fixing method for fixing the outer guide portion 69 and the second contact portion 682 relative to each other may be the same as the fixing method for fixing the inner guide portion 70 and the flange member 684 relative to each other discussed in the first embodiment (see FIG. 4) or a different fixing method which is different from the first embodiment.

The rest of the present embodiment, which is other than the above-described points, is the same as that of the third embodiment. Furthermore, in the present embodiment, the advantages, which are achieved by the common configuration that is common to the third embodiment described above, can be obtained in the same manner as in the third embodiment.

Seventh Embodiment

Next, a seventh embodiment will be described. In the present embodiment, points, which are different from the second embodiment described above, will be mainly described.

Figure 13:
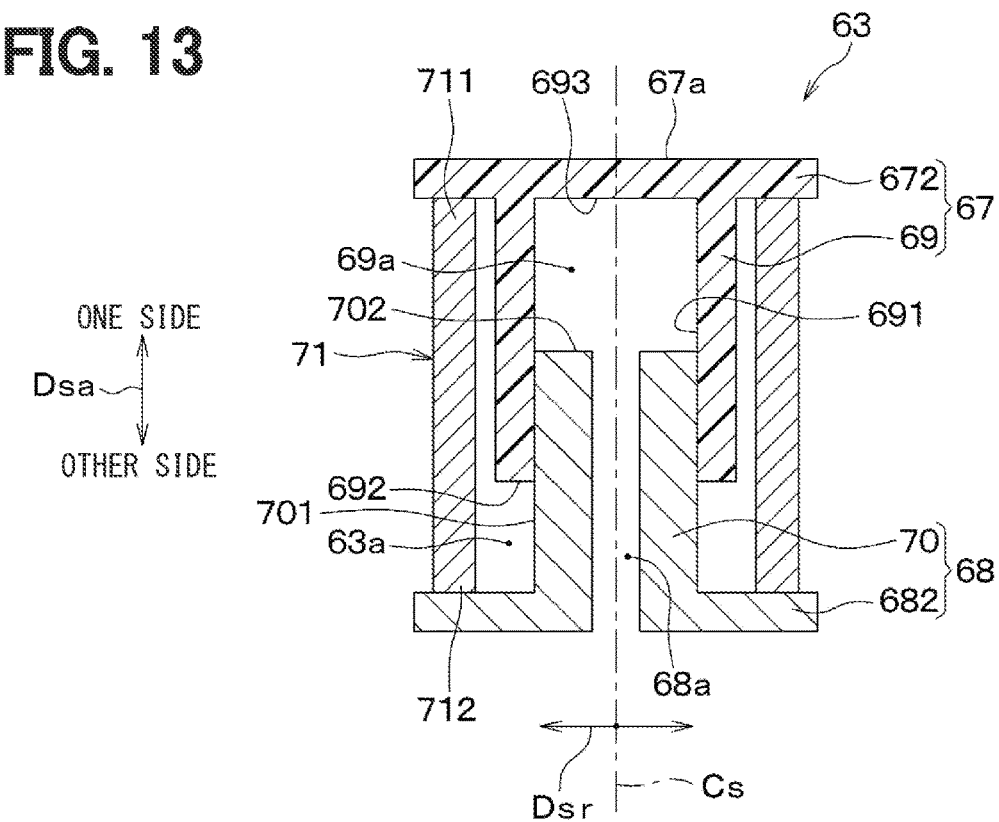
FIG. 13 is a cross-sectional view of a resilient unit of a seventh embodiment alone, corresponding to FIG. 5.

As shown in FIG. 13, the second holder 68 of the present embodiment has the communication hole 68*a* which has one end communicated with the tube inside space 69*a* and the other end opened to the outside of the tube inside space 69*a*. The communication hole 68*a* of the present embodiment has the configuration that is the same as that of the communication hole 68*a* of the first embodiment. For example, the communication hole 68*a* of the present embodiment may be opened to the outside of the tube inside space 69*a* through the fastener through-hole 62a (see FIG. 4) or may be directly opened to the outside of the tube inside space 69a.

(1) As discussed above, according to the present embodiment, like in the first embodiment, the second holder 68 has the communication hole 68a that communicates the tube inside space 69a to the outside of the tube inside space 69a. Therefore, even in the present embodiment, the advantages, which are similar to those of the communication hole 68a of the first embodiment, can be achieved.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Eighth Embodiment

Next, an eighth embodiment will be described. In the present embodiment, points, which are different from the seventh embodiment described above, will be mainly described.

Figure 14:
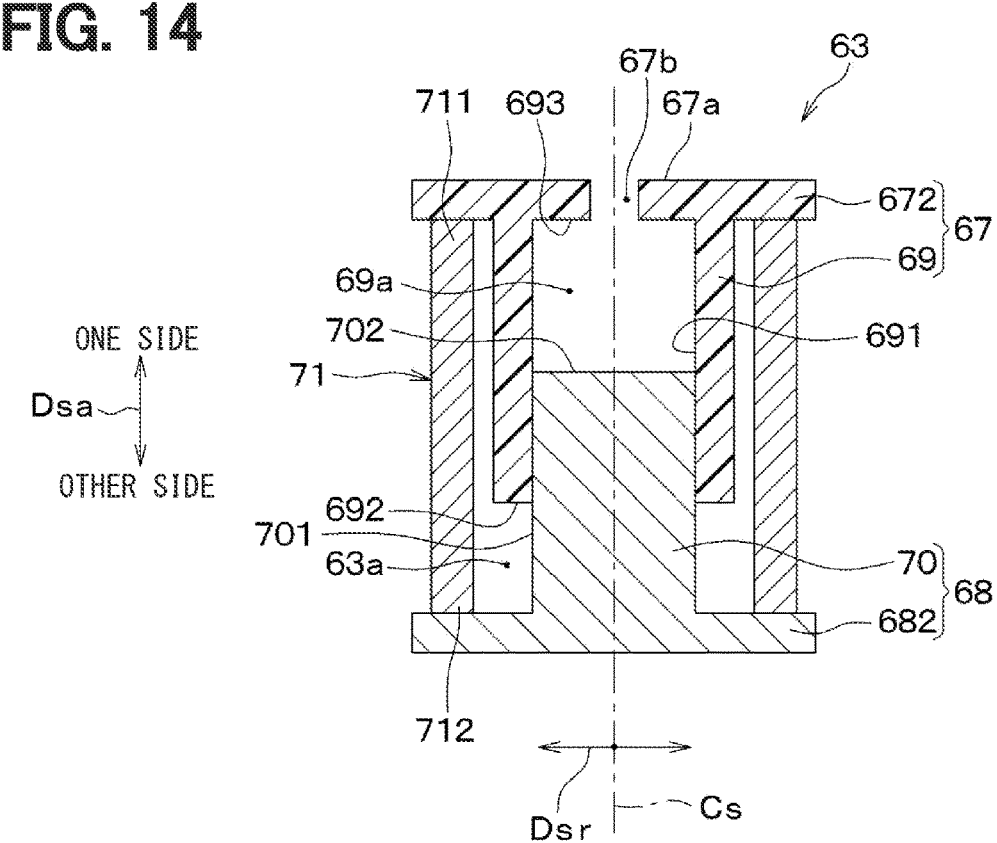
FIG. 14 is a cross-sectional view of a resilient unit of an eighth embodiment alone, corresponding to FIG. 5.

As shown in FIG. 14, in the present embodiment, the second holder 68 does not have the communication hole 68a (see FIG. 13). Instead, the first holder 67 has a communication hole 67b that communicates the tube inside space 69a to the outside of the tube inside space 69a.

(1) Therefore, since the communication hole 67b of the first holder 67 functions as the breathing hole that enables the inflow and the outflow of the air relative to the tube inside space 69a like the communication hole 68a of the second holder 68 of the seventh embodiment, it is possible to limit generation of the resistance in response to the compression of the air in the tube inside space 69a. Therefore, like in the seventh embodiment, for example, the intended reaction force with respect to the depressing operation of the pedal 40 by the driver 81 can be easily generated.

The rest of the present embodiment, which is other than the above-described points, is the same as that of the seventh embodiment. Furthermore, in the present embodiment, the advantages, which are achieved by the common configuration that is common to the seventh embodiment described above, can be obtained in the same manner as in the seventh embodiment.

Ninth Embodiment

Next, a ninth embodiment will be described. In the present embodiment, points, which are different from the third embodiment described above, will be mainly described.

Figure 15:
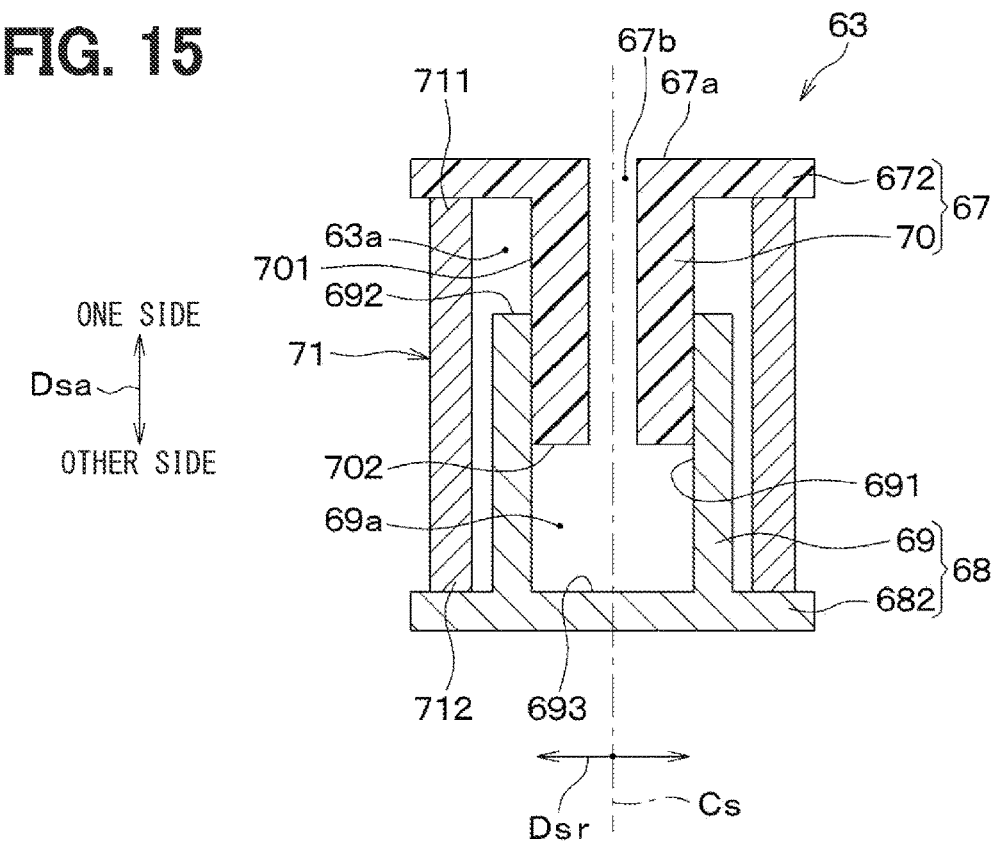
FIG. 15 is a cross-sectional view of a resilient unit of a ninth embodiment alone, corresponding to FIG. 5.

As shown in FIG. 15, the first holder 67 of the present embodiment has the communication hole 67b which has one end opened to the outside of the tube inside space 69a and the other end communicated with the tube inside space 69a. That is, the first holder 67 has the communication hole 67b that communicates the tube inside space 69a to the outside of the tube inside space 69a. For example, this communication hole 67b is formed to extend through the inner guide portion 70 in the unit axial direction Dsa.

(1) Therefore, the communication hole 67b of the first holder 67 of the present embodiment functions as the breathing hole that enables the inflow and the outflow of the air relative to the tube inside space 69a, like the communication hole 67b of the eighth embodiment. Therefore, even in the present embodiment, the advantages, which are similar to those of the communication hole 67b of the eighth embodiment, can be achieved.

The rest of the present embodiment, which is other than the above-described points, is the same as that of the third embodiment. Furthermore, in the present embodiment, the advantages, which are achieved by the common configuration that is common to the third embodiment described above, can be obtained in the same manner as in the third embodiment.

Tenth Embodiment

Next, a tenth embodiment will be described. In the present embodiment, points, which are different from the ninth embodiment described above, will be mainly described.

Figure 16:
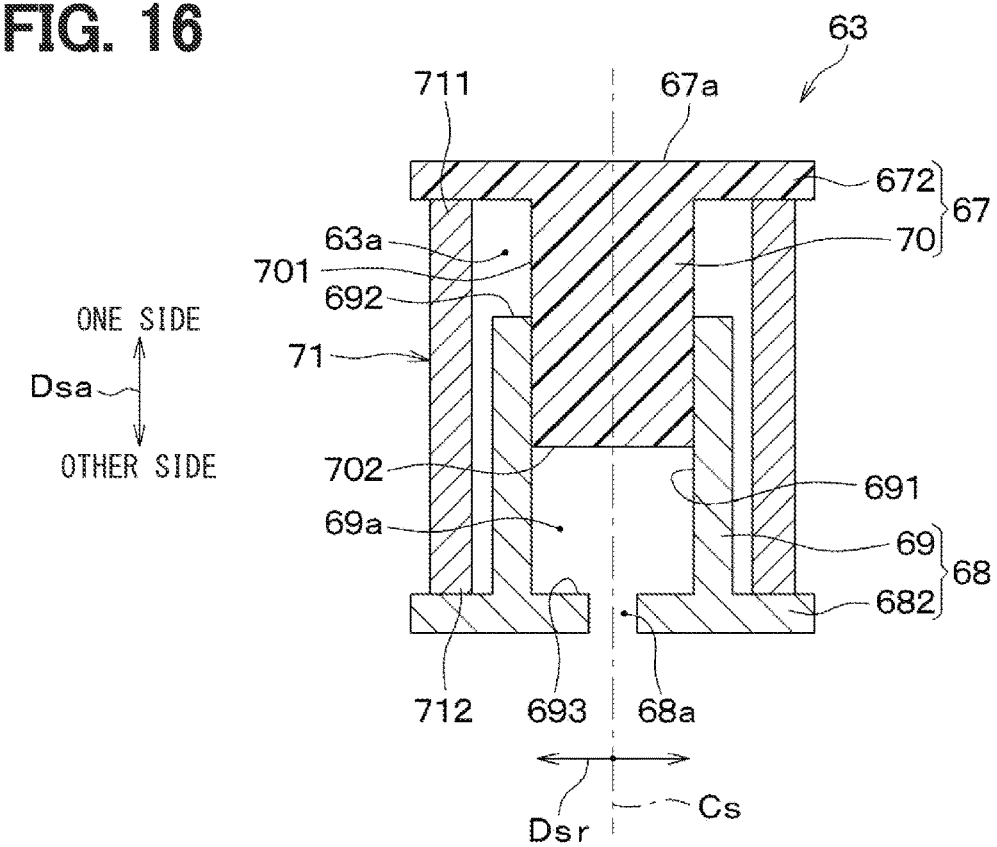
FIG. 16 is a cross-sectional view of a resilient unit of a tenth embodiment alone, corresponding to FIG. 5.

As shown in FIG. 16, in the present embodiment, the first holder 67 does not have the communication hole 67b (see FIG. 15). Instead, the second holder 68 has the communication hole 68a that communicates the tube inside space 69a to the outside of the tube inside space 69a.

(1) Therefore, the communication hole 68a of the second holder 68 of the present embodiment functions as the breathing hole that enables the inflow and the outflow of the air relative to the tube inside space 69a, like the communication hole 68a of the seventh embodiment. Therefore, even in the present embodiment, the advantages, which are similar to those of the communication hole 68a of the seventh embodiment, can be achieved.

The rest of the present embodiment, which is other than the above-described points, is the same as that of the ninth embodiment. Furthermore, in the present embodiment, the advantages, which are achieved by the common configuration that is common to the ninth embodiment described above, can be obtained in the same manner as in the ninth embodiment.

Eleventh Embodiment

Next, an eleventh embodiment will be described. In the present embodiment, points, which are different from the second embodiment described above, will be mainly described.

Figure 17:
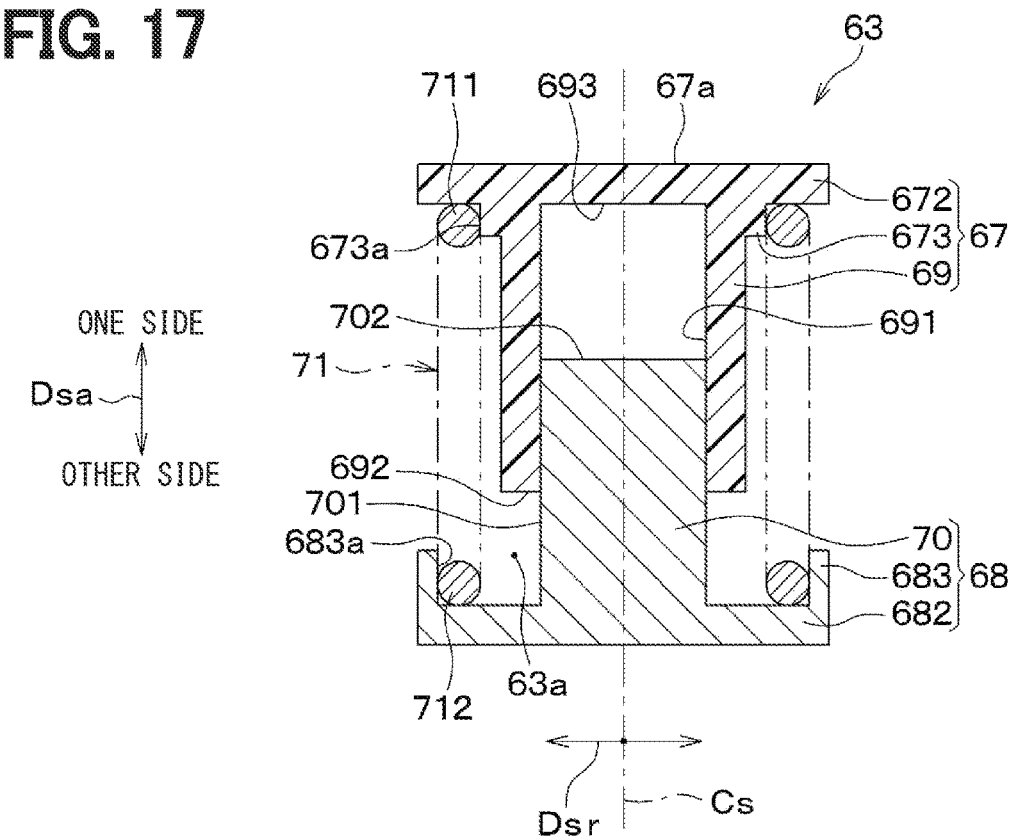
FIG. 17 is a cross-sectional view of a resilient unit of an eleventh embodiment alone, corresponding to FIG. 5.

As shown in FIG. 17, the first holder 67 of the present embodiment includes the first spring guide portion 673 in addition to the outer guide portion 69 and the first contact portion 672. The outer guide portion 69, the first contact portion 672 and the first spring guide portion 673 are formed integrally in one-piece. The configuration of the first spring guide portion 673 of the present embodiment is the same as that of the first spring guide portion 673 of the first embodiment.

Specifically, the first spring guide portion 673 of the present embodiment is placed on the inner side of the one end portion 711 of the coil spring 71 in the unit radial direction Dsr and projects outward from the outer guide portion 69 in the unit radial direction Dsr. The first spring guide portion 673 of the present embodiment has the first opposing surface 673a which is the same as the first opposing surface 673a of the first embodiment.

That is, the first opposing surface 673a of the present embodiment is placed on, for example, the inner side of the one end portion 711 of the coil spring 71 in the unit radial direction Dsr and is opposed to the one end portion 711 in the unit radial direction Dsr. Among portions of the first holder 67, which are opposed to the coil spring 71 in the unit radial direction Dsr, the first opposing surface 673a is a closest portion of the first holder 67, which is the closest to the coil spring 71 in the unit radial direction Dsr. Therefore, the first opposing surface 673*a* of the present embodiment limits the positional deviation of the one end portion 711 of the coil spring 71 relative to the first holder 67 in the unit radial direction Dsr. In the present embodiment, the one end portion 711 of the coil spring 71 serves as the first spring end portion of the present disclosure which contacts the first holder 67.

Furthermore, the second holder 68 of the present embodiment includes the second spring guide portion 683 in addition to the inner guide portion 70 and the second contact portion 682. The inner guide portion 70, the second contact portion 682 and the second spring guide portion 683 are formed integrally in one-piece. The configuration of the second spring guide portion 683 of the present embodiment is the same as that of the second spring guide portion 683 of the first embodiment.

Specifically, the second spring guide portion 683 of the present embodiment is placed on the outer side of the other end portion 712 of the coil spring 71 in the unit radial direction Dsr and projects from an outer periphery of the second contact portion 682 toward the one side in the unit axial direction Dsa. The second spring guide portion 683 of the present embodiment has the second opposing surface 683*a* which is the same as the second opposing surface 683*a* of the first embodiment.

That is, the second opposing surface 683*a* of the present embodiment is placed on, for example, the outer side of the other end portion 712 of the coil spring 71 in the unit radial direction Dsr and is opposed to the other end portion 712 in the unit radial direction Dsr. Among portions of the second holder 68, which are opposed to the coil spring 71 in the unit radial direction Dsr, the second opposing surface 683*a* is a closest portion of the second holder 68, which is the closest to the coil spring 71 in the unit radial direction Dsr. Therefore, the second opposing surface 683*a* of the present embodiment limits the positional deviation of the other end portion 712 of the coil spring 71 relative to the second holder 68 in the unit radial direction Dsr. In the present embodiment, the other end portion 712 of the coil spring 71 serves as the second spring end portion of the present disclosure which contacts the second holder 68.

(1) As discussed above, according to the present embodiment, like in the first embodiment, the first opposing surface 673*a* limits the positional deviation of the one end portion 711 of the coil spring 71 relative to the first holder 67 in the unit radial direction Dsr. Therefore, even in the present embodiment, the advantages, which are similar to those of the first opposing surface 673*a* of the first embodiment, can be achieved.

(2) Furthermore, according to the present embodiment, like in the first embodiment, the second opposing surface 683*a* limits the positional deviation of the other end portion 712 of the coil spring 71 relative to the second holder 68 in the unit radial direction Dsr. Therefore, even in the present embodiment, the advantages, which are similar to those of the second opposing surface 683*a* of the first embodiment, can be achieved.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Although the present embodiment is a modification based on the second embodiment, it is possible to combine the present embodiment with any one of the third to tenth embodiments described above.

Twelfth Embodiment

Next, a twelfth embodiment will be described. In the present embodiment, points, which are different from the eleventh embodiment described above, will be mainly described.

Figure 18:
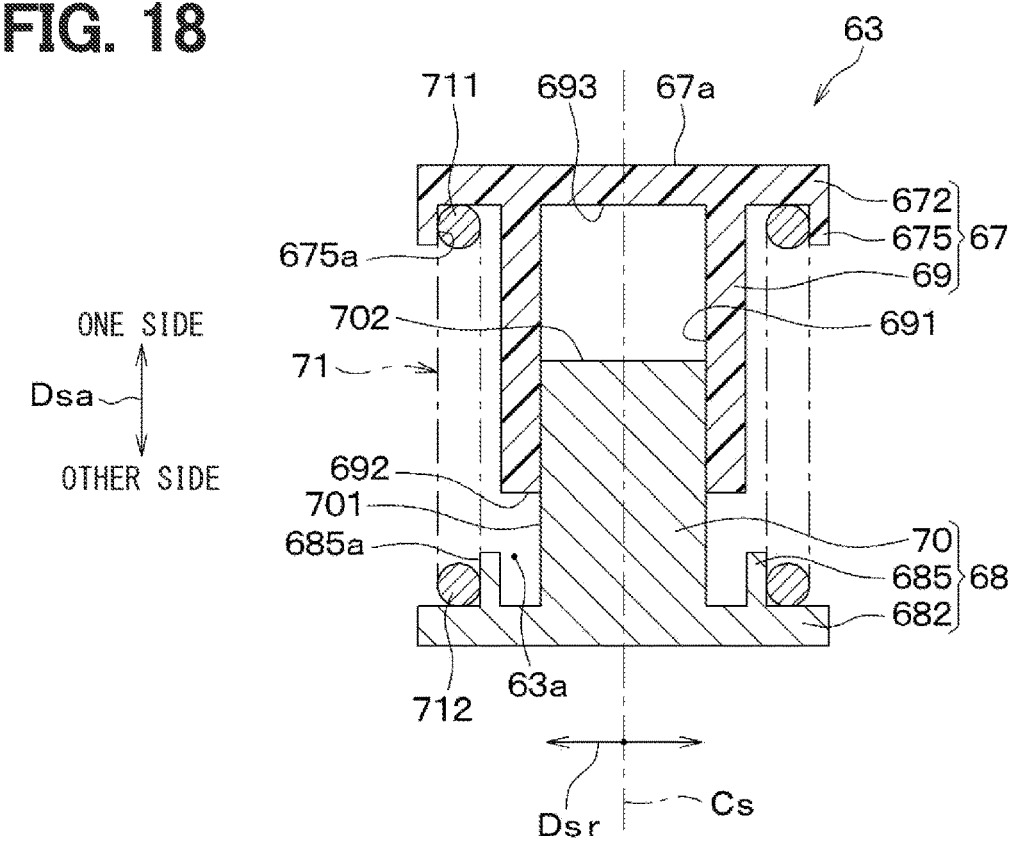
FIG. 18 is a cross-sectional view of a resilient unit of a twelfth embodiment alone, corresponding to FIG. 5.

As shown in FIG. 18, the first holder 67 of the present embodiment includes a first spring guide portion 675 in place of the first spring guide portion 673 of the eleventh embodiment. The outer guide portion 69, the first contact portion 672 and the first spring guide portion 675 are formed integrally in one-piece.

Specifically, the first spring guide portion 675 of the present embodiment is placed on the outer side of the one end portion 711 of the coil spring 71 in the unit radial direction Dsr and projects from an outer periphery of the first contact portion 672 toward the other side in the unit axial direction Dsa. The first spring guide portion 675 of the present embodiment has the first opposing surface 675*a*.

The first opposing surface 675*a* of the present embodiment is placed on the outer side of the one end portion 711 of the coil spring 71 in the unit radial direction Dsr and is opposed to the one end portion 711 in the unit radial direction Dsr. Among portions of the first holder 67, which are opposed to the coil spring 71 in the unit radial direction Dsr, the first opposing surface 675*a* is a closest portion of the first holder 67, which is the closest to the coil spring 71 in the unit radial direction Dsr. Therefore, the first opposing surface 675*a* of the present embodiment also limits the positional deviation of the one end portion 711 of the coil spring 71 relative to the first holder 67 in the unit radial direction Dsr, like the first opposing surface 673*a* of the eleventh embodiment.

Furthermore, the second holder 68 of the present embodiment includes a second spring guide portion 685 in place of the second spring guide portion 683 of the eleventh embodiment. The inner guide portion 70, the second contact portion 682 and the second spring guide portion 685 are formed integrally in one-piece.

Specifically, the second spring guide portion 685 of the present embodiment is placed on the inner side of the other end portion 712 of the coil spring 71 in the unit radial direction Dsr and projects from the second contact portion 682 toward the one side in the unit axial direction Dsa. The second spring guide portion 685 of the present embodiment has a second opposing surface 685*a*.

The second opposing surface 685*a* of the present embodiment is placed on the inner side of the other end portion 712 of the coil spring 71 in the unit radial direction Dsr and is opposed to the other end portion 712 in the unit radial direction Dsr. Among portions of the second holder 68, which are opposed to the coil spring 71 in the unit radial direction Dsr, the second opposing surface 685*a* is a closest portion of the second holder 68, which is the closest to the coil spring 71 in the unit radial direction Dsr. Therefore, the second opposing surface 685*a* of the present embodiment also limits the positional deviation of the other end portion 712 of the coil spring 71 relative to the second holder 68 in the unit radial direction Dsr, like the second opposing surface 683*a* of the eleventh embodiment.

The rest of the present embodiment, which is other than the above-described points, is the same as that of the eleventh embodiment. Furthermore, in the present embodiment, the advantages, which are achieved by the common configuration that is common to the eleventh embodiment described above, can be obtained in the same manner as in the eleventh embodiment.

Thirteenth Embodiment

Next, a thirteenth embodiment will be described. In the present embodiment, points, which are different from the first embodiment, will be mainly described.

Figure 19:
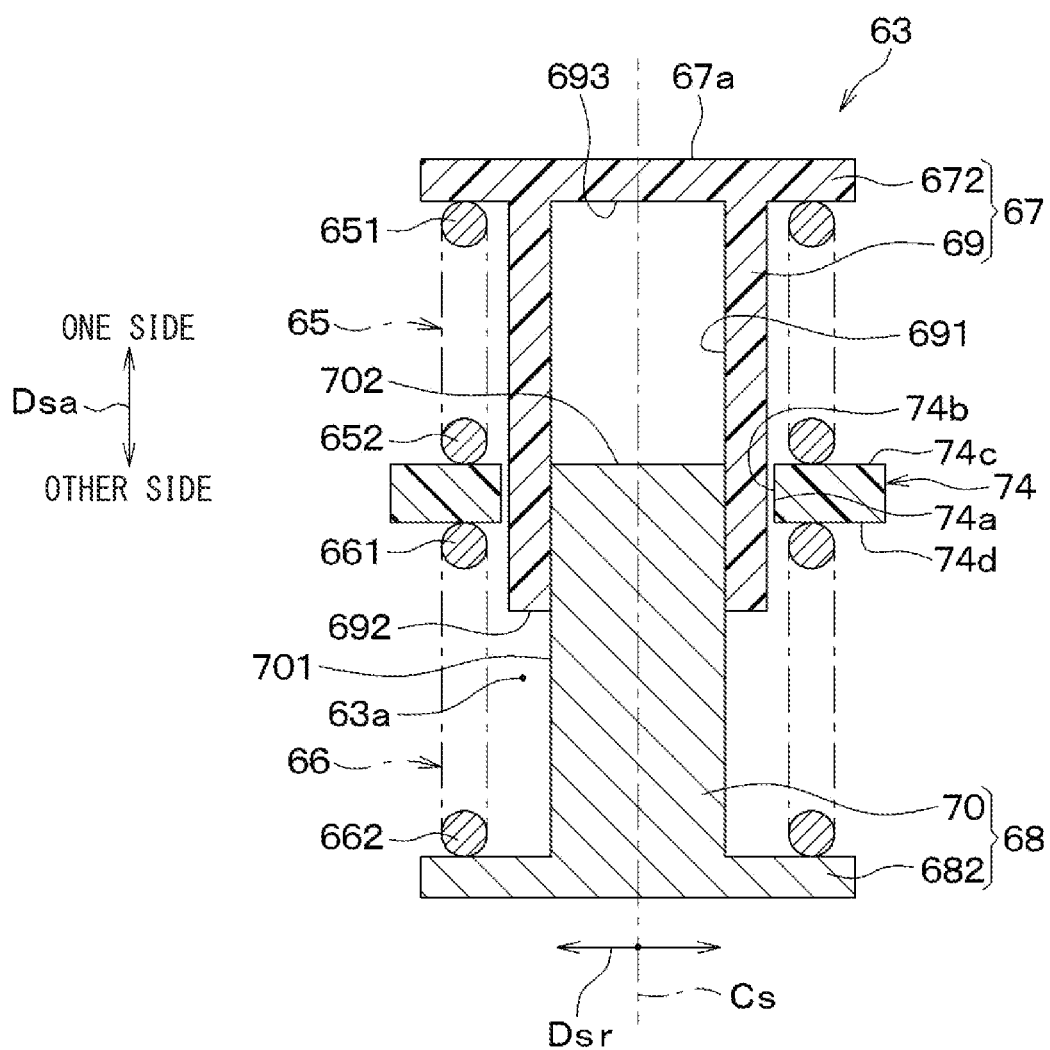
FIG. 19 is a cross-sectional view of a resilient unit of a thirteenth embodiment alone, corresponding to FIG. 5.

As shown in FIG. 19, in the present embodiment, the shape of the spring seat 74 is different from that of the first embodiment. Furthermore, in the present embodiment, unlike the first embodiment, the diameter of the first coil spring 65 and the diameter of the second coil spring 66 are equal to each other.

Specifically, the spring seat 74 of the present embodiment is shaped in a planar plate form and has: a one-side surface 74c, which is located on the one side in the unit axial direction Dsa; and an other-side surface 74d, which is located on the other side in the unit axial direction Dsa.

The first coil spring 65 is placed on the one side of the spring seat 74 in the unit axial direction Dsa. The other end portion 652 of the first coil spring 65 contacts the one-side surface 74c of the spring seat 74 from the one side in the unit axial direction Dsa and urges the one-side surface 74c of the spring seat 74.

The second coil spring 66 is placed on the other side of the spring seat 74 in the unit axial direction Dsa. The one end portion 661 of the second coil spring 66 contacts the other-side surface 74d of the spring seat 74 from the other side in the unit axial direction Dsa and urges the other-side surface 74d of the spring seat 74.

Like in the first embodiment, the spring seat 74 of the present embodiment also has the insertion hole 74a, which extends through the spring seat 74 in the unit axial direction Dsa. However, the outer guide portion 69 is inserted through the insertion hole 74a. In the state where the outer guide portion 69 is inserted through the insertion hole 74a, the outer guide portion 69 is inserted through the insertion hole 74a such that the outer guide portion 69 is movable relative to the insertion hole 74a in the unit axial direction Dsa. Therefore, in the present embodiment, the spring seat 74 is placed on the outer side of the outer guide portion 69 in the unit radial direction Dsr.

In the present embodiment, unlike the first embodiment, the spring seat 74 does not include the extending portion 741, the spring seat inner portion 742, the spring seat outer portion 743 and the hole forming portion 746. Furthermore, the first spring guide portion 673 and the second spring guide portion 683 (see FIG. 4) are not provided. Furthermore, the inner guide portion 70 and the second contact portion 682 are not separately formed as the separate components but are formed integrally in one-piece as a one-piece component.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Although the present embodiment is a modification based on the first embodiment, it is possible to combine the present embodiment with any one of the second to twelfth embodiments described above.

Fourteenth Embodiment

Next, a fourteenth embodiment will be described. In the present embodiment, points, which are different from the thirteenth embodiment described above, will be mainly described.

Figure 20:
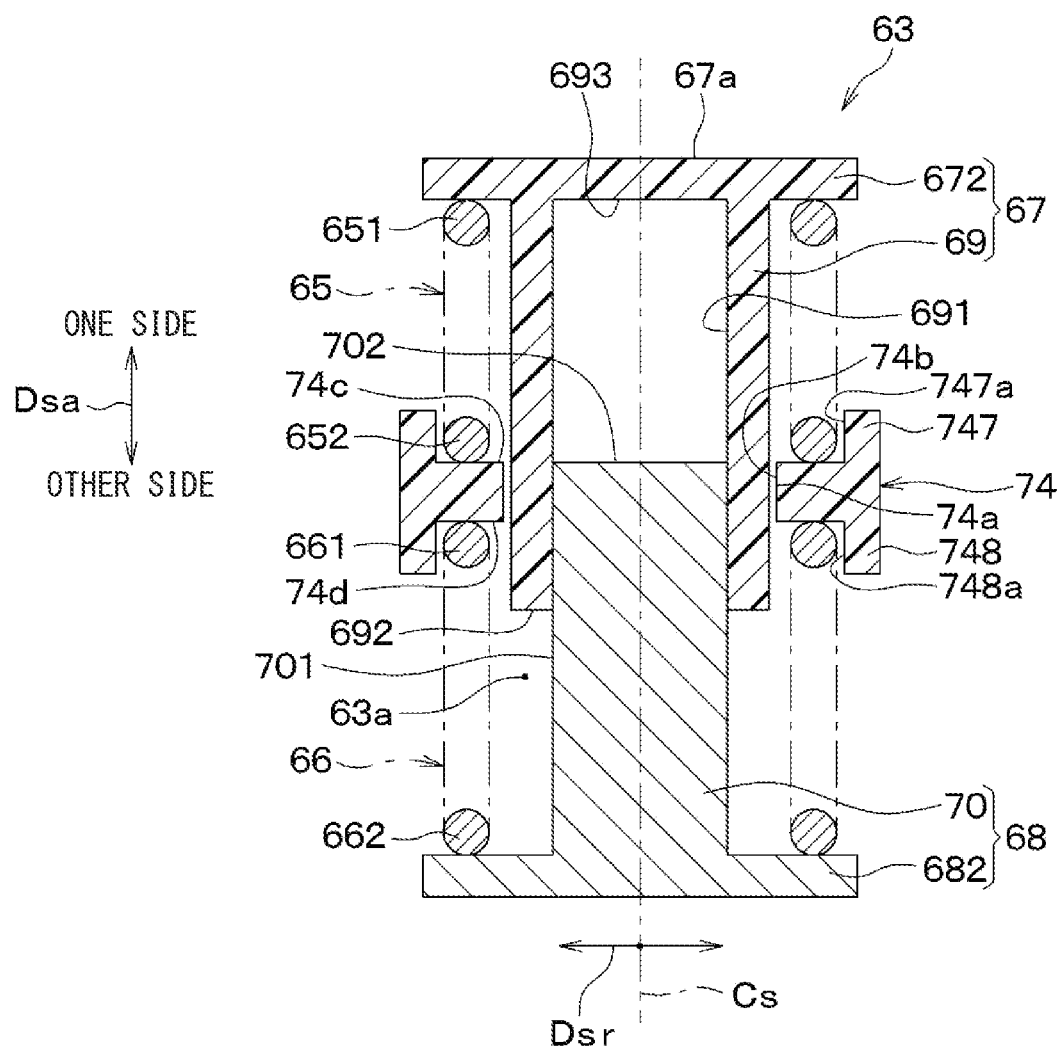
FIG. 20 is a schematic cross-sectional view of a resilient unit of a fourteenth embodiment alone, corresponding to FIG. 5.

As shown in FIG. 20, the spring seat 74 of the present embodiment includes a first spring seat guide portion 747 and a second spring seat guide portion 748. The first spring seat guide portion 747 is placed on the outer side of the other end portion 652 of the first coil spring 65 in the unit radial direction Dsr and projects from an outer periphery of the one-side surface 74c of the spring seat 74 toward the one side in the unit axial direction Dsa. The first spring seat guide portion 747 has a first spring seat opposing surface 747a, which faces inward in the unit radial direction Dsr and circumferentially extends in a circular ring form (cylindrical form).

The first spring seat opposing surface 747a of the present embodiment is placed on the outer side of the other end portion 652 of the first coil spring 65 in the unit radial direction Dsr and is opposed to the other end portion 652 in the unit radial direction Dsr. Among portions of the spring seat 74, which are opposed to the first coil spring 65 in the unit radial direction Dsr, the first spring seat opposing surface 747a is a closest portion of the spring seat 74, which is the closest to the first coil spring 65 in the unit radial direction Dsr. Therefore, the first spring seat opposing surface 747a of the present embodiment also limits the positional deviation of the other end portion 652 of the first coil spring 65 relative to the spring seat 74 in the unit radial direction Dsr, like the first spring seat opposing surface 744a of the first embodiment.

Furthermore, the second spring seat guide portion 748 is placed on the outer side of the one end portion 661 of the second coil spring 66 in the unit radial direction Dsr and projects from an outer periphery of the other-side surface 74d of the spring seat 74 toward the other side in the unit axial direction Dsa. The second spring seat guide portion 748 has a second spring seat opposing surface 748a, which faces inward in the unit radial direction Dsr and circumferentially extends in a circular ring form (cylindrical form).

The second spring seat opposing surface 748a of the present embodiment is placed on the outer side of the one end portion 661 of the second coil spring 66 in the unit radial direction Dsr and is opposed to the one end portion 661 in the unit radial direction Dsr. Among portions of the spring seat 74, which are opposed to the second coil spring 66 in the unit radial direction Dsr, the second spring seat opposing surface 748a is a closest portion of the spring seat 74, which is the closest to the second coil spring 66 in the unit radial direction Dsr. Therefore, the second spring seat opposing surface 748a of the present embodiment also limits the positional deviation of the one end portion 661 of the second coil spring 66 relative to the spring seat 74 in the unit radial direction Dsr, like the second spring seat opposing surface 745a of the first embodiment.

The rest of the present embodiment, which is other than the above-described points, is the same as that of the thirteenth embodiment. Furthermore, in the present embodiment, the advantages, which are achieved by the common configuration that is common to the thirteenth embodiment described above, can be obtained in the same manner as in the thirteenth embodiment. Furthermore, the advantages, which are achieved by the common configuration that is common to the first embodiment described above, can be obtained in the same manner as in the first embodiment.

Fifteenth Embodiment

Next, a fifteenth embodiment will be described. In the present embodiment, points, which are different from the first embodiment, will be mainly described.

Figure 21A:
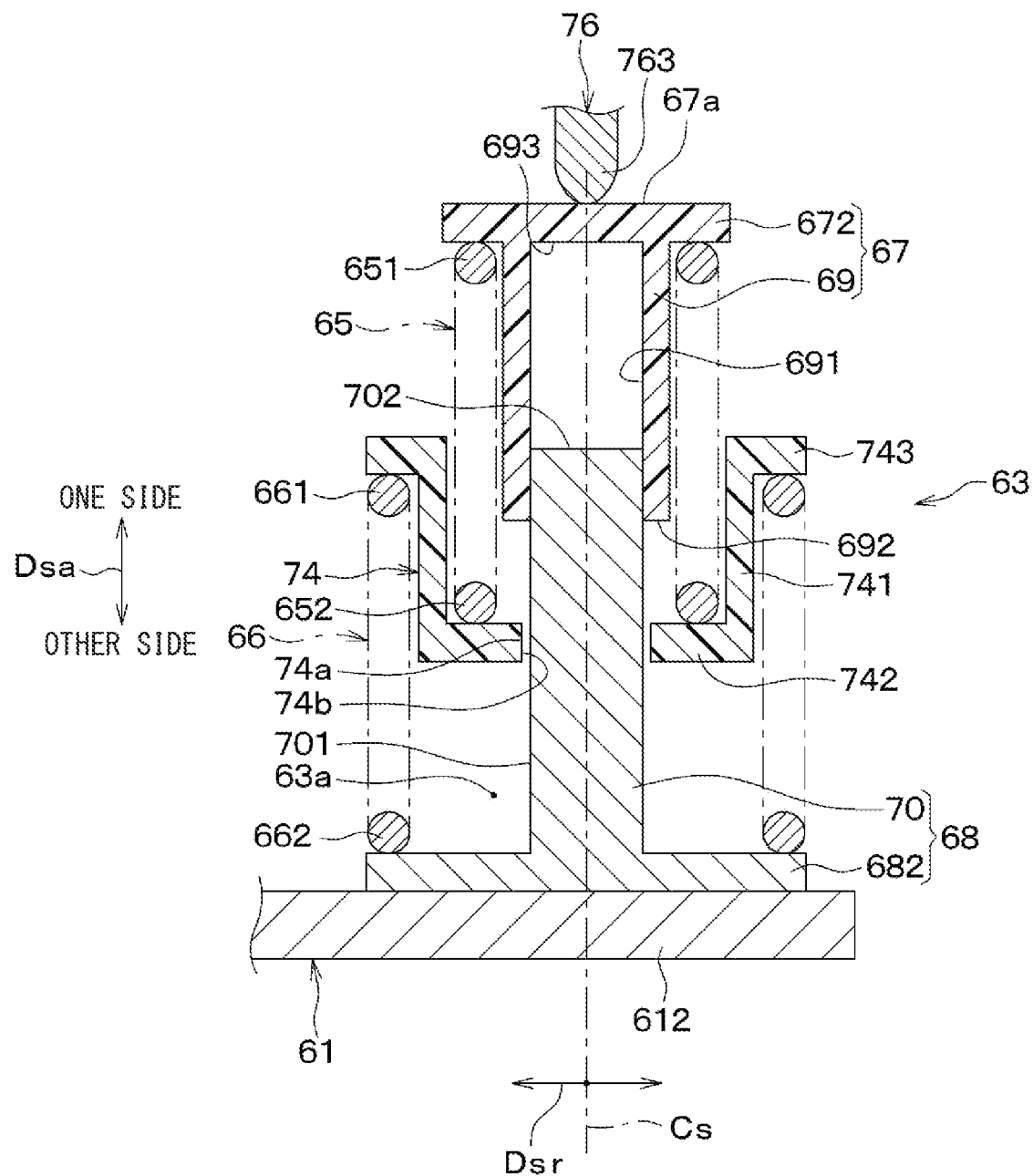
FIG. 21A is a first diagram indicating a behavior of each component of a resilient unit of a fifteenth embodiment corresponding to FIG. 5 and is a cross-sectional view schematically showing the resilient unit and an area around the resilient unit in an undepressed state of a pedal.
Figure 21B:
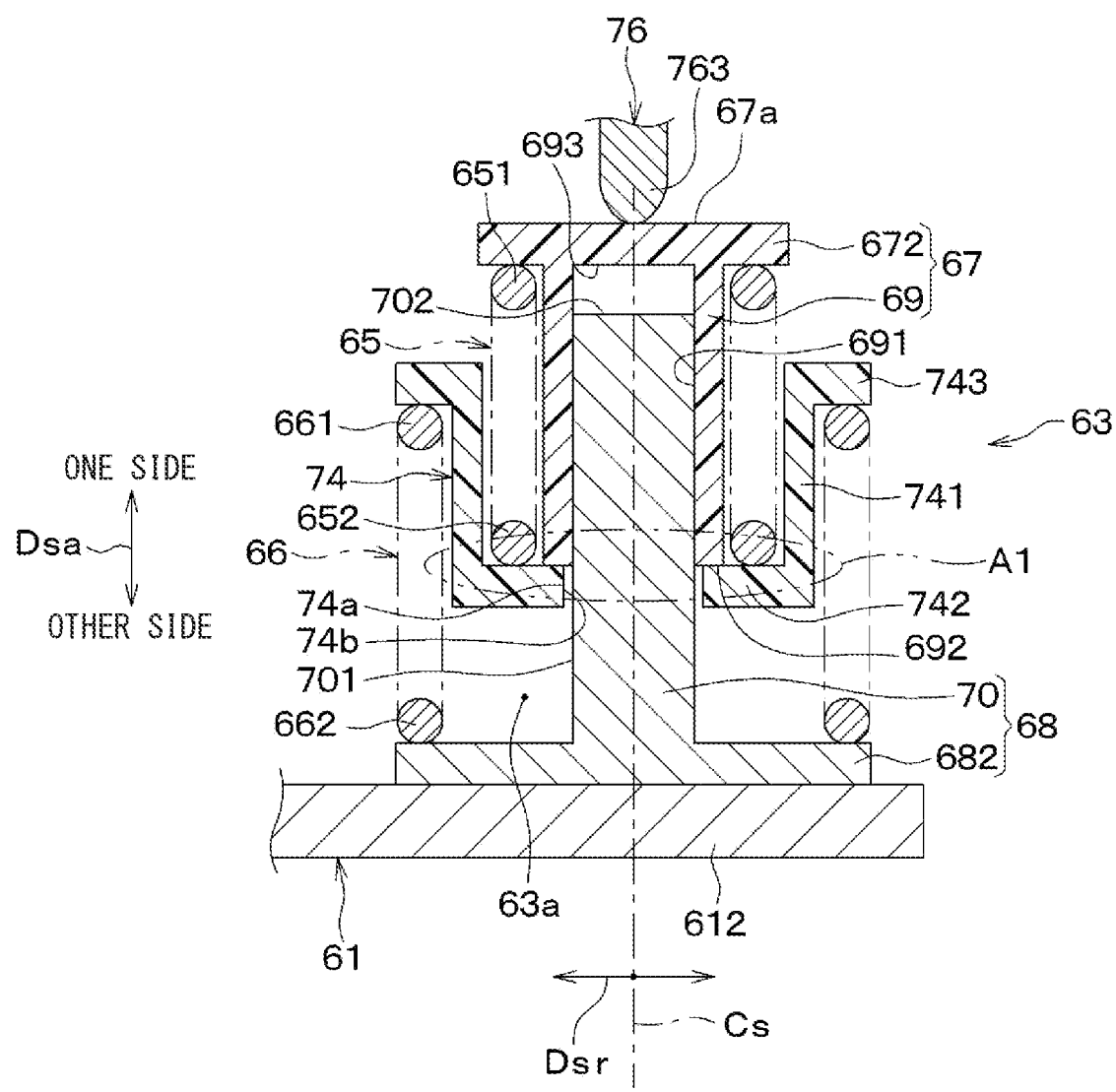
FIG. 21B is a second diagram indicating the behavior of each component of the resilient unit of the fifteenth embodiment corresponding to FIG. 5 and is a cross-sectional view schematically showing the resilient unit in a state in which a spring seat abuts against a first holder in a unit axial direction in a middle of a spring compression process.
Figure 21C:
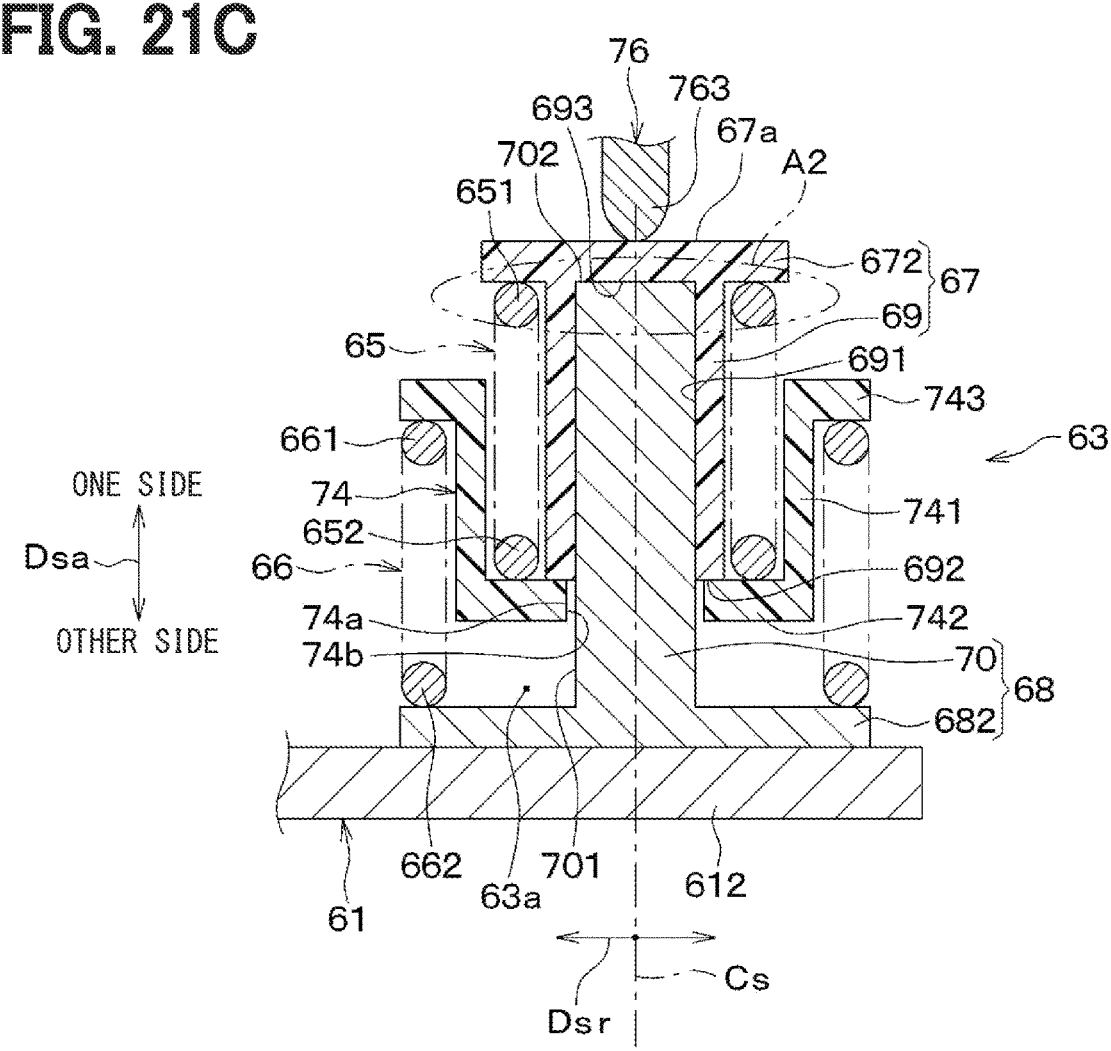
FIG. 21C is a third diagram indicating the behavior of each component of the resilient unit of the fifteenth embodiment corresponding to FIG. 5 and is a cross-sectional view schematically showing the resilient unit in a state in which a first coil spring and a second coil spring are most compressed in the spring compression process.

FIGS. 21A, 21B and 21C respectively show various states of the resilient unit 63 of the present embodiment, while the state of the resilient unit 63 changes in response to the depressing operation of the pedal 40 by the driver 81. As shown in FIGS. 21A, 21B and 21C, in response to the depressing operation of the pedal 40 by the driver 81, the pedal 40 drives the first holder 67 and the second holder 68 such that the first holder 67 and the second holder 68 make the relative movement therebetween in the compressing direction for compressing the first coil spring 65 and the second coil spring 66.

Specifically, during the moving process (i.e., a spring compression process) of moving the first holder 67 and the second holder 68 relative to each other in the compressing direction for compressing the first coil spring 65 and the second coil spring 66, the state of the resilient unit 63 changes in an order of FIGS. 21A, 21B and 21C. That is, during the spring compression process, the spring seat 74 first abuts against the first holder 67 in the unit axial direction Dsa, and then the first holder 67 and the second holder 68 abut against each other in the unit axial direction Dsa.

Specifically, during the spring compression process, in the resilient unit 63, the first and second holders 67, 68 make the relative displacement from the state of FIG. 21A, in which the spring seat 74 does not abut against both of the first and second holders 67, 68, to the state of FIG. 21B. At this time, the compression deformation of each of the first and second coil springs 65, 66 is progressed, and the amount of deflection of the plate spring 61 is increased. Then, when the relative displacement of the first and second holders 67, 68 is progressed, the spring seat 74 abuts against the outer guide portion 69 of the first holder 67 in the unit axial direction Dsa, as shown at an area A1 of FIG. 21B. In this way, the compression deformation of the first coil spring 65 is stopped.

Furthermore, during the spring compression process, the state of the resilient unit 63 changes from the state of FIG. 21B to the state of FIG. 21C while the spring seat 74 is kept abutting against the outer guide portion 69. At this time, the compression deformation of the second coil spring 66 is progressed while the compression deformation of the first coil spring 65 is kept stopped, and the amount of deflection of the plate spring 61 is increased. When the resilient unit 63 reaches the state of FIG. 21C, the first holder 67 abuts against the inner guide portion 70 of the second holder 68 in the unit axial direction Dsa, as shown at an area A2 of FIG. 21C while the spring seat 74 is kept abutting against the outer guide portion 69. In this way, the compression deformation of the second coil spring 66 is also stopped. Even in the present embodiment, like in the first embodiment, when the pedal 40 is further depressed after the resilient unit 63 is placed in the state shown in FIG. 21C, the amount of deflection of the plate spring 61 is increased while the compression deformation of each of the first and second coil springs 65, 66 is stopped.

Figure 22:
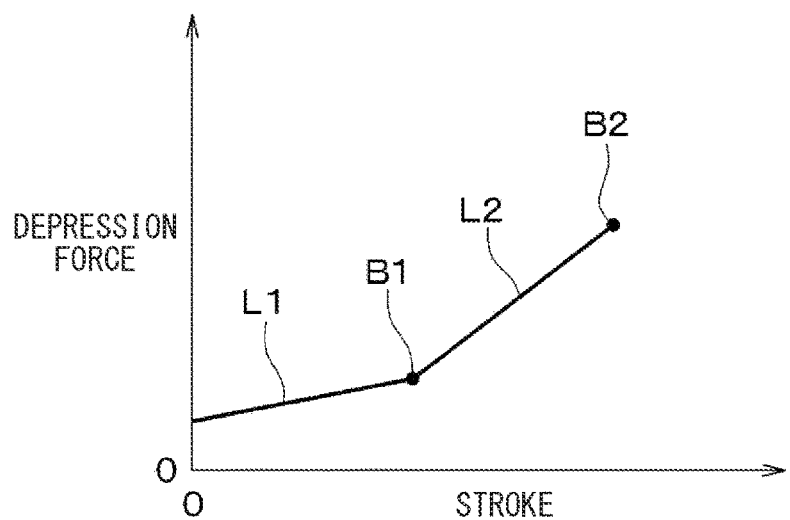
FIG. 22 is a diagram showing a depression force characteristic that is a relationship between a depression force applied to the pedal and a stroke of the pedal according to the fifteenth embodiment.

During a transition, during which the resilient unit 63 shifts from the state of FIG. 21A to the state of FIG. 21C in the spring compression process, when the depression force, which is applied to the pedal 40, is increased, a stroke, which is the rotational angle of the pedal 40, is increased, as indicated by a line L1 and a line L2 in FIG. 22.

In the depression force characteristic indicated by the line L1 and the line L2 in FIG. 22, the inflection point B1 indicates the state of FIG. 21B, and the inflection point B2 indicates the state of FIG. 21C. Furthermore, as indicated by the line L1 and the line L2, an increase rate of the depression force relative to the stroke is increased after the resilient unit 63 reaches the state of FIG. 21B in comparison to the state of the resilient unit 63 before the state of FIG. 21B, while the inflection point B1 serves as a point of this change.

(1) As described above, according to the present embodiment, as shown in FIGS. 21A, 21B and 21C, during the spring compression process, the spring seat 74 abuts against the first holder 67 in the unit axial direction Dsa, and then the first holder 67 and the second holder 68 abut against each other in the unit axial direction Dsa. Therefore, as shown in FIG. 22, it is possible to obtain the depression force characteristic where the increase rate of the depression force relative to the stroke is increased when the stroke of the pedal 40 is increased from the undepressed state of the pedal 40. In the depression force characteristic of the present embodiment, the increase rate of the depression force relative to the stroke is increased in a stepwise manner, and the inflection point B1 of FIG. 22 serves as the point of change in the increase rate of the depression force.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Sixteenth Embodiment

Next, a sixteenth embodiment will be described. In the present embodiment, points, which are different from the fifteenth embodiment described above, will be mainly described.

Figure 23A:
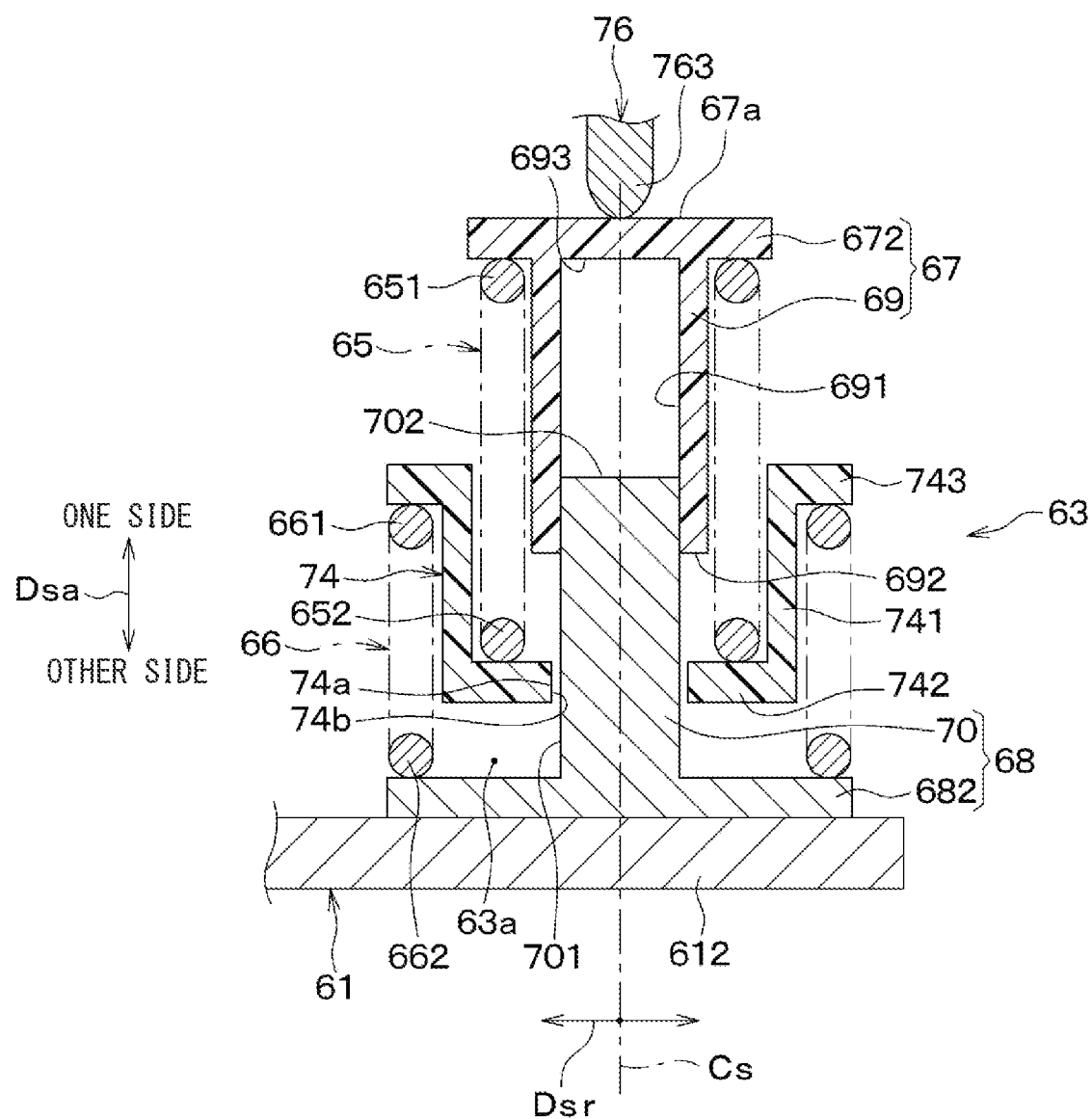
FIG. 23A is a first diagram indicating a behavior of each component of a resilient unit of a sixteenth embodiment and is a schematic cross-sectional view corresponding to FIG. 21A of the fifteenth embodiment.
Figure 23B:
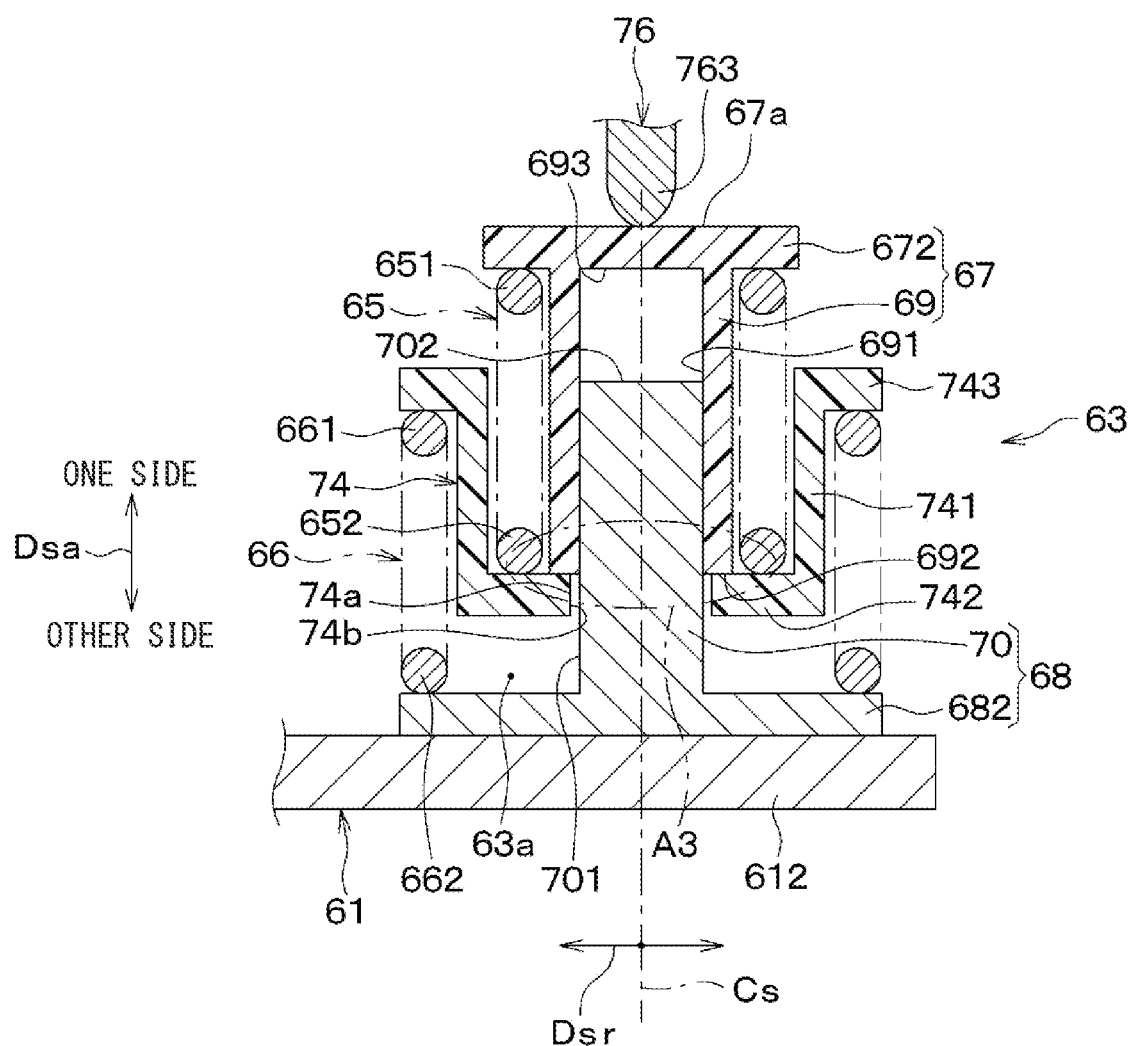
FIG. 23B is a second diagram indicating the behavior of each component of the resilient unit of the sixteenth embodiment and is a schematic cross-sectional view corresponding to FIG. 21B of the fifteenth embodiment.
Figure 23C:
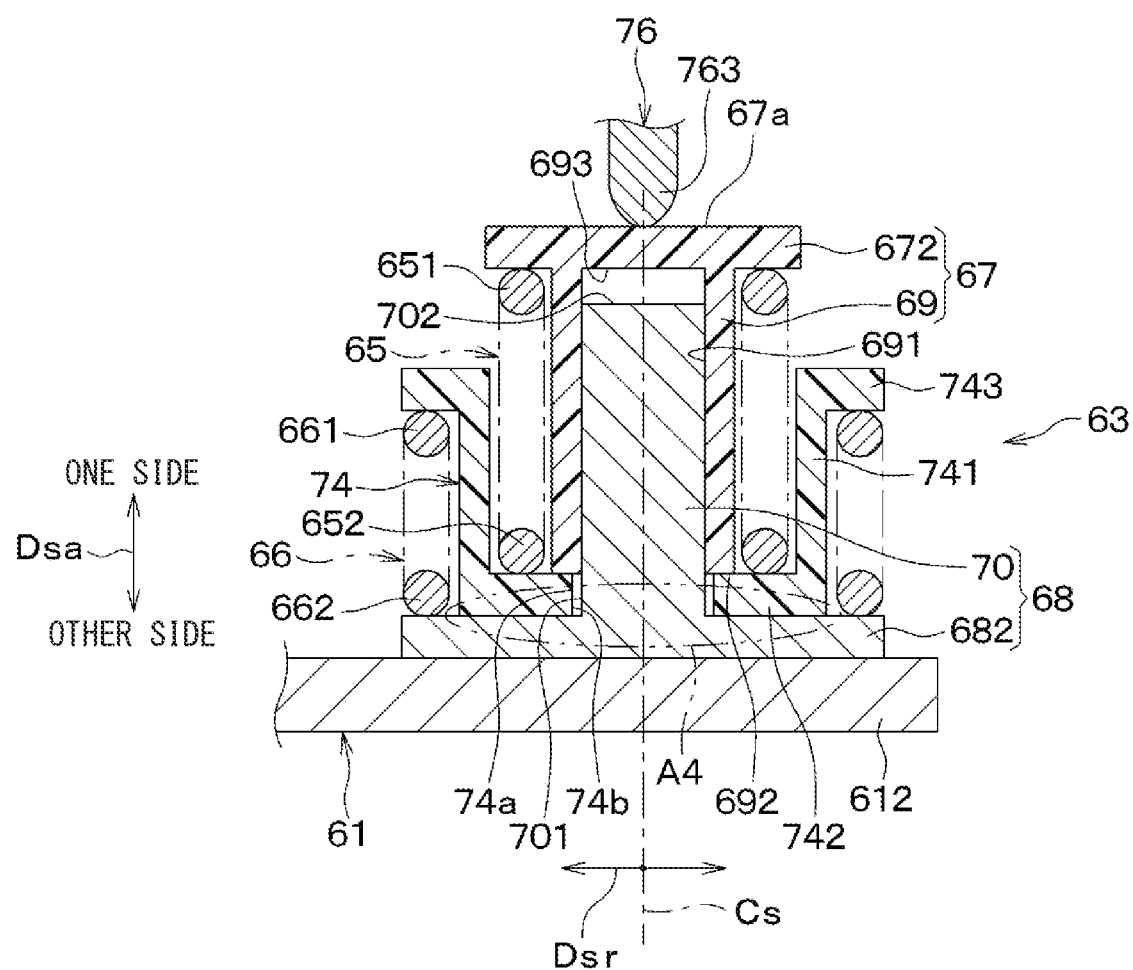
FIG. 23C is a third diagram indicating the behavior of each component of the resilient unit of the sixteenth embodiment and is a schematic cross-sectional view corresponding to FIG. 21C of the fifteenth embodiment.

FIGS. 23A, 23B and 23C respectively show various states of the resilient unit 63 of the present embodiment, while the state of the resilient unit 63 changes in response to the depressing operation of the pedal 40 by the driver 81.

In the present embodiment, during the spring compression process, in which the first holder 67 and the second holder 68 are moved relative to each other in the compressing direction for compressing the first coil spring 65 and the second coil spring 66, the state of the resilient unit 63 changes in an order of FIGS. 23A, 23B and 23C. That is, even in the present embodiment, like in the fifteenth embodiment, during the spring compression process, the spring seat 74 abuts against the first holder 67 in the unit axial direction Dsa, and then the first holder 67 and the second holder 68 abut against each other in the unit axial direction Dsa.

Specifically, during the spring compression process, when the resilient unit 63 shifts from the state of FIG. 23A to the state of FIG. 23B, the spring seat 74 abuts against the outer guide portion 69 of the first holder 67 in the unit axial direction Dsa, as shown at an area A3 of FIG. 23B. Furthermore, when the resilient unit 63 shifts from the state of FIG. 23B to the state of FIG. 23C, the spring seat 74 abuts against the second contact portion 682 of the second holder 68 in the unit axial direction Dsa, as shown at an area A4 in FIG. 23C while the spring seat 74 is kept abutting against the outer guide portion 69. That is, the first holder 67 and the second holder 68 abut against each other in the unit axial direction Dsa while the spring seat 74 is interposed between the first holder 67 and the second holder 68.

The depression force characteristic of the present embodiment is the same as the depression force characteristic of the fifteenth embodiment shown in FIG. 22. In the depression force characteristic of the present embodiment, the inflection point B1 indicates the state of FIG. 23B, and the inflection point B2 indicates the state of FIG. 23C.

The rest of the present embodiment, which is other than the above-described points, is the same as that of the fifteenth embodiment. Furthermore, in the present embodiment, the advantages, which are achieved by the common configuration that is common to the fifteenth embodiment described above, can be obtained in the same manner as in the fifteenth embodiment.

Seventeenth Embodiment

Next, a seventeenth embodiment will be described. In the present embodiment, points, which are different from the thirteenth embodiment described above, will be mainly described.

Figure 24:
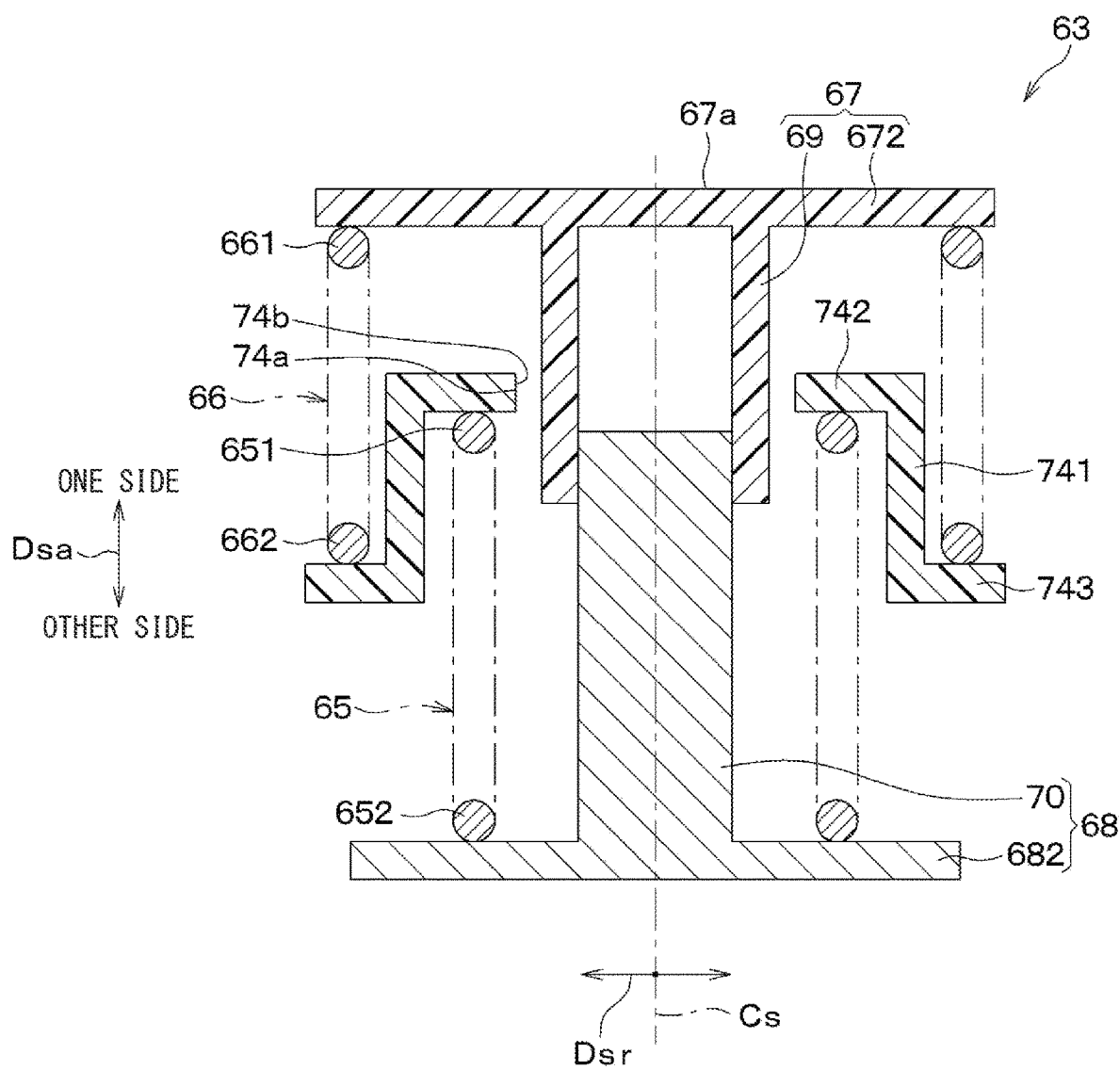
FIG. 24 is a schematic cross-sectional view of a resilient unit of a seventeenth embodiment alone, corresponding to FIG. 5.

As shown in FIG. 24, in the present embodiment, the shape of the spring seat 74 is different from that of the thirteenth embodiment.

Furthermore, in the present embodiment, the outer diameter of the first coil spring 65 is smaller than the inner diameter of the second coil spring 66. In the undepressed state of the pedal 40, the portion of the first coil spring 65 is placed on the inner side of the second coil spring 66 in the unit radial direction Dsr to overlap with the second coil spring 66.

Specifically, in the undepressed state of the pedal 40, the first coil spring 65 is displaced from the second coil spring 66 toward the other side in the unit axial direction Dsa. Furthermore, another portion of the first coil spring 65, which is located on the one side in the unit axial direction Dsa, is radially placed on an inner side of another portion of the second coil spring 66, which is located on the other side in the unit axial direction Dsa, in the unit radial direction Dsr, and this other portion of the first coil spring 65 overlaps with this other portion of the second coil spring 66, and a radial gap is formed between this other portion of the first coil spring 65 and this other portion of the second coil spring 66.

Like the spring seat 74 of the first embodiment, the spring seat 74 of the present embodiment includes the extending portion 741, the spring seat inner portion 742 and the spring seat outer portion 743. However, unlike the first embodiment, in the present embodiment, the spring seat inner portion 742 radially inwardly extends in the unit radial direction Dsr from the end portion of the extending portion 741, which is located on the one side in the unit axial direction Dsa. The spring seat outer portion 743 radially outwardly extends in the unit radial direction Dsr from the end portion of the extending portion 741, which is located on the other side in the unit axial direction Dsa. In short, the spring seat outer portion 743 is placed on the other side of the spring seat inner portion 742 in the unit axial direction Dsa.

In the present embodiment, the first coil spring 65 is clamped between the spring seat inner portion 742 and the second contact portion 682 in the unit axial direction Dsa and is compressed in the unit axial direction Dsa by the spring seat inner portion 742 and the second contact portion 682. Furthermore, the second coil spring 66 is clamped between the first contact portion 672 and the spring seat outer portion 743 in the unit axial direction Dsa and is compressed in the unit axial direction Dsa by the first contact portion 672 and the spring seat outer portion 743.

Furthermore, the outer guide portion 69 is inserted through the insertion hole 74a of the spring seat 74 of the present embodiment. The size of the inner diameter of the insertion hole 74a relative to the outer diameter of the outer guide portion 69 of the present embodiment is set in a manner similar to the size of the inner diameter of the insertion hole 74a relative to the inner guide portion 70 of the first embodiment. That is, the size of the insertion hole 74a is set such that the insertion hole inner peripheral surface 74b does not arrest the outer guide portion 69 in the unit radial direction Dsr in the case where the spring seat 74 abuts against the one or both of the first and second holders 67, 68 in the unit axial direction Dsa in response to the compression of the respective coil springs 65, 66.

The rest of the present embodiment, which is other than the above-described points, is the same as that of the thirteenth embodiment. Furthermore, in the present embodiment, the advantages, which are achieved by the common configuration that is common to the thirteenth embodiment described above, can be obtained in the same manner as in the thirteenth embodiment. Furthermore, the advantages, which are achieved by the common configuration that is common to the first embodiment described above, can be obtained in the same manner as in the first embodiment.

Although the present embodiment is a modification based on the thirteenth embodiment, it is possible to combine the present embodiment with the fifteenth embodiment or the sixteenth embodiment described above.

Eighteenth Embodiment

Next, an eighteenth embodiment will be described. In the present embodiment, points, which are different from the fifteenth embodiment described above, will be mainly described.

Figure 25:
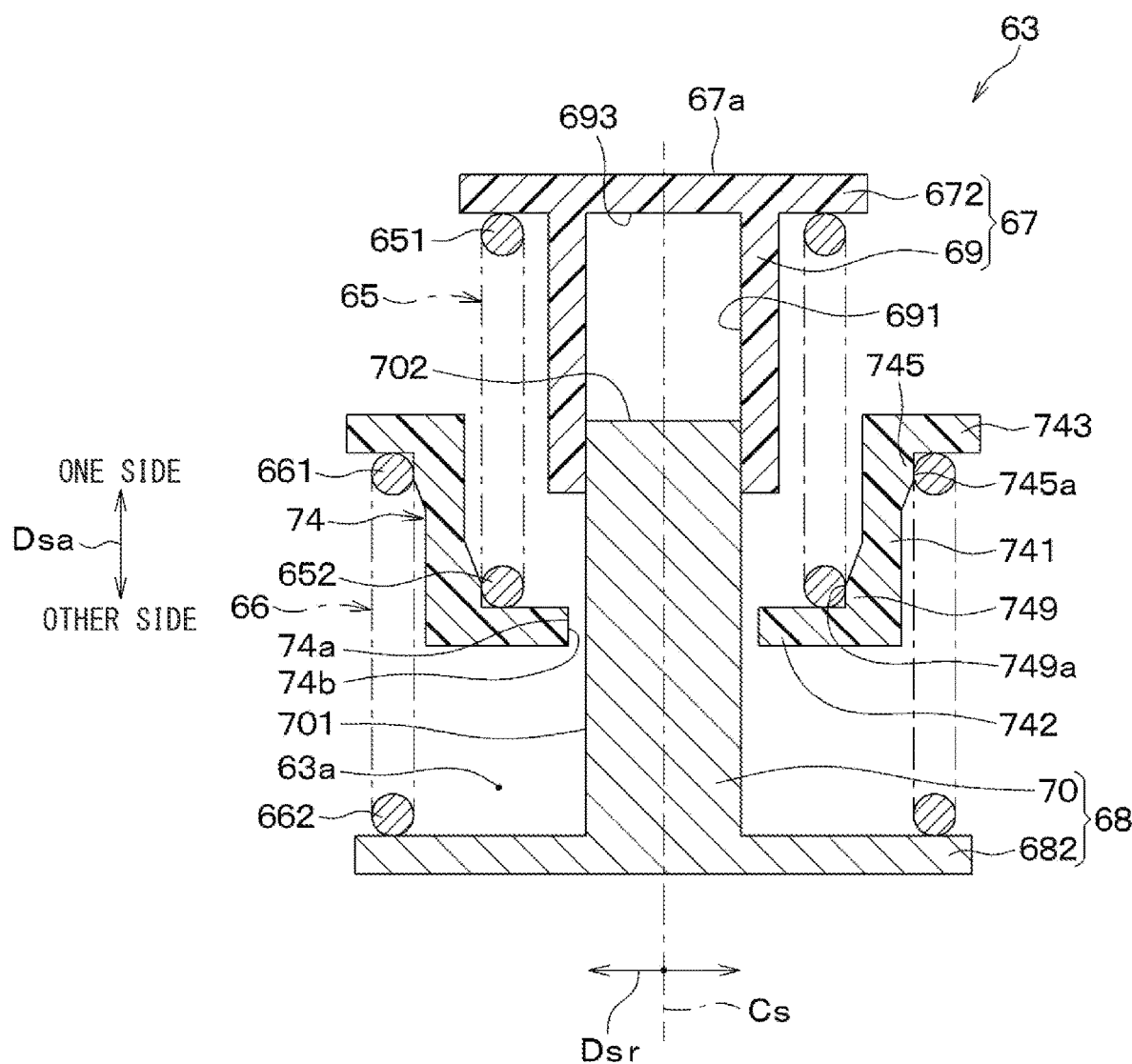
FIG. 25 is a schematic cross-sectional view of a resilient unit of an eighteenth embodiment alone, corresponding to FIG. 5.

As shown in FIG. 25, in the present embodiment, the extending portion 741 of the spring seat 74 includes a spring seat inner guide portion 749 and the spring seat outer guide portion 745. The spring seat inner guide portion 749 is formed at an end portion of the extending portion 741, which is located on the other side in the unit axial direction Dsa, and the spring seat outer guide portion 745 is formed at an end portion of the extending portion 741, which is located on the one side in the unit axial direction Dsa.

The spring seat inner guide portion 749 of the present embodiment has a first spring seat opposing surface 749a that is opposed to the other end portion 652 of the first coil spring 65 in the unit radial direction Dsr. The first spring seat opposing surface 749a is shaped in a circular ring form (cylindrical form) centered on the unit central axis Cs and faces inward in the unit radial direction Dsr. That is, the first spring seat opposing surface 749a is located on the inner side of the extending portion 741 in the unit radial direction Dsr.

Furthermore, among portions of the spring seat 74, which are opposed to the first coil spring 65 in the unit radial direction Dsr, the first spring seat opposing surface 749a is a closest portion of the spring seat 74, which is the closest to the first coil spring 65 in the unit radial direction Dsr. For example, the first spring seat opposing surface 749a may contact the other end portion 652 of the first coil spring 65 in the unit radial direction Dsr or may be placed such that a small radial gap is interposed between the other end portion 652 of the first coil spring 65 and the first spring seat opposing surface 749a.

Because of the configuration described above, in a case where some kind of load is applied to the first coil spring 65 to cause positional deviation of the other end portion 652 of the first coil spring 65 in the unit radial direction Dsr relative to the pedal central axis CL, the first coil spring 65 first abuts against the first spring seat opposing surface 749a in the unit radial direction Dsr among the portions of the spring seat 74. That is, the first spring seat opposing surface 749a limits the positional deviation of the other end portion 652 of the first coil spring 65 relative to the spring seat 74 in the unit radial direction Dsr.

The spring seat outer guide portion 745 of the present embodiment has the same configuration as the spring seat outer guide portion 745 of the first embodiment described above.

The rest of the present embodiment, which is other than the above-described points, is the same as that of the fifteenth embodiment. Furthermore, in the present embodiment, the advantages, which are achieved by the common configuration that is common to the fifteenth embodiment described above, can be obtained in the same manner as in the fifteenth embodiment. Furthermore, the advantages, which are achieved by the common configuration that is common to the first embodiment described above, can be obtained in the same manner as in the first embodiment.

Although the present embodiment is a modification based on the fifteenth embodiment, it is possible to combine the present embodiment with the sixteenth embodiment or the seventeenth embodiment described above.

Nineteenth Embodiment

Next, a nineteenth embodiment will be described. In the present embodiment, points, which are different from the eighteenth embodiment described above, will be mainly described.

Figure 26:
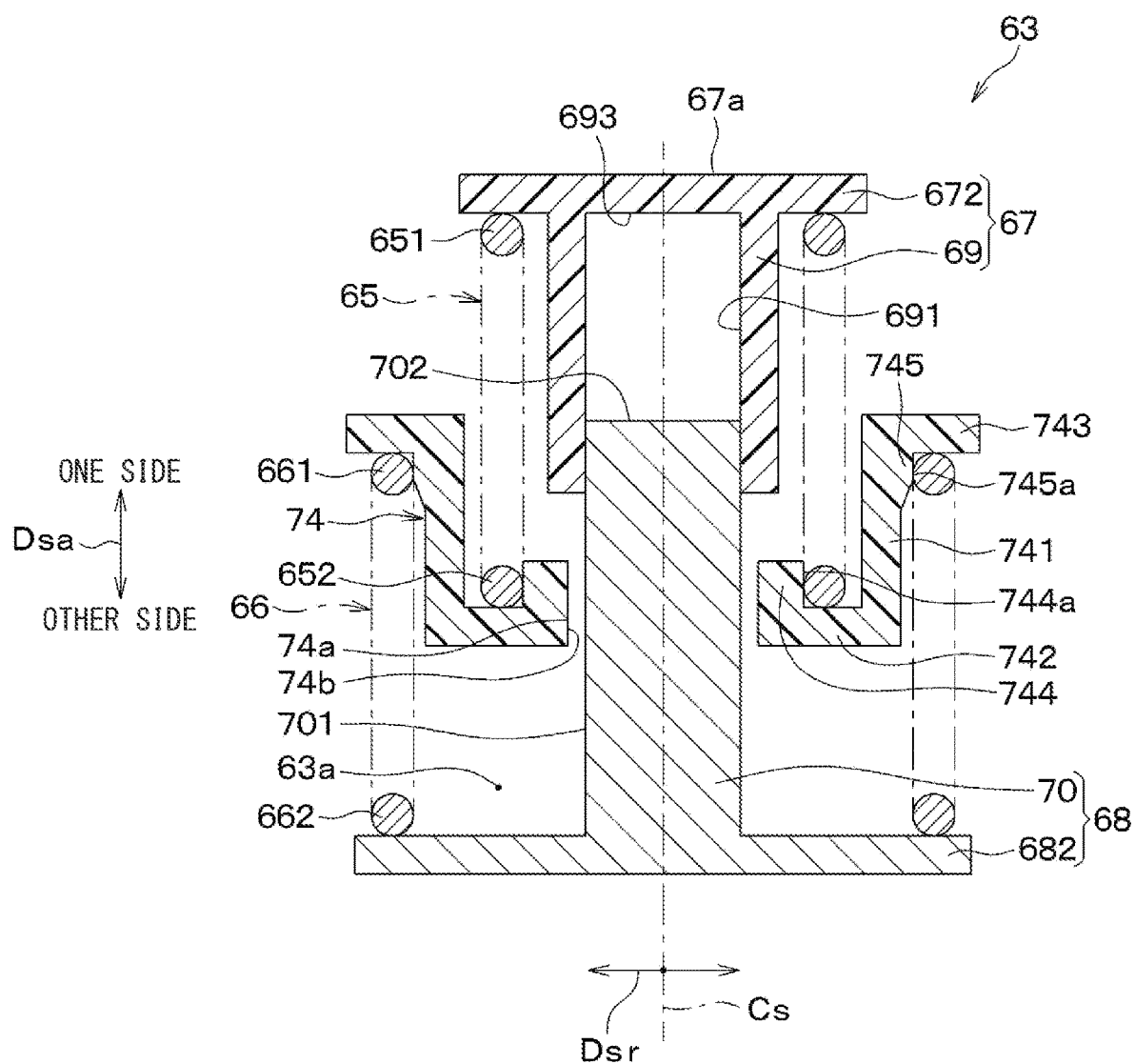
FIG. 26 is a schematic cross-sectional view of a resilient unit of a nineteenth embodiment alone, corresponding to FIG. 5.

As shown in FIG. 26, in the present embodiment, the extending portion 741 of the spring seat 74 includes the spring seat outer guide portion 745 but does not include the spring seat inner guide portion 749 (see FIG. 25). Instead, the spring seat inner portion 742 of the spring seat 74 has the spring seat inner guide portion 744 which projects toward the one side in the unit axial direction Dsa. The spring seat inner guide portion 744 of the present embodiment has the same configuration as the spring seat inner guide portion 744 of the first embodiment described above.

The rest of the present embodiment, which is other than the above-described points, is the same as that of the eighteenth embodiment. Furthermore, in the present embodiment, the advantages, which are achieved by the common configuration that is common to the eighteenth embodiment described above, can be obtained in the same manner as in the eighteenth embodiment.

Twentieth Embodiment

Next, a twentieth embodiment will be described. In the present embodiment, points, which are different from the second embodiment described above, will be mainly described.

Figure 27:
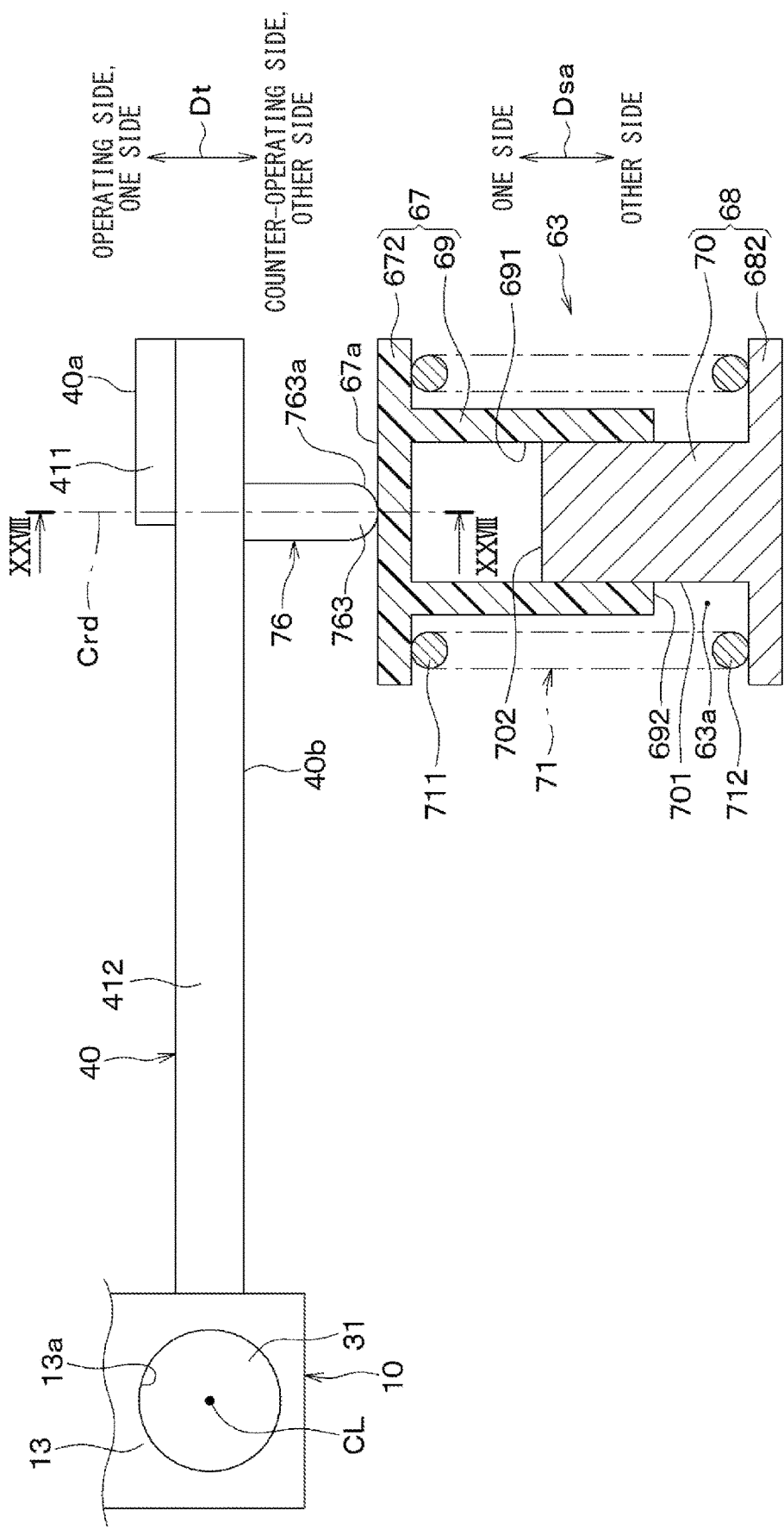
FIG. 27 is a diagram schematically indicating a structure of a pedal device of a twentieth embodiment and is a diagram showing a cross-section of a resilient unit.

As shown in FIG. 27, like in the first and second embodiments, the coupling rod 76 projects from the pedal back surface 40b toward the counter-operating side of the pedal 40 and is fixed to the pedal 40 by, for example, a bolt. The coupling rod 76 of the present embodiment is formed integrally in one-piece as a one-piece component. Furthermore, in FIG. 27 and equivalent drawings, which will be described later and are equivalent to FIG. 27, indication of the plate spring 61 and the other components is omitted as appropriate.

Figure 28:
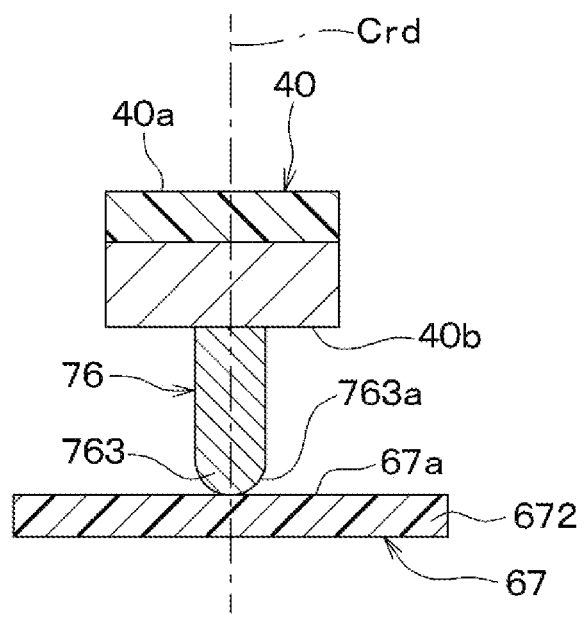
FIG. 28 is a schematic cross-sectional view taken along line XXVIII-XXVIII in FIG. 27 according to the twentieth embodiment.

As shown in FIGS. 27 and 28, the coupling rod 76 of the present embodiment includes the rod distal end portion 763, which is placed adjacent to the first holder 67, and the rod distal end portion 763 has a contact surface 763a that contacts the pressable surface 67a of the first holder 67. Furthermore, the contact surface 763a has a spherical shape.

(1) Since the contact surface 763a of the rod distal end portion 763 has the spherical shape, the coupling rod 76 makes a point contact relative to the first holder 67 and urges the first holder 67 while sliding along the first holder 67 in response to the depressing operation of the pedal 40 by the driver 81. Therefore, even when the coupling rod 76 is rotated about the rod central axis Crd, a contact state between the coupling rod 76 and the first holder 67 does not change. Thus, there is no restriction on the rotational position of the coupling rod 76 around the rod central axis Crd, and thereby the coupling rod 76 can be easily assembled to the pedal 40.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Although the present embodiment is a modification based on the second embodiment, it is possible to combine the present embodiment with any one of the first, and third to nineteenth embodiments described above.

Twenty-First Embodiment

Next, a twenty-first embodiment will be described. In the present embodiment, points, which are different from the twentieth embodiment described above, will be mainly described.

Figure 29:
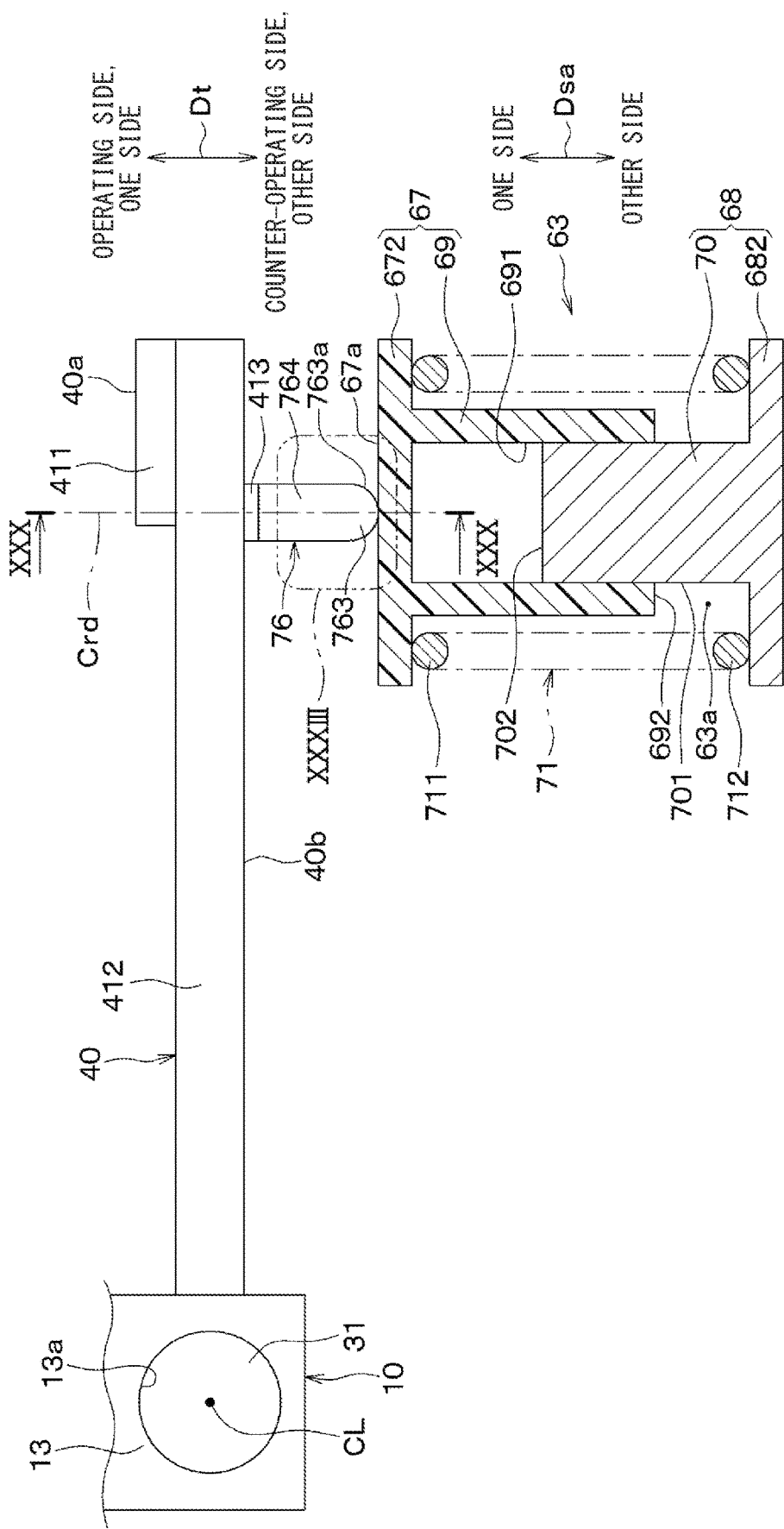
FIG. 29 is a diagram schematically indicating a structure of a pedal device of a twenty-first embodiment and corresponding to FIG. 27.

As shown in FIG. 29, in a pedal axis transverse cross-section (e.g., the cross-section shown in FIG. 29) which is perpendicular to the pedal central axis CL, the contact surface 763a of the rod distal end portion 763 of the present embodiment has an arcuate cross-section that is bulged toward the counter-operating side. Furthermore, as shown in FIGS. 29 and 30, the arcuate cross-section of this contact surface 763a continuously extends in the axial direction Dpa of the pedal central axis CL.

(1) Since the contact surface 763a of the rod distal end portion 763 is formed in the above-described manner, the coupling rod 76 makes a line contact with the first holder 67 and urges the first holder 67 while sliding along the first holder 67 in response to the depressing operation of the pedal 40 by the driver 81. Therefore, at the time when the coupling rod 76 urges the first holder 67, a contact surface area of the coupling rod 76 relative to the first holder 67 can be increased, and thereby a contact pressure, which is applied from the coupling rod 76 to the first holder 67, can be reduced.

Figure 30:
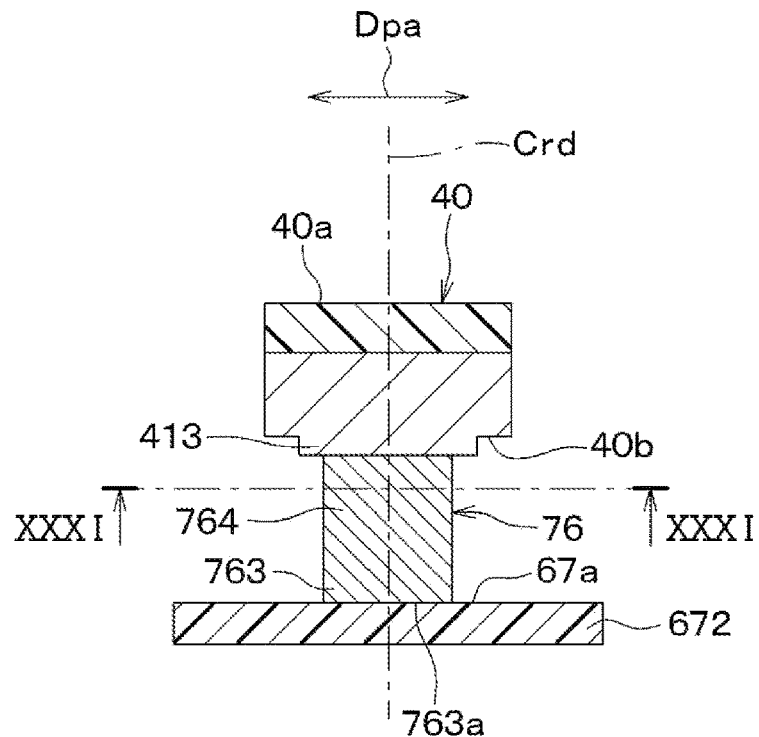
FIG. 30 is a cross-sectional view taken along line XXX-XXX in FIG. 29 in the twenty-first embodiment, corresponding to FIG. 28.
Figure 31:
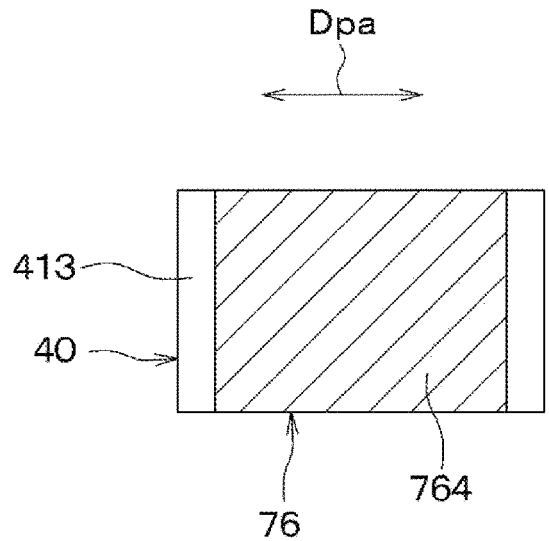
FIG. 31 is a schematic cross-sectional view taken along line XXXI-XXXI in FIG. 30 according to the twenty-first embodiment.

Furthermore, as shown in FIGS. 29 to 31, the coupling rod 76 of the present embodiment has a rod non-circular portion 764 which is located on the pedal 40 side of the rod distal end portion 763. The rod non-circular portion 764 has an outer shape, which is different from a circular shape, in a rod transverse cross-section (e.g., a cross-section shown in FIG. 31) of the rod non-circular portion 764 that is perpendicular to the rod central axis Crd. Specifically, the rod non-circular portion 764 has a rectangular shape in the rod transverse cross-section of the rod non-circular portion 764.

Furthermore, the pedal 40 has a pedal non-circular portion 413 which is formed at the pedal back surface 40b. The pedal non-circular portion 413 projects from the pedal back surface 40b. The coupling rod 76 is coupled to and is fixed to the pedal non-circular portion 413 of the pedal back surface 40b. As shown in FIG. 31, the pedal non-circular portion 413 has an outer shape, which is different from a circular shape, in a rod transverse cross-section of the pedal non-circular portion 413. Specifically, the pedal non-circular portion 413 has a rectangular shape in the rod transverse cross-section of the pedal non-circular portion 413.

(2) Since the rod non-circular portion 764 and the pedal non-circular portion 413 are formed in the above-described manner, the rotational position of the coupling rod 76 around the rod central axis Crd can be accurately set relative to the pedal 40 at a manufacturing process for assembling the coupling rod 76 to the pedal 40. For example, by fixing the coupling rod 76 to the pedal 40 after contacting a lateral surface of the rod non-circular portion 764 and a lateral surface of the pedal non-circular portion 413 to a positioning jig, the coupling rod 76 can be fixed to the pedal 40 while the rotational position of the coupling rod 76 is accurately set. By fixing the coupling rod 76 to the pedal 40 in the above-described manner, the coupling rod 76 and the first holder 67 can make the line contact therebetween with little variation.

The rest of the present embodiment, which is other than the above-described points, is the same as that of the twentieth embodiment. Furthermore, in the present embodiment, the advantages, which are achieved by the common configuration that is common to the twentieth embodiment described above, can be obtained in the same manner as in the twentieth embodiment.

Twenty-Second Embodiment

Next, a twenty-second embodiment will be described. In the present embodiment, points, which are different from the twenty-first embodiment described above, will be mainly described.

Figure 32:
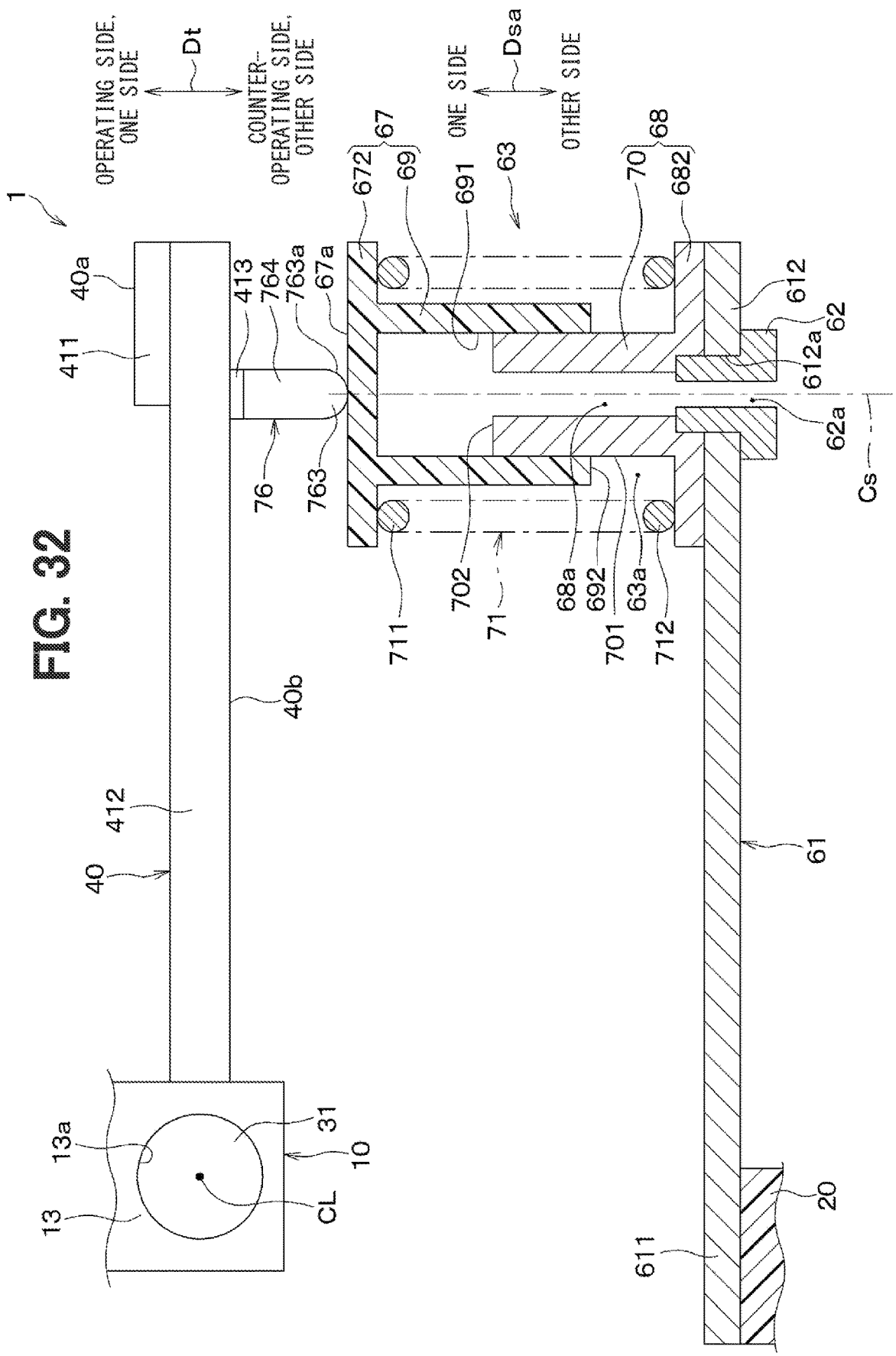
FIG. 32 is a diagram schematically indicating a structure of a pedal device of a twenty-second embodiment and corresponding to FIG. 27.

As shown in FIG. 32, the second holder 68 of the present embodiment has the communication hole 68a which has one end communicated with the tube inside space 69a and the other end opened to the outside of the tube inside space 69a. The communication hole 68a of the present embodiment has the configuration that is the same as that of the communication hole 68a of the first embodiment.

The fastening member 62 of the present embodiment has the configuration that is the same as that of the fastening member 62 of the first embodiment. The fastening member 62 fixes the second holder 68 to the other end portion 612 of the plate spring 61, like in the first embodiment. Furthermore, the tube inside space 69a is communicated to the outside of the tube inside space 69a through the communication hole 68a and the fastener through-hole 62a, while the fastener through-hole 62a is formed at the fastening member 62.

The rest of the present embodiment, which is other than the above-described points, is the same as that of the twenty-first embodiment. Furthermore, in the present embodiment, the advantages, which are achieved by the common configuration that is common to the twenty-first embodiment described above, can be obtained in the same manner as in the twenty-first embodiment. Furthermore, the advantages, which are achieved by the common configuration that is common to the first embodiment described above, can be obtained in the same manner as in the first embodiment.

Twenty-Third Embodiment

Next, a twenty-third embodiment will be described. In the present embodiment, points, which are different from the twenty-first embodiment described above, will be mainly described.

Figure 33:
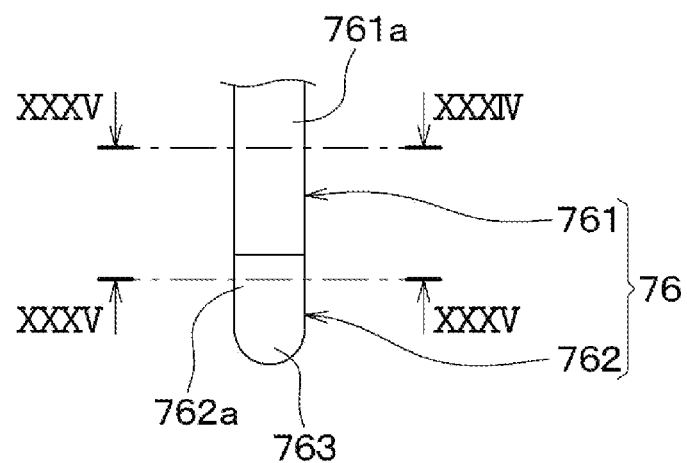
FIG. 33 is a cross-sectional view showing an excerpt of a portion according to a twenty-third embodiment corresponding to a portion XXXIII of FIG. 29.

As shown in FIG. 33, like in the first embodiment, the coupling rod 76 of the present embodiment includes: the arm portion 761, which is coupled to the pedal 40; and the urging portion 762, which is coupled to the arm portion 761 in series at the location that is on the opposite side of the arm portion 761 which is opposite to the pedal 40. The urging portion 762 includes the rod distal end portion 763. For example, the arm portion 761 and the urging portion 762 of the present embodiment extend along the rod central axis Crd. Each of the arm portion 761 and the urging portion 762 of the present embodiment basically has the same configuration as that of the first embodiment.

Figure 34:
FIG. 34 is a schematic cross-sectional view taken along line XXXIV-XXXIV in FIG. 33 according to the twenty-third embodiment.
Figure 35:
FIG. 35 is a schematic cross-sectional view taken along line XXXV-XXXV in FIG. 33 according to the twenty-third embodiment.

However, as shown in FIGS. 33 to 35, the arm portion 761 of the present embodiment has an arm non-circular portion 761a. The arm non-circular portion 761a has an outer shape, which is different from a circular shape, in a rod transverse cross-section (e.g., a cross-section shown in FIG. 34) of the arm non-circular portion 761a. Specifically, the arm non-circular portion 761a has a rectangular shape in the rod transverse cross-section of the arm non-circular portion 761a.

Furthermore, the urging portion 762 of the present embodiment has an urging non-circular portion 762a which is located on the pedal 40 side of the rod distal end portion 763. The urging non-circular portion 762a has an outer shape, which is different from a circular shape, in a rod transverse cross-section (e.g., a cross-section shown in FIG. 35) of the urging non-circular portion 762a. Specifically, the urging non-circular portion 762a has a rectangular shape in the rod transverse cross-section of the urging non-circular portion 762a.

(1) Since the arm non-circular portion 761a and the urging non-circular portion 762a are formed in the above-described manner, the rotational position of the urging portion 762 around the rod central axis Crd can be accurately set relative to the arm portion 761 at a manufacturing process for fixing the urging portion 762 to the arm portion 761. For example, by fixing the urging portion 762 to the arm portion 761 after contacting a lateral surface of the arm non-circular portion 761a and a lateral surface of the urging non-circular portion 762a to a positioning jig, the urging portion 762 can be fixed to the arm portion 761 while the rotational position of the urging portion 762 is accurately set. By fixing the urging portion 762 to the arm portion 761 in the above-described manner, the coupling rod 76 and the first holder 67 can make a line contact therebetween with little variation.

The rest of the present embodiment, which is other than the above-described points, is the same as that of the twenty-first embodiment. Furthermore, in the present embodiment, the advantages, which are achieved by the common configuration that is common to the twenty-first embodiment described above, can be obtained in the same manner as in the twenty-first embodiment.

Although the present embodiment is a modification based on the twenty-first embodiment, it is possible to combine the present embodiment with the twenty-second embodiment described above.

Other Embodiments (1) In each of the embodiments described above, the pedal device 1 is used as the brake pedal device. However, this is only one example. For example, the pedal device 1 may be used as an accelerator pedal that is operated to adjust an output of a drive power source of the vehicle 80. Furthermore, the pedal device 1 may be any of various devices which are operated by the foot of the driver 81.

(2) In each of the embodiments described above, as shown in FIGS. 2 and 3, the support body, which slidably supports the pedal 40 around the pedal central axis CL, includes the housing 10 and the base plate 20 and is the housing which receives the reaction force generation mechanism 60. However, this is just one example. The support body is not necessarily formed as the housing and may not receive the reaction force generation mechanism 60.

(3) In the first embodiment described above, as shown in FIG. 4, the at least one resilient member 65, 66 of the reaction force generation mechanism 60 includes the first coil spring 65 and the second coil spring 66. However, this is only one example. For example, one coil spring or three or more coil springs may be used as the at least one resilient member 65, 66. Furthermore, the at least one resilient member 65, 66 may possibly be at least one resilient body (device), such as rubber or an air spring instead of the coil spring.

(4) In the first embodiment described above, the first holder 67 shown in FIG. 4 is made of, for example, the resin material. However, the material of the first holder 67 is not limited to any particular material and may be made of a metal material.

When the first holder 67 is made of the metal material, it is possible to increase the durability against the contact pressure of the coupling rod 76, which urges the pressable surface 67a of the first holder 67, in comparison to the case where the first holder 67 is made of the resin material. Furthermore, the first holder 67 is less likely to be deformed, and thereby it is possible to avoid that the outer guide portion 69 and the inner guide portion 70 rub against each other in response to the deformation of the first holder 67.

(5) In the first embodiment described above, the flange member 684 shown in FIG. 4 is made of the resin material, and the inner guide portion 70 is made of the metal material. However, the material of the flange member 684 and the material of the inner guide portion 70 are not limited to these materials. For example, the flange member 684 may be made of a metal material, and the inner guide portion 70 may be made of a resin material. Alternatively, both of the flange member 684 and the inner guide portion 70 may be made of a resin material or a metal material.

(6) In the first embodiment described above, as shown in FIGS. 3 and 4, the second holder 68 is fixed to the other end portion 612 of the plate spring 61 by the screwing with the fastening member 62. However, this is only one example. For example, the second holder 68 may be directly fixed to the base plate 20 by, for example, the screwing with the fastening member 62 without providing the plate spring 61.

(7) In the first embodiment described above, as shown in FIG. 4, the inner guide portion 70 is formed as the separate component that is formed separately from the flange member 684 which includes the second contact portion 682 and the second spring guide portion 683. However, this is only one example. For example, the inner guide portion 70, the second contact portion 682 and the second spring guide portion 683 may be formed integrally in one-piece as a one-piece component by, for example, insert molding.

(8) In the first embodiment described above, the spring seat 74 shown in FIG. 4 is made of the resin material. Alternatively, the spring seat 74 may be made of a metal material.

(9) In the first embodiment described above, as shown in FIG. 3, the coupling rod 76 is fixed to the pedal 40 by the bolt, so that the coupling rod 76 is not rotated about the rod central axis Crd. However, this is only one example. For example, as long as the rod central axis Crd is fixed, the coupling rod 76 may be rotated around the rod central axis Crd. Even in this case, since the rod central axis Crd is fixed, it is possible to say that the coupling rod 76 is coupled to the pedal 40 such that the projecting direction of the coupling rod 76, which projects from the pedal 40, is fixed.

(10) In the first embodiment described above, the urging portion 762 of the coupling rod 76 shown in FIG. 4 is made of, for example, the resin material. However, the material of the urging portion 762 is not limited to any material and may be made of a metal material.

When the urging portion 762 is made of the metal material, it is possible to increase the durability against the contact pressure of the urging portion 762 of the coupling rod 76, which urges the pressable surface 67a of the first holder 67, in comparison to the case where the urging portion 762 is made of the resin material.

(11) In the first embodiment described above, with reference to FIG. 4, in the cross-section that is perpendicular to the unit axial direction Dsa, the inner peripheral surface 691 of the outer guide portion 69 and the outer peripheral surface 701 of the inner guide portion 70 respectively have the circular shape that is centered on the unit central axis Cs. However, this is only one example. In the cross-section that is perpendicular to the unit axial direction Dsa, each of the inner peripheral surface 691 and the outer peripheral surface 701 may have an ellipse shape or a polygonal shape.

(12) In each of the embodiments described above, as shown in FIG. 4, the second holder 68 is fixed to the other end portion 612 of the plate spring 61 by the screwing with the fastening member 62. However, this is only one example. The second holder 68 may be fixed to the other end portion 612 of the plate spring 61 by, for example, press-fitting, snap-fitting or swaging instead of the screwing.

(13) In the fifteenth embodiment described above, at the inflection point B1 of the depression force characteristic shown in FIG. 22, as indicated in FIG. 21B, the spring seat 74 abuts against the first holder 67 in the unit axial direction Dsa instead of the second holder 68. However, this is only one example. For example, it is possible to configure that the spring seat 74 abuts against the second holder 68 in the unit axial direction Dsa in place of the first holder 67 at the inflection point B1 of the depression force characteristic shown in FIG. 22 by adjusting the spring constant of the respective coil springs 65, 66. In this case, during the spring compression process, the spring seat 74 first abuts against the second holder 68 in the unit axial direction Dsa, and then the first holder 67 and the second holder 68 abut against each other in the unit axial direction Dsa.

The above discussion is also applicable to the sixteenth embodiment described above. That is, in the sixteenth embodiment described above, at the inflection point B1 of the depression force characteristic shown in FIG. 22, as indicated in FIG. 23B, the spring seat 74 abuts against the outer guide portion 69 of the first holder 67 in the unit axial direction Dsa instead of the second contact portion 682 of the second holder 68. However, this is only one example. For example, it is possible to configure that the spring seat 74 abuts against the second contact portion 682 of the second holder 68 in the unit axial direction Dsa in place of the outer guide portion 69 of the first holder 67 at the inflection point B1 of the depression force characteristic shown in FIG. 22 by adjusting the spring constant of the respective coil springs 65, 66. In this case, during the spring compression process, the spring seat 74 first abuts against the second contact portion 682 of the second holder 68 in the unit axial direction Dsa, and then the spring seat 74 abuts against the outer guide portion 69 of the first holder 67.

(14) In the twenty-first embodiment described above, as shown in FIG. 31, the rod non-circular portion 764 has the rectangular shape in the rod transverse cross-section of the rod non-circular portion 764. However, this is only one example. For example, the shape of the cross-section of the rod non-circular portion 764 is not limited to the rectangular shape and may be an ellipse shape or a non-circular shape. The above discussion is also applicable to: the pedal non-circular portion 413; and the arm non-circular portion 761a and the urging non-circular portion 762a of the twenty-third embodiment.

(15) In each of the embodiments described above, as shown in FIG. 2, the pedal device 1 is the organ-type pedal device. However, this is only one example. For example, the pedal device 1 may be a suspended-type pedal device.

(16) The present disclosure is not limited to the above-described embodiments and may be implemented in various variations. Further, the above embodiments are not unrelated to each other and can be appropriately combined unless the combination is clearly impossible.

Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or like of the constituent elements of the embodiment is mentioned, the present disclosure should not be limited to such a numerical value unless it is clearly stated that it is essential and/or it is required in principle. In each of the above embodiments, when the material, the shape, the positional relationship or the like of the constituent elements of the embodiment is mentioned, the present disclosure should not be limited to the material, the shape, the positional relationship or the like unless it is clearly stated that it is essential and/or it is required in principle.

What is claimed is:

1. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:
the reaction force generation mechanism includes:
at least one resilient member that is resiliently deformable in one direction;
a first holder that is configured to contact the at least one resilient member from one side where the pedal is placed in the one direction, wherein the first holder is configured to be depressed by the pedal; and
a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member;
another holder among the first holder and the second holder includes an inner guide portion that extends in the one direction and is fitted into the outer guide portion, wherein the inner guide portion is configured to move relative to the outer guide portion in the one direction; and
relative movement between the one holder and the another holder in a compressing direction for compressing the at least one resilient member is stopped when the inner guide portion and the one holder abut against each other in the one direction.

2. The pedal device according to claim 1, wherein:
the outer guide portion has an inner peripheral surface that faces an inner side of the outer guide portion shaped in the tubular form;
the inner guide portion has an outer peripheral surface that is opposed to the inner peripheral surface and contacts the inner peripheral surface; and
at the outer guide portion and the inner guide portion, the inner peripheral surface and the outer peripheral surface slidably contact with each other such that relative movement between the first holder and the second holder in a direction perpendicular to the one direction is limited while relative movement between the first holder and the second holder in the one direction is permitted.

3. The pedal device according to claim 2, wherein in a cross-section that is perpendicular to the one direction, each of the inner peripheral surface and the outer peripheral surface has a circular shape.

4. The pedal device according to claim 1, wherein:
the second holder includes:
a corresponding guide portion among the outer guide portion and the inner guide portion; and
a contact portion that is formed around the corresponding guide portion and is configured to contact the at least one resilient member from the another side in the one direction; and
the corresponding guide portion and the contact portion are separately formed as separate components, respectively.

5. The pedal device according to claim 1, wherein:
the inner guide portion has a distal end surface which is placed at an inside of the outer guide portion and is formed at a distal end of the inner guide portion;
a tube inside space, in which the distal end surface is exposed, is formed at the inside of the outer guide portion; and
a communication hole, which communicates the tube inside space to an outside of the tube inside space, is formed at one of the first holder and the second holder.

6. The pedal device according to claim 5, wherein the communication hole is formed at the second holder.

7. The pedal device according to claim 6, wherein:
the reaction force generation mechanism includes:
- a plate spring that has one end portion fixed to the support body and another end portion fixed to the second holder; and
- a fastener that extends through the another end portion of the plate spring and fixes the another end portion of the plate spring to the second holder;

the second holder is coupled to the support body through the plate spring;
the fastener has a fastener through-hole that is communicated with the communication hole; and
the tube inside space is communicated with the outside of the tube inside space through the communication hole and the fastener through-hole.

8. The pedal device according to claim 1, wherein:
the reaction force generation mechanism includes a plate spring, wherein the plate spring has one end portion fixed to the support body and another end portion fixed to the second holder; and
the second holder is coupled to the support body through the plate spring.

9. The pedal device according to claim 1, wherein the at least one resilient member is at least one coil spring, and a direction, which is perpendicular to the one direction, is a radial direction of the at least one coil spring.

10. The pedal device according to claim 9, wherein:
one coil spring among the at least one coil spring has a first spring end portion that contacts the first holder;
the first holder has a first opposing surface that is opposed to the first spring end portion in the radial direction; and
the first opposing surface is configured to limit positional deviation of the first spring end portion relative to the first holder in the radial direction.

11. The pedal device according to claim 9, wherein:
one coil spring among the at least one coil spring has a spring end portion that contacts the second holder;
the second holder has an opposing surface that is opposed to the spring end portion in the radial direction; and
the opposing surface is configured to limit positional deviation of the spring end portion relative to the second holder in the radial direction.

12. The pedal device according to claim 9, wherein:
the reaction force generation mechanism includes a spring seat that is located on an outer side of one of the outer guide portion and the inner guide portion in the radial direction;
the at least one coil spring is a plurality of coil springs that include a first coil spring and a second coil spring which are coupled to each other through the spring seat; and
the first coil spring and the second coil spring are configured to urge against each other through the spring seat when the first coil spring and the second coil spring are respectively compressed and deformed.

13. The pedal device according to claim 12, wherein:
the first coil spring has a first spring seat side end portion that contacts the spring seat;
the second coil spring has a second spring seat side end portion that contacts the spring seat;
the spring seat has:
- a first spring seat opposing surface that is opposed to the first spring seat side end portion in the radial direction; and
- a second spring seat opposing surface that is opposed to the second spring seat side end portion in the radial direction;

the first spring seat opposing surface is configured to limit positional deviation of the first spring seat side end portion relative to the spring seat in the radial direction; and
the second spring seat opposing surface is configured to limit positional deviation of the second spring seat side end portion relative to the spring seat in the radial direction.

14. The pedal device according to claim 12, wherein:
an outer diameter of the first coil spring is smaller than an inner diameter of the second coil spring; and
a portion of the first coil spring is placed on an inner side of the second coil spring in the radial direction to overlap with the second coil spring.

15. The pedal device according to claim 14, wherein:
the first coil spring has a first spring seat side end portion that is placed on the inner side of the second coil spring in the radial direction to overlap with the second coil spring;
the second coil spring has a second spring seat side end portion that is placed on an outer side of the first coil spring in the radial direction to overlap with the first coil spring; and
the spring seat has:
- an extending portion that is shaped in a tubular form, wherein the extending portion is placed between the first coil spring and the second coil spring in the radial direction and extends in the one direction;
- a spring seat inner portion that inwardly extends from the extending portion in the radial direction, wherein the spring seat inner portion is opposed to and contacts the first spring seat side end portion in the one direction; and
- a spring seat outer portion that outwardly extends from the extending portion in the radial direction, wherein the spring seat outer portion is opposed to and contacts the second spring seat side end portion in the one direction.

16. The pedal device according to claim 15, wherein:
the spring seat has:
- a first spring seat opposing surface that is opposed to the first spring seat side end portion in the radial direction; and
- a second spring seat opposing surface that is opposed to the second spring seat side end portion in the radial direction;

the first spring seat opposing surface is formed:
- on an inner side of the extending portion in the radial direction; or
- at the spring seat inner portion, wherein the first spring seat opposing surface is configured to limit positional deviation of the first spring seat side end portion relative to the spring seat in the radial direction; and the second spring seat opposing surface is formed on an outer side of the extending portion in the radial direction and is configured to limit positional deviation of the second spring seat side end portion relative to the spring seat in the radial direction.

17. The pedal device according to claim 15, wherein:
the spring seat inner portion has an insertion hole that extends through the spring seat inner portion in the one direction, and one of the outer guide portion and the inner guide portion is inserted through the insertion hole;

the spring seat inner portion has an insertion hole inner peripheral surface that faces inward in the radial direction and is exposed to the insertion hole; and a size of the insertion hole is set such that the insertion hole inner peripheral surface does not arrest the one of the outer guide portion and the inner guide portion in the radial direction when the spring seat abuts against one of the first holder and the second holder in the one direction in response to compression of the first coil spring and the second coil spring.

18. The pedal device according to claim 12, wherein the spring seat has an insertion hole that extends through the spring seat in the one direction, and one of the outer guide portion and the inner guide portion is inserted through the insertion hole.

19. The pedal device according to claim 12, wherein the spring seat is made of a resin material.

20. The pedal device according to claim 12, wherein during a moving process, at which relative movement is made between the first holder and the second holder in a compressing direction for compressing each of the first coil spring and the second coil spring, the first holder and the second holder are configured to abut against each other in the one direction after the spring seat abuts against one of the first holder and the second holder in the one direction.

21. The pedal device according to claim 1, wherein the first holder is made of a resin material or a metal material.

22. The pedal device according to claim 1, comprising a rod that is placed between and couples between the pedal and the first holder, wherein the first holder is configured to be urged by the pedal through the rod in response to application of the depression force to the pedal.

23. The pedal device according to claim 22, wherein:
the rod has a rod distal end portion placed on the counter-operating side, and the rod projects from the pedal toward the counter-operating side of the pedal and is coupled to the pedal such that a projecting direction of the rod from the pedal is fixed;
the first holder has a pressable surface which faces the one side in the one direction while the rod distal end portion contacts the pressable surface; and
the rod distal end portion is configured to urge the pressable surface and slide relative to the pressable surface in response to depression of the pedal by the driver.

24. The pedal device according to claim 23, wherein:
the rod distal end portion has a contact surface that contacts the pressable surface; and
the contact surface is shaped in a spherical shape.

25. The pedal device according to claim 23, wherein:
the pedal is configured to swing about a pedal central axis of the pedal in response to the depression of the pedal by the driver;
the rod distal end portion has a contact surface that contacts the pressable surface;
in a cross-section that is perpendicular to the pedal central axis, the contact surface has an arcuate cross-section that is bulged toward the counter-operating side; and
the arcuate cross-section of the contact surface continuously extends in an axial direction of the pedal central axis.

26. The pedal device according to claim 23, wherein the rod includes:
an arm portion that is coupled to the pedal; and
an urging portion that includes the rod distal end portion and is coupled to the arm portion, wherein a material of the urging portion is different from a material of the arm portion.

27. The pedal device according to claim 26, wherein the arm portion is made of a metal material.

28. The pedal device according to claim 26, wherein the urging portion is made of a resin material or a metal material.

29. The pedal device according to claim 26, wherein:
the arm portion extends along a rod central axis of the rod and has an arm non-circular portion, wherein the arm non-circular portion has an outer shape, which is other than a circle, in a cross-section of the arm non-circular portion that is perpendicular to the rod central axis; and
the urging portion has an urging non-circular portion, wherein the urging non-circular portion has an outer shape, which is other than the circle, in a cross-section of the urging non-circular portion that is perpendicular to the rod central axis.

30. The pedal device according to claim 26, wherein:
the rod extends along a rod central axis of the rod and has a rod non-circular portion, wherein the rod non-circular portion has an outer shape, which is other than a circle, in a cross-section of the rod non-circular portion that is perpendicular to the rod central axis;
the pedal has a pedal back surface, wherein the pedal back surface is placed on the counter-operating side and faces the counter-operating side; and
the pedal back surface has a pedal non-circular portion that projects from the pedal back surface, wherein the pedal non-circular portion has an outer shape, which is other than the circle, in a cross-section of the pedal non-circular portion that is perpendicular to the rod central axis.

31. The pedal device according to claim 1, wherein the second holder is fixed by screwing to one of:
a member that is placed between the support body and the second holder; and
the support body.

32. The pedal device according to claim 1, wherein the pedal device is configured to be mounted on one of a floor and a dash panel in a vehicle cabin of the vehicle.

33. The pedal device according to claim 1, wherein:
the support body includes a housing; and
the reaction force generation mechanism is received in the housing.

34. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:
the reaction force generation mechanism includes:
at least one resilient member that is resiliently deformable in one direction;
a first holder that is configured to contact the at least one resilient member from one side where the pedal is placed in the one direction, wherein the first holder is configured to be depressed by the pedal; and
a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member;
another holder among the first holder and the second holder includes an inner guide portion that extends in the one direction and is fitted into the outer guide portion, wherein the inner guide portion is configured to move relative to the outer guide portion in the one direction; and
relative movement between the one holder and the another holder in a compressing direction for compressing the at least one resilient member is stopped when the outer guide portion and the another holder abut against each other in the one direction.

35. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:
the reaction force generation mechanism includes:
at least one resilient member that is resiliently deformable in one direction;
a first holder that is configured to contact the at least one resilient member from one side where the pedal is placed in the one direction, wherein the first holder is configured to be depressed by the pedal; and
a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member;
another holder among the first holder and the second holder includes an inner guide portion that extends in the one direction and is fitted into the outer guide portion, wherein the inner guide portion is configured to move relative to the outer guide portion in the one direction;
the second holder includes:
a corresponding guide portion among the outer guide portion and the inner guide portion; and
a contact portion that is formed around the corresponding guide portion and is configured to contact the at least one resilient member from the another side in the one direction; and
the corresponding guide portion and the contact portion are separately formed as separate components, respectively.

36. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:
the reaction force generation mechanism includes:
at least one resilient member that is resiliently deformable in one direction;
a first holder that is configured to contact the at least one resilient member from one side where the pedal is placed in the one direction, wherein the first holder is configured to be depressed by the pedal; and
a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member;
another holder among the first holder and the second holder includes an inner guide portion that extends in the one direction and is fitted into the outer guide portion, wherein the inner guide portion is configured to move relative to the outer guide portion in the one direction;
the inner guide portion has a distal end surface which is placed at an inside of the outer guide portion and is formed at a distal end of the inner guide portion;
a tube inside space, in which the distal end surface is exposed, is formed at the inside of the outer guide portion;
a communication hole, which communicates the tube inside space to an outside of the tube inside space to enable a flow of air into and out of the tube inside space through the communication hole in response to relative movement between the first holder and the second holder in the one direction, is formed at one of the first holder and the second holder; and
a minimum cross-sectional area of the communication hole, which is measured perpendicular to the one direction, is smaller than a minimum cross-sectional area of the tube inside space, which is measured perpendicular to the one direction.

37. A pedal device for a vehicle, comprising:
a support body that is configured to be installed to a vehicle body of the vehicle;

a pedal that is configured to swing relative to the support body and is configured to be depressed by a driver of the vehicle from an operating side of the pedal which is predetermined; and a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:

the reaction force generation mechanism includes:
  at least one resilient member that is resiliently deformable in one direction;
  a first holder that is configured to contact the at least one resilient member from one side where the pedal is placed in the one direction, wherein the first holder is configured to be depressed by the pedal; and
  a second holder that is configured to contact the at least one resilient member from another side that is opposite to the one side in the one direction to receive the depression force transmitted to the at least one resilient member;

one holder among the first holder and the second holder includes an outer guide portion, wherein the outer guide portion is shaped in a tubular form extending in the one direction and is inserted in an inside space that is formed at an inside of the at least one resilient member;

another holder among the first holder and the second holder includes an inner guide portion that extends in the one direction and is fitted into the outer guide portion, wherein the inner guide portion is configured to move relative to the outer guide portion in the one direction;

the at least one resilient member is at least one coil spring, and a direction, which is perpendicular to the one direction, is a radial direction of the at least one coil spring;

the reaction force generation mechanism includes a spring seat that is located on an outer side of one of the outer guide portion and the inner guide portion in the radial direction;

the at least one coil spring is a plurality of coil springs that include a first coil spring and a second coil spring which are coupled to each other through the spring seat; and the first coil spring and the second coil spring are configured to urge against each other through the spring seat when the first coil spring and the second coil spring are respectively compressed and deformed.

38. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:

the reaction force generation mechanism includes:
  at least one resilient member that is resiliently deformable in one direction;
  a first holder that is configured to contact the at least one resilient member from one side where the pedal is placed in the one direction, wherein the first holder is configured to be depressed by the pedal; and
  a second holder that is configured to contact the at least one resilient member from another side that is opposite to the one side in the one direction to receive the depression force transmitted to the at least one resilient member;

one holder among the first holder and the second holder includes an outer guide portion, wherein the outer guide portion is shaped in a tubular form extending in the one direction and is inserted in an inside space that is formed at an inside of the at least one resilient member;

another holder among the first holder and the second holder includes an inner guide portion that extends in the one direction and is fitted into the outer guide portion, wherein the inner guide portion is configured to move relative to the outer guide portion in the one direction;

the pedal device comprises a rod that is placed between and couples between the pedal and the first holder, wherein the first holder is configured to be urged by the pedal through the rod in response to application of the depression force to the pedal;

the rod has a rod distal end portion placed on the counter-operating side, and the rod projects from the pedal toward the counter-operating side of the pedal and is coupled to the pedal such that a projecting direction of the rod from the pedal is fixed;

the first holder has a pressable surface which faces the one side in the one direction while the rod distal end portion contacts the pressable surface;

the rod distal end portion is configured to urge the pressable surface and slide relative to the pressable surface in response to depression of the pedal by the driver;

the rod distal end portion has a contact surface that contacts the pressable surface; and the contact surface is shaped in a spherical shape.

39. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:

the reaction force generation mechanism includes:
  at least one resilient member that is resiliently deformable in one direction;
  a first holder that is configured to contact the at least one resilient member from one side where the pedal is placed in the one direction, wherein the first holder is configured to be depressed by the pedal; and
  a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member;
another holder among the first holder and the second holder includes an inner guide portion that extends in the one direction and is fitted into the outer guide portion, wherein the inner guide portion is configured to move relative to the outer guide portion in the one direction;
the pedal device comprises a rod that is placed between and couples between the pedal and the first holder, wherein the first holder is configured to be urged by the pedal through the rod in response to application of the depression force to the pedal;
the rod has a rod distal end portion placed on the counter-operating side, and the rod projects from the pedal toward the counter-operating side of the pedal and is coupled to the pedal such that a projecting direction of the rod from the pedal is fixed;
the first holder has a pressable surface which faces the one side in the one direction while the rod distal end portion contacts the pressable surface;
the rod distal end portion is configured to urge the pressable surface and slide relative to the pressable surface in response to depression of the pedal by the driver;
the pedal is configured to swing about a pedal central axis of the pedal in response to the depression of the pedal by the driver;
the rod distal end portion has a contact surface that contacts the pressable surface;
in a cross-section that is perpendicular to the pedal central axis, the contact surface has an arcuate cross-section that is bulged toward the counter-operating side; and
the arcuate cross-section of the contact surface continuously extends in an axial direction of the pedal central axis.

40. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:
the reaction force generation mechanism includes:
at least one resilient member that is resiliently deformable in one direction;
a first holder that is configured to contact the at least one resilient member from one side where the pedal is placed in the one direction, wherein the first holder is configured to be depressed by the pedal; and
a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member;
another holder among the first holder and the second holder includes an inner guide portion that extends in the one direction and is fitted into the outer guide portion, wherein the inner guide portion is configured to move relative to the outer guide portion in the one direction;
the pedal device comprises a rod that is placed between and couples between the pedal and the first holder, wherein the first holder is configured to be urged by the pedal through the rod in response to application of the depression force to the pedal;
the rod has a rod distal end portion placed on the counter-operating side, and the rod projects from the pedal toward the counter-operating side of the pedal and is coupled to the pedal such that a projecting direction of the rod from the pedal is fixed;
the first holder has a pressable surface which faces the one side in the one direction while the rod distal end portion contacts the pressable surface;
the rod distal end portion is configured to urge the pressable surface and slide relative to the pressable surface in response to depression of the pedal by the driver; and
the rod includes:
an arm portion that is coupled to the pedal; and
an urging portion that includes the rod distal end portion and is coupled to the arm portion, wherein a material of the urging portion is different from a material of the arm portion.

41. A pedal device for a vehicle, comprising:
a support body that is configured to be installed to a vehicle body of the vehicle;
a pedal that is configured to swing relative to the support body and is configured to be depressed by a driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the driver to the pedal, wherein:
the reaction force generation mechanism includes:
at least one resilient member that is resiliently deformable in one direction;
a first holder that is configured to contact the at least one resilient member from one side where the pedal is placed in the one direction, wherein the first holder is configured to be depressed by the pedal; and
a second holder that is configured to contact the at least one resilient member from another side that is opposite to the one side in the one direction to receive the depression force transmitted to the at least one resilient member;
one holder among the first holder and the second holder includes an outer guide portion, wherein the outer guide portion is shaped in a tubular form extending in the one direction and is inserted in an inside space that is formed at an inside of the at least one resilient member;

another holder among the first holder and the second holder includes an inner guide portion that extends in the one direction and is fitted into the outer guide portion, wherein the inner guide portion is configured to move relative to the outer guide portion in the one direction; and the second holder is fixed by screwing to one of:

a member that is placed between the support body and the second holder; and the support body.

* * * * *